US012731577B2

(12) United States Patent
Laptev et al.

(10) Patent No.: US 12,731,577 B2
(45) Date of Patent: Sep. 8, 2026

(54) WEIGHTED FINITE STATE TRANSDUCER FRAMEWORKS FOR CONVERSATIONAL AI SYSTEMS AND APPLICATIONS

(71) Applicant: Nvidia Corporation, Santa Clara, CA (US)

(72) Inventors: Aleksandr Laptev, Yerevan (AM); Vladimir Bataev, Yerevan (AM); Igor Gitman, Redmond, WA (US); Boris Ginsburg, Sunnyvale, CA (US)

(73) Assignee: Nvidia Corporation, Santa Clara, CA (US)

( * ) Notice: Subject to any disclaimer, the term of this patent is extended or adjusted under 35 U.S.C. 154(b) by 389 days.

(21) Appl. No.: 18/355,646

(22) Filed: Jul. 20, 2023

(65) Prior Publication Data

US 2024/0265912 A1 Aug. 8, 2024

Related U.S. Application Data

(60) Provisional application No. 63/442,871, filed on Feb. 2, 2023.

(51) Int. Cl.

| | |
|---|---|
| ***G10L 15/16*** | (2006.01) |
| ***G10L 15/06*** | (2013.01) |
| ***G10L 15/22*** | (2006.01) |

(52) U.S. Cl.
CPC ............ *G10L 15/16* (2013.01); *G10L 15/063* (2013.01); *G10L 15/22* (2013.01)

(58) Field of Classification Search
CPC ........ G10L 15/16; G10L 15/063; G10L 15/22
See application file for complete search history.

(56) References Cited

U.S. PATENT DOCUMENTS

| | | | | |
|---|---|---|---|---|
| 10,121,467 | B1 * | 11/2018 | Gandhe | G06F 40/247 |
| 10,229,672 | B1 * | 3/2019 | Rao | G10L 15/16 |
| 10,943,583 | B1 * | 3/2021 | Gandhe | G10L 15/183 |
| 2015/0314454 | A1 * | 11/2015 | Breazeal | G10L 15/32 700/259 |
| 2020/0273449 | A1 * | 8/2020 | Kumar | G06F 16/635 |

(Continued)

OTHER PUBLICATIONS

Tian et al, FSR: Accelerating the Inference Process of Transducer-Based Models by Applying Fast-Skip Regularization, Apr. 7, 2021, NLPR Shool of AI, CAS. all pages.*

(Continued)

*Primary Examiner* — Michael Colucci
(74) *Attorney, Agent, or Firm* — Hogan Lovells Cadwalader US LLP

(57) ABSTRACT

Systems and methods provide for a machine learning system to train a machine learning model to output a penalty-free emission when processing an auditory input. For example, as the system generates paths through a probability lattice, one or more paths may include a penalty-free emission that skips at least one frame associated with the probability lattice, but that does not add a cost to a final path cost. The use of the penalty-free emissions may be represented through one or more graphical representations used for training in order to develop loss functions for models. One or more of these frameworks may be incorporated into automatic speech recognition pipelines to improve training while also reducing coding requirements to simplify debugging operations.

20 Claims, 24 Drawing Sheets

420

422

424

(56) References Cited

U.S. PATENT DOCUMENTS

| | | | | |
|---|---|---|---|---|
| 2021/0192220 | A1* | 6/2021 | Qu | G06V 20/46 |
| 2021/0201004 | A1* | 7/2021 | Yadav | G06V 40/20 |
| 2022/0139380 | A1* | 5/2022 | Meng | G06N 3/0442 704/232 |
| 2022/0208180 | A1* | 6/2022 | Eyben | G10L 25/00 |
| 2023/0107695 | A1* | 4/2023 | Zhang | G10L 15/16 704/270.1 |
| 2023/0120223 | A1* | 4/2023 | Williams | G06F 16/954 715/738 |
| 2023/0196124 | A1* | 6/2023 | Bajic | G06N 3/0442 706/15 |
| 2023/0214450 | A1* | 7/2023 | Wang | G06V 20/46 382/155 |

OTHER PUBLICATIONS

Non-Final Office Action issued in U.S. Appl. No. 18/355,653, dated Jul. 2, 2025.

Tian et al., "FSR: Accelerating the Inference Process of Transducer-Based Models by Applying Fast-Skip Regularization", arXiv: 2104.02882v1 [eess.AS], Apr. 2021, 5 pages.

Fainberg et al., "Lattice-based lightly-supervised acoustic model training", arXiv: 1905.13150v2 [cs. CL], Jul. 2019, 5 pages.

* cited by examiner

WEIGHTED FINITE STATE TRANSDUCER FRAMEWORKS FOR CONVERSATIONAL AI SYSTEMS AND APPLICATIONS

CROSS-REFERENCE TO RELATED APPLICATIONS

This application claims priority to and the benefit of U.S. Provisional Patent Application No. 63/442,871, filed Feb. 2, 2023, titled "WFST-based Implementations of the RNN-T Loss Function," the full disclosure of which is hereby incorporated by reference in its entirety for all purposes.

BACKGROUND

Conversational artificial intelligence (AI) systems, including various speech-to-text systems and/or text-to-speech systems, may use implementations of automatic speech recognition (ASR) techniques that are configured to receive an audio input (or text input), identify different features from the audio input (or text input) to predict an associated output text (or output audio), and then provide a transcription of the audio input (or an auditory response of the text input). However, in the case of audio inputs, breaking the input down into discrete audio frames many result in one or more frames that include no sound or are not helpful in determining any particular feature—such as phonemes, sub words, or letters—associated with the audio input. Processing these empty or unhelpful frames wastes valuable resources and time. As a result, current systems may be slow or expensive to deploy.

BRIEF DESCRIPTION OF THE DRAWINGS

Various embodiments in accordance with the present disclosure will be described with reference to the drawings, in which.

DETAILED DESCRIPTION

Figure 1A:
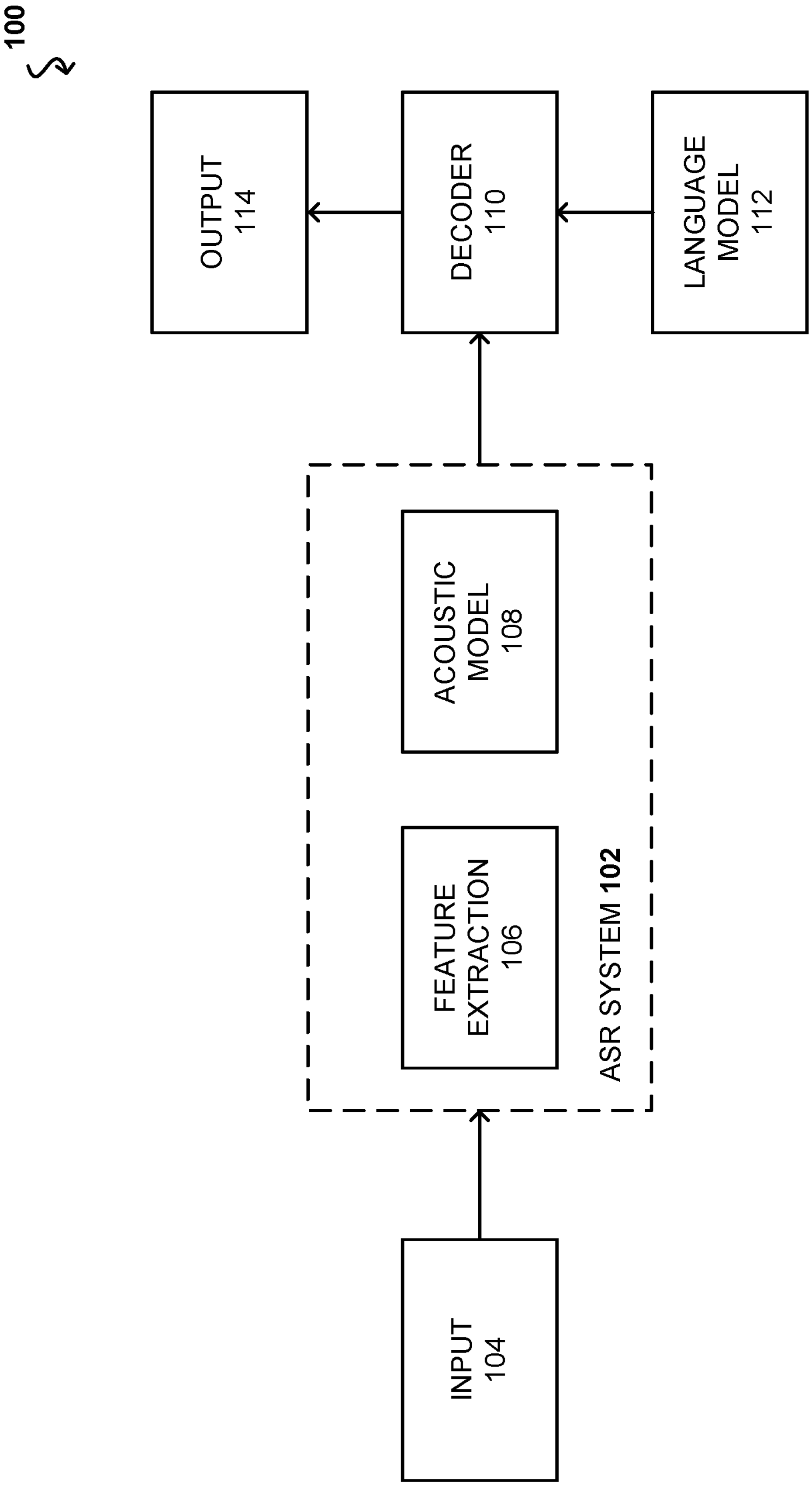
FIG. 1A illustrates an example environment for a language system, according to at least one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

The systems and methods described herein may be used by, without limitation, non-autonomous vehicles or machines, semi-autonomous vehicles or machines (e.g., in an in-cabin infotainment or digital or driver virtual assistant application)), autonomous vehicles or machines, piloted and un-piloted robots or robotic platforms, warehouse vehicles, off-road vehicles, vehicles coupled to one or more trailers, flying vessels, boats, shuttles, emergency response vehicles, motorcycles, electric or motorized bicycles, aircraft, construction vehicles, trains, underwater craft, remotely operated vehicles such as drones, and/or other vehicle types. Further, the systems and methods described herein may be used for a variety of purposes, by way of example and without limitation, for machine control, machine locomotion, machine driving, synthetic data generation, model training or updating, perception, augmented reality, virtual reality, mixed reality, robotics, security and surveillance, simulation and digital twinning, autonomous or semi-autonomous machine applications, deep learning, environment simulation, object or actor simulation and/or digital twinning, data center processing, conversational artificial intelligence (AI), generative AI with large language models (LLMs), light transport simulation (e.g., ray-tracing, path tracing, etc.), collaborative content creation for 3D assets, cloud computing and/or any other suitable applications.

Disclosed embodiments may be comprised in a variety of different systems such as automotive systems (e.g., a control system for an autonomous or semi-autonomous machine, a perception system for an autonomous or semi-autonomous machine), systems implemented using a robot, aerial systems, medial systems, boating systems, smart area monitoring systems, systems for performing deep learning operations, systems for performing simulation operations, systems for performing digital twin operations, systems implemented using an edge device, systems incorporating one or more virtual machines (VMs), systems for performing synthetic data generation operations, systems implemented at least partially in a data center, systems for performing conversational AI operations, systems for performing generative AI operations using LLMs, systems for performing light transport simulation, systems for performing collaborative content creation for 3D assets, systems implemented at least partially using cloud computing resources, and/or other types of systems.

Approaches in accordance with various embodiments overcome the deficiencies of existing and conventional approaches by providing methods and systems that use frameworks, which may be based on Weighted Finite State Transducers (WFSTs), to simplify the development of modifications for recurrent neural network transducer (RNN-T) loss. Various embodiments provide a framework that enhances loss determinations to provide improved modeling for different systems, such as conversational AI systems and applications. Furthermore, systems and methods may allow for improved extension and debugging compared to existing implementations.

Embodiments are directed toward RNN-T loss function implementations that may include one or more of an epsilon-transducer (e transducer, ϵ-transducer), a compose-transducer, a grid-transducer, and/or a wild-card transducer (W-transducer). Various embodiments may be used to deploy three graph-based paradigms to implement RNN-T loss and modifications in the WFST framework. Specifically, these paradigms may be associated with the epsilon-transducer, the compose-transducer, and the grid-transducer. For example, the epsilon-transducer may be used to incorporate a theoretical "connection" between a graph-based connectionist temporal classification (CTC) implementation and RNN-T. The compose-transducer may be a composition of two graphs (e.g., a unit schema and a temporal schema) that will result in an RNN-T lattice. The grid-transducer may be a direct construction of an RNN-T lattice, which in various embodiments, provides the same lattice-composition generated by the compose-transducer. Systems and methods using these different paradigms may provide efficient and easy implementations, which may be more evidence in the case of the compose- and grid-transducers discussed herein.

Using the graph-based paradigms may allow for easy extension, modification, and debugging (e.g., visual debugging) implementations of different modifications of RNN-T. For example, the graph-based paradigms visually represent how the RNN-T lattice may be constructed, which may provide for debugging and evaluation prior to running different models, which may reduce costs and time. In various embodiments, one or more training algorithms for an associated neural network may be substantially similar to the training algorithms for an RNN-T. However, the losses and/or gradients may be represented using one or more of graph loss values (e.g., a total probability of reaching final states from the start state), forward score for a state (e.g., a total probability of reaching the target state from the start state), backward score for a state (e.g., a total probability of reaching final states from the target state), and graph gradient (e.g., calculated from forward and backward scores for each state and distributed over the corresponding arcs). Accordingly, systems and methods of the present disclosure may construct a graph in accordance with one or more of the paradigms (e.g., epsilon-, compose-, or grid-transducer), compute a joint tensor, and then compute a log softmax. Additional steps may be dependent on the selected paradigm. For example, with the epsilon-transducer, embodiments may include composition of epsilon-augmented emissions weighted finite state acceptors (WFSAs) with a supervision WFST. Alternatively, for the compose- or grid-transducers, lattices may be populated with associated outputs using the joint tensor and labels on arcs. From there, systems and methods may proceed with executing calculations for the graph, forward/backward scores, loss values, gradients, etc. to compute gradients for neural network weights. The weights may then be adjusted based on training data. In this manner, systems and methods of the present disclosure may use the graph-based techniques in order to implement and train neural networks.

Systems and methods may also be directed toward incorporating the W-transducer described herein. The W-transducer may be used in a weakly supervised setup, such as where the input (e.g., a textual input) is complete, for example, where a start or end of an utterance is missing. The implementation of the W-transducer may incorporate one or more features associated with the compose- and/or grid-transducers, and in one or more embodiments the epsilon-transducer paradigm may also be implemented with the W-transducer. Systems and methods may allow for three different variants of an associated lattice, as described herein. Furthermore, similar training steps as those discussed herein with respect to the graph-based approaches may also be used, with the exception of the lattice construction being different when using the W-transducer.

As discussed herein, one or more of these implementations may be used for training in order to develop loss functions/gradients for various models, such as automatic speech recognition (ASR) models. In at least one embodiment, the epsilon-transducer incorporates epsilon-transitions to emulate blank transitions within a lattice structure. The compose-transducer may remove the epsilon-transitions of the epsilon-transducer to reformulate a lattice in terms of unit and time schema. The schema may be used to generate an empty lattice that can then be populated using activations and log likelihoods. Using the grid-transducer enables construction of a lattice without the use of schema compositions. The W-transducer may implement methods that allow for starting and/or stopping at any location within the lattice. For example, skip conditions may be included that allow skipping along horizontal (time) portions of the lattice without contributing to the loss for a particular sequence. Each of these methods may be incorporated into ASR pipelines to improve training while also reducing coding requirements to simplify debugging operations.

Systems and methods may be used to improve and/or modify existing training, implementation, and deployment techniques for one or more components within an ASR pipeline. Presently, RNN-Ts can be used along with CTC for end-to-end ASR. This approach may allow for alignment-free training by marginalizing over all possible alignments using a special unit, which may be referred to as a "blank" or <blank>. CTC permits repeated language units to indicate unit continuation in the time-frame. For example, when a "blank" is emitted in CTC, the blank corresponds to a special label to indicate that there is no output for a given frame. With RNN-T, only one non-<blank> prediction is emitted per unit with an output of a "blank" unit corresponding to an indication that decoding for a given frame is complete and movement to a next frame should begin. Implementing RNN-T is often challenging due to the extensive coding requirements, which further causes problems with debugging and identification of errors within the code. CTC loss can be naturally represented with WFST because all possible alignments form a lattice on which forward and backward scores are calculated. The lattice can contain epsilon-arcs ("ϵ-arcs" or "<ϵ>-arcs") as representations of virtual arcs without input labels for structural purposes. Various frameworks may be used to accelerate WFST operations using one or more processors, such as a graphics processing units (GPUs), or deep learning accelerators (DLAs), which may improve implementation, increase debugging simplicity, and also provide tools for improved debugging by plotting loss components as a graph.

FIG. 1A illustrates an example environment 100 that can be used to provide such functionality in accordance with at least one embodiment. In this example, the environment is associated with an ASR system 102 (e.g., conversational system), which may further be incorporated into one or more conversational AI systems, among other options. The ASR system 102 may include one or more different subsets of capabilities that may, as a whole, be referred to as the conversational system 102. The illustrated ASR system 102 is used to generate a prediction for an input 104, which may be a variety of inputs such as an audio input, a textual input, a video input from which an audio sequence is extracted, a video or image input from which a textual input is extracted, combinations of inputs, and/or the like. For examples where the input 104 is an audio input, the audio input 104 may be an utterance from a user, an audio clip, an audio portion extracted from a video, or the like. In various embodiments, the audio input may be a converted input or an input that has been processed or otherwise modified, such as an audio clip that has had portions removed. Using the ASR system 102, speech segmentation, acoustic modelling, and language modelling may be used to form a prediction (of sequences of labels) from noisy, unsegmented input data, such as a user utterance.

Systems and methods of the present disclosure may be used with one or more language or speech systems, which may include, without limitation, automatic speech recognition (ASR), speech-to-text (STT), and/or text-to-speech (TTS) systems. While one or more of these systems may be described herein, the descriptions are for illustrative purposes and not intended to limit or otherwise restrict the scope of the present disclosure. By way of example, input 104 may be a textual input, an auditory input, a video input, an image input, or some combination thereof. In various embodiments, the input 104 may be a textual input, such as a phrase or sentence provided by a user, a phrase or sentence extracted from a block of text, a phrase or sentence extracted from an image (e.g., using optical character recognition (OCR)), a phrase or sentence extracted from a frame of a video sequence, a phrase or sentence converted from an audio input (e.g., using a STT technique, a diarization technique, etc.), or the like. The input 104 may be a mixed input, which may include letters, numbers, characters, words, sub-words, symbols, and/or the like. For example, the input 104 may include a combination of letters and numbers, which may further include symbols, punctuation, and the like. It should be appreciated that the input 104 may undergo one or more processing or preparation operations prior to, or as part of, the conversational system 102. By way of example, the input 104 may be received at one or more of a post-processing or a pre-processing engine that may include tokenization, lemmatization, stemming, and/or other processes to prepare the input 104 for evaluation and processing within one or more pipelines.

Embodiments may be used with one or more conversational systems, which may include different processing capabilities to receive the input 104 in the form of an auditory input for an STT pipeline. In at least one embodiment, the STT model may take a verbal input, such as an utterance, and then resample the raw audio signals using one or more signal processing techniques, such as standardization, windowing, and/or conversion, among other options. This processing may allow for spectrogram transformation to provide a machine-understandable version of the utterance. One or more acoustic models may be associated with the STT model to consider a spectrogram as an input and produce probability scores for all different vocabulary tokens over different time steps. In various embodiments, one or more neural language models may then be used to add a contextual representation so that a decoder may output the speech in a textual format. The input may be passed to the STT model for conversion to one or more textual outputs, which may then be post-processed using a post-processing module. In at least one embodiment, one or more machine learning systems, which may be presented in the form of neural language models that are executed using one or more stored parameters may be part of the conversational system to provide the output. The neural language models may form a portion of the pre- and/or post-processing modules. These models may be general purpose models or language specific models that are pre-trained or part of a service that executes using one or more stored parameters, which may be specified or particularized for certain applications.

In at least one embodiment, the TTS model may take a text response generated by the NLU system and change it to natural-sounding speech. It should be appreciated that, in various embodiments, a prosody model may be part of the TTS model. The output from the NLU system may undergo various processes associated with the TTS model, such as linguistic analysis, synthesis, and the like. Additionally, parts of speech may be tagged. In various embodiments, output may be further analyzed for refining pronunciations, calculating the duration of words, deciphering the prosodic structure of utterance, and understanding grammatical information. Additionally, text may be converted to mel-spectograms for output to a vocoder to generate natural sounding speech. As noted above, in various embodiments, the vocoder may be incorporated into the TTS model. Accordingly, an audio output is generated that sounds like human speech.

In this example, the ASR system 102 includes a feature extraction system 106 and an acoustic model 108. Various other systems and models may be incorporated within, or associated with, the ASR system 102. For example, additional pre- or post-processing modules may be included, which are not illustrated here for clarity. In other embodiments, one or more of these components may not be part of the ASR system 102, but may be accessible by or be in communication with the ASR system 102, for example by one or more networks. Moreover, the ASR system 102 may further be integrated into or associated with one or more software developer kits (SDKs) for building speech AI applications, such as Riva from NVIDIA Corporation or with various other deep learning applications, including but not limited to Omniverse from NVIDIA Corporation or DeepStream SDK from NVIDIA Corporation. Additionally, certain features may be integrated into the acoustic model 108, such as one or more decoders.

The ASR system 102 may also be associated with, or used along with, a natural language understanding (NLU) or natural language processing (NLP) system. In embodiments, the NLU and/or NLP system may be used with one or more conversational AI systems to allow humans to interact naturally with devices. The NLU and/or NLP system may be a framework or pipeline that receives, processes, and evaluates different portions of the input 104. For example, the input 104 may be pre-processed and/or post-processed, which may include tokenization, lemmatization, stemming, and other processes, as noted herein, which may be part of or separate from the NLU and/or NLP system. Additionally, the NLU and/or NLP system may include one or more deep learning models, such as a bidirectional encoder representations from transformers (BERT) model (and/or other large language models (LLMs)), to support features such as entity recognition, intent recognition, sentiment analysis, and others. Furthermore, the NLU and/or NLP system may allow for conversion of linguistic units of the input 104 into phonemes, which may then be assembled together, such as by using one or more prosody models.

In at least one embodiment, the feature extraction system 106 may be used for audio signal preprocessing using normalization, windowing, and/or the like. The feature extraction system 106 may also be used to split or otherwise segment different portions of the input 104. For example, feature extraction may include splitting or otherwise dividing the audio input into one or more frames (e.g., time frames), where each frame may correspond to a portion of the audio input such that a set of frames (1) forms a total number of frames (7) corresponding to the audio input and/or to a particular portion of the audio input.

In this example, the acoustic model 108 is an RNN-T. The RNN-T may include an audio encoder to encode sequences of audio features into audio embeddings. In at least one embodiment, long short-term memory (LSTM) or bi-directional long short-term memory (B-LSTM) transformers are used as audio encoders. The RNN-T may also include a text predictor to encode a transcript into a text embedding. The text predictor may also use an LSTM. A joiner may be used to combine the output of both the audio encoder and the text predictor for further processing at a linear layer followed by a softmax to produce a probability distribution over output units.

As shown, results of the ASR system 102 are provided to a decoder 110 that may use features from a language model 112 to generate an output 114, which may include a textual output corresponding to the audio input 104. In this manner, a user may interact with a computer system by providing an audio utterance which can be converted to a textual input for downstream use, such as use within a different system of the NLU or NLP system, or provided back to the user for review as a textual output.

Various embodiments of the present disclosure modify one or more portions of an RNN-T in order to implement one or more WFST frameworks to simply the development, modification, and deployment of RNN-T loss. As described herein, the WFST may be visualized as a probability representation (e.g., lattice) to output probabilities or confidences for a set of characters, symbols, phonemes, etc. The lattice may be defined as an acyclic WFST, which may be a deterministic WFST. A WFST may be deterministic if there is a unique start state, no two transitions from a state share the same input label, and there are no epsilon input labels. To determine a loss using WFST, the lattice may be traversed using one or more methods in order to compute forward and backward scores (as well as the loss value and gradients), such as by applying the Baum-Welch algorithm to the lattice. In one example, maximum likelihood (ML) based loss functions may be used with alignment-free ASR tasks, such as CTC, which may be represented as negative forward scores of the following WFST composition:

$$\mathrm{Loss}_{ml}(X, Y) = -Fwd\ (\varepsilon_{ml}(X) \circ (\mathcal{T}_{ml} \circ \mathcal{Y}(\mathrm{Y})))$$

where $\varepsilon_{ml}(\mathrm{X})$ is an Emissions graph over the log-probabilities tensor X, $\mathcal{T}_{ml}$ is a loss Topology, and $\mathcal{Y}(\mathrm{Y})$ is a linear graph of the target unit sequence (unit graph). Both Emissions and Topology graphs may be loss specific. Furthermore, $\mathcal{T} \circ \mathcal{Y}$ may be represented as an Alignment graph A, and $\epsilon \circ \mathrm{A}$ is a training Lattice $\mathcal{L}$.

Figure 1B:
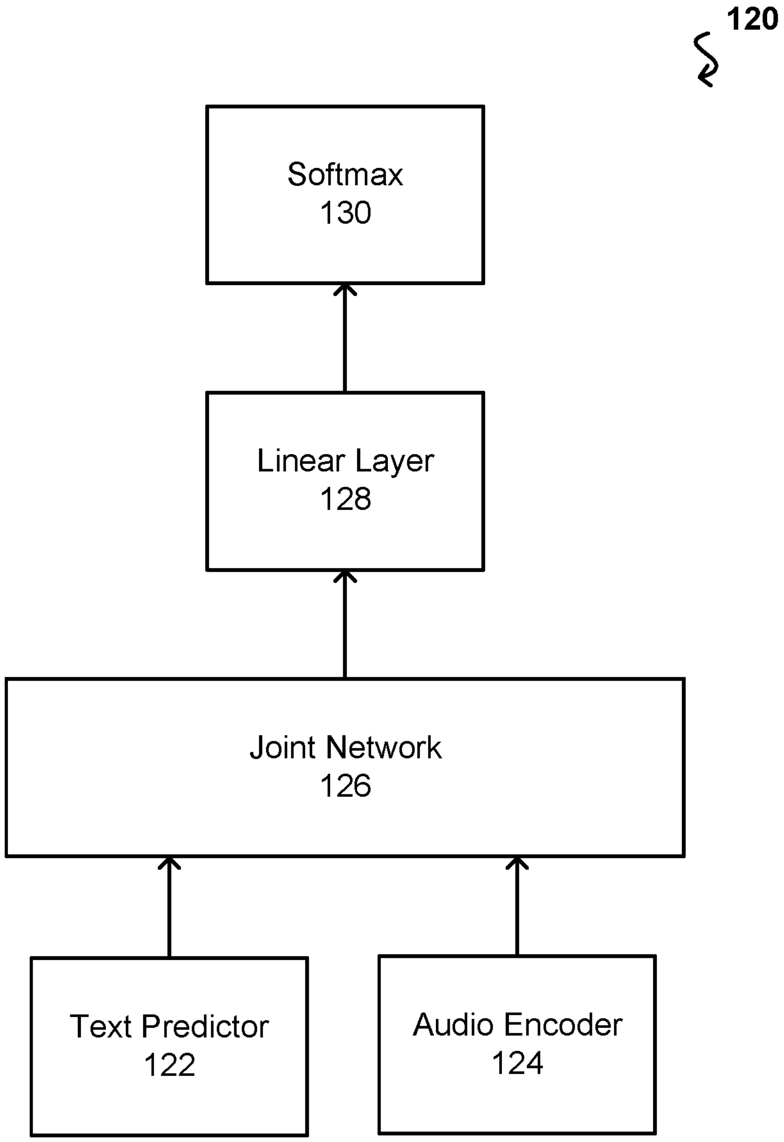
FIG. 1B illustrates an example framework for a recurrent neural network transducer, according to at least one embodiment.

An RNN-T model consists of an acoustic encoder, a decoder (which may be referred to as a label encoder), and a joint network (also referred to as a joiner). The acoustic encoder converts the input acoustic features into a higher-level representation, and the decoder converts the history context information at the label side. The joint network combines the output of the encoder and the decoder and outputs a probability distribution over the vocabulary and the one or more blank-related tokens. FIG. 1B illustrates an example framework 120 of an RNN-T including a text predictor 122 and an audio encoder 124. The joint network 126, as noted herein, may combine the outputs of both the text predictor 122 and the audio encoder 124 for further processing, for example using a linear layer 128 and a softmax layer 130 to generate a probability distribution over output units. In one or more embodiments, the probability may be considered by $\Pr(k|t, u)(P^{k}_{(t,u)})$ as representing the probability of emitting "k" from (t, u).

In this example, the RNN-T may be an end-to-end model that may not need alignment information during training of the model. In the RNN-T framework, a number of blank labels is equal to the number of frames, but the position of the blank labels can be different in different alignments. If the blank is the only label emitted on a given frame, then that given frame may be non-meaningful, silent, etc. During RNN-T model training, for any input sequence, the model may try to maximize the probability sum over all augmented sequences of the correct labels. A final layer of the RNN-T model may output the probability distribution over the character, word, sub word, phoneme tokens, etc., as well the blank-related tokens. In this way, when an output is a blank token, a component that prepares the input for the RNN-T model may determine which frames of the input audio to skip and which frame to input to the model next.

Figure 1C:
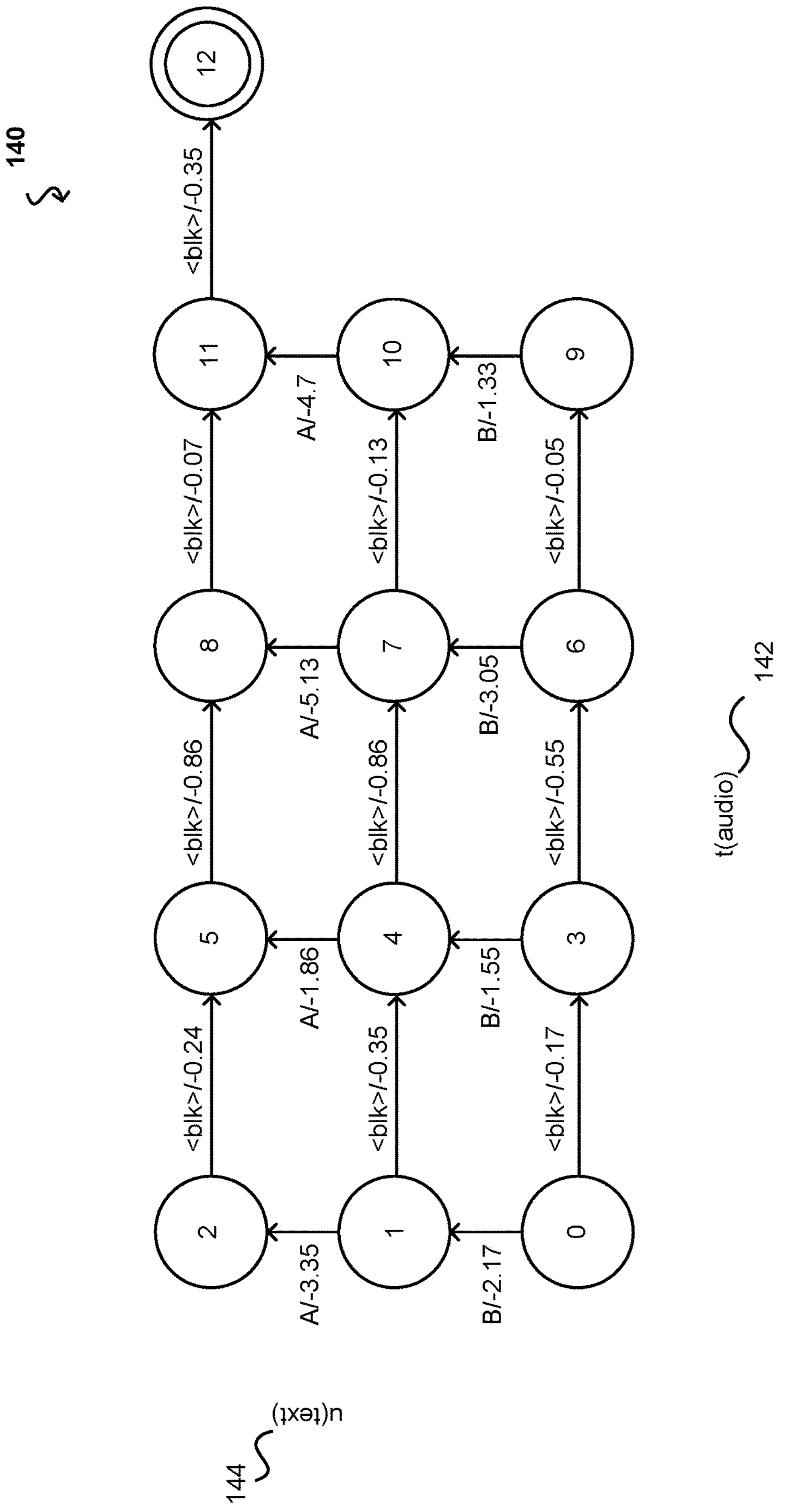
FIG. 1C illustrates an example representation of a probability lattice, according to at least one embodiment.

FIG. 1C illustrates an example probability lattice 140 corresponding to a training sequence for an RNN-T. In this example, the lattice 140 is a 4-frame long utterance "B A," but such an utterance is provided by way of example only for clarity with the present disclosure. The utterance may be longer, may be based on phonemes, sub-words, etc., and/or may have different probabilities, among other features. In this example, the lattice 140 includes a set of frames 142 (four in this example) along the x-axis, labeled as t. Additionally, a number of output units (u) 144 are positioned along the y-axis. The numbering shown is for clarity with the present discussion and is not intended to label or otherwise identify different nodes within the lattice. For example, the bottom left node is shown as "0," but could be any other number. Furthermore, the illustrated lattice 140 is a 3×4 lattice, but any number of frames or output units may be used with various embodiments and the 3×4 lattice is provided only as an example.

As noted, the audio input for this example is "B A" and is broken down into output units for [B] and [A], where [B] corresponds to the middle row and [A] corresponds to the top row, with the bottom row being a null state prior to any auditory emissions. Moving vertically (up the rows along the columns) indicates an emission, while moving horizontally (between the columns along the rows) indicates a blank emission, which are often present between different letters or sounds in utterances. For example, a letter or phoneme may be predictable after only a portion is heard, and therefore, the remaining frames after that prediction, or between predictions, may be referred to as a "blank" or <blank>. Blanks may not only refer to pauses or no sounds, but may also include frames with sounds that do not differ (at least significantly) from or change a prediction associated with a previous frame The output units represent probabilities that a given letter, sub word, sound, phoneme, etc. is at a particular position. For example, in this case, the output unit at node 1 is the probability that [B] is emitted at the given frame associated with node 0. As shown, different paths (e.g., arcs) are labeled as: Output/Cost. Accordingly, a path along 0→1→4→5→8→11→12 would have an associated cost of (−2.17)+(−0.35)+(−1.86)+(−0.86)+(−0.07)+(−0.35)=−5.66. In operation, it may be desirable to find the cheapest/least costly path. For example, a path along 0→3→6→9→10→11→12 would have an associated cost of (−0.17)+(−0.55)+(−0.05)+(−1.33)+(−4.7)+(−0.07)+(−0.35)=−7.22, and as a result, the previously identified path may be preferred. During training, the system learns a path through the lattice to move from 0 to 12. A loss function may be used to try and shorten or otherwise find a most-efficient path through the lattice.

In certain embodiments, a forward-backward algorithm is incorporated with an RNN-T that includes both forward weights (α) and backward weights (β) (which may also be referred to as costs), which are represented as:

$$\alpha(t, u) = \alpha(t-1, u)\phi(t-1, u) + \alpha(t, u-1)y(t, u-1)$$

$$\beta(t, u) = \beta(t+1, u)\phi(t, u)) + \beta(t, u+1)y(t, u)$$

The forward weights correspond to the sum of all possible paths to get to a given point in the lattice from the start. The backward weights correspond to all possible paths from a given node to the end. For example, given the node 7 in the lattice, the forward weights would evaluate the possible paths from 0 to 7, which may include paths such as 0→3→6→7. Another path may include 0→1→4→7. The backward weights would then evaluate the possible paths from 7 to 12, which may include paths such as 7→8→11→12, among other options. In this manner, the RNN-T may incorporate the WFST paradigm.

Embodiments of the present disclosure may present improved paradigms for different WFST arrangements that may be used with RNN-Ts. Traditional models may be large and complex, which causes problems with debugging and also speed at run time. Additionally, as search spaces increase, memory use also increases, thereby further reducing efficiencies and increasing costs. This problem may be further exacerbated as language models become larger and/or more sophisticated. Various embodiments of the present disclosure address these problems, among others, by simplifying development of modifications to RNN-T loss. These improvements may be easier to code, easier to debug, and also provide improved results, while providing benefits associated with faster processing and reduced memory use.

In at least one embodiment, systems and methods may deploy an epsilon-transducer to form the RNN-T associated with WFST models. These models may define Emissions ε and Topology $\mathcal{T}$ graphs. In operation, attempting to define these models may be difficult with traditional documentation and software systems, such as k2 and Kaldi. Systems and methods address these problems by adapting RNN-T output log-probabilities tensors to fit the ε abstraction in every framework. For example, audio and text dimensions T and U from a tensor are squeezed into one T*U. Next, blank behavior is emulated (e.g., by moving past (to a subsequent frame) with epsilon-transitions (<ϵ>-transitions). As a result, the Alignment graph may be reformulated such that:

$$\mathcal{A}^{(\epsilon)}_{rnnt}(Y) = \mathcal{D}^{(\epsilon)}(Y)\circ((\mathcal{T}_{rnnt}\circ\mathcal{Y}(Y)))$$

where $\mathcal{D}^{<\epsilon>}(Y)$ is an RNN-T <ϵ> emissions adapter.

In various embodiments, adapters are specific to the U length. Because <ϵ>-transitions of $\varepsilon_{rnnt}(X)$ are either virtual or attached with a probability of one, lattice scores are not affected and therefore, neither are the losses and gradients. As a result, a mathematical equivalent is provided to classical RNN-T models for training and forced alignment tasks. Moreover, the epsilon-transducer described herein can be customized for a variety of tasks.

Figure 2:
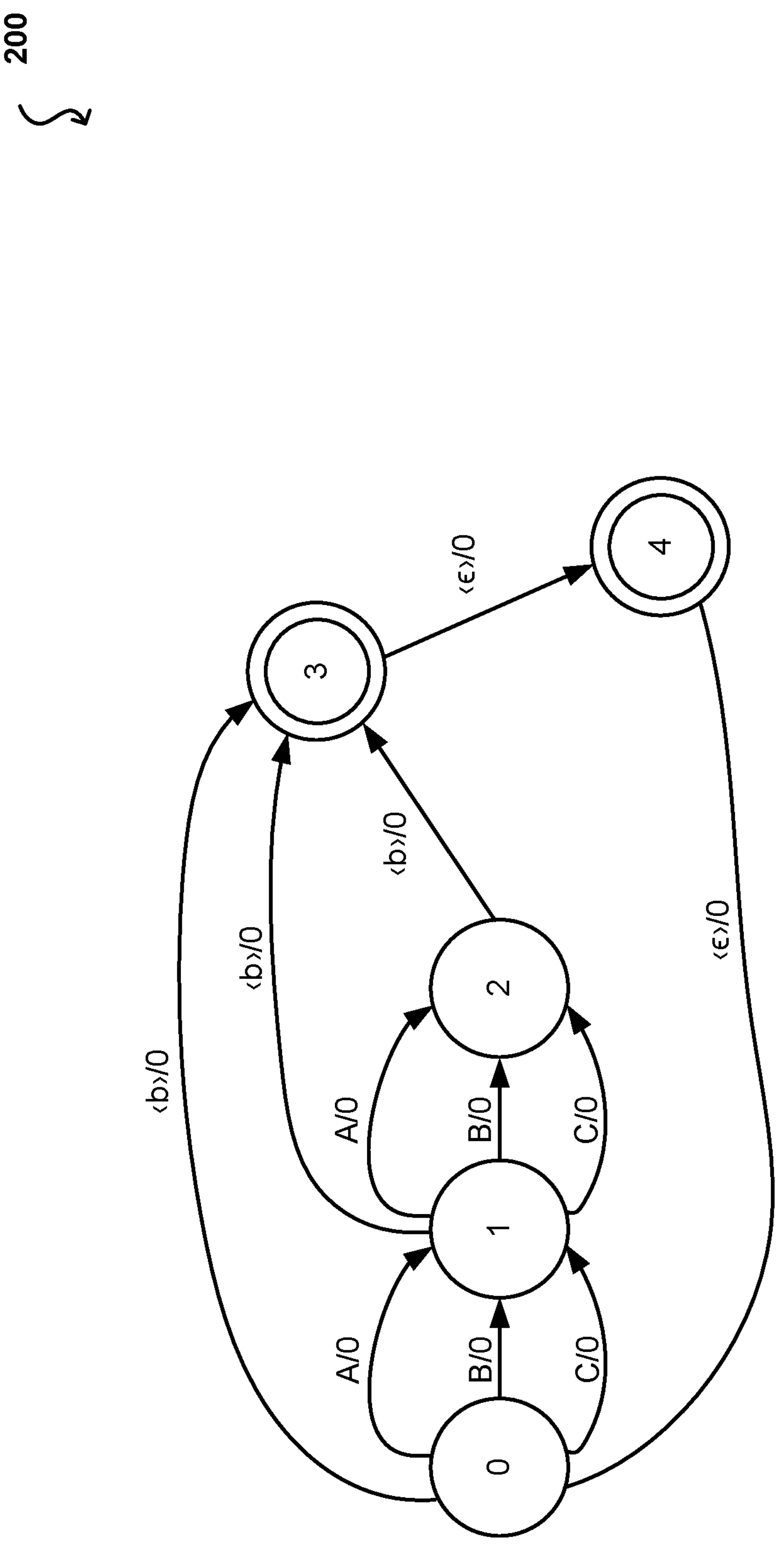
FIG. 2 illustrates an example representation of an epsilon transducer adapter, according to at least one embodiment.

FIG. 2 is a representation 200 of an epsilon-transducer adapter that may be used with embodiments of the present disclosure. In this example, the nodes are identified by reference numbers 0, 1, 2, 3, and 4, but such identification is provided for ease with the follow discussion and not intended to limit the scope of the claims, as various embodiments may include more or fewer nodes. In this example, the emission adapter $\mathcal{D}^{<\epsilon>}(Y)$ is used for a two-unit utterance with a vocabulary of four, which is identified as <b> (the blanks), [A], [B], and [C]. In other words, at each node, the model is associated with a probability that one of the four vocabulary items will be emitted. As shown, different paths (e.g., arcs) are labeled as: Output/Cost. Accordingly, a path represented as A/0 will correspond to a final cost of 0 on state A. Additionally, arcs may further include both the blank space and also the introduced epsilon, which may represent no symbol.

In this example, the adapter accepts [A] with zero cost. Similarly, each of [B], [C], blanks, and <ϵ> have zero costs. By using the <ϵ>-transitions, systems and methods cause the adapters to emulate the temporal behavior of the desired emissions WFSA. In operation, these states may be updated with associated costs in order to identify a cheapest or lowest cost path through the adapter. The illustrated adapter could be used to model a lattice, such as the lattice of FIG. 1C. For example, the lattice of FIG. 1C may be viewed as the result of an intersection (composition) of two graphs: a graph representation of a target text (e.g., supervisions WFST (weighted finite state acceptor (WFSA)) and a graph representation of a neural network output (emissions WFSA). As noted above, traditional systems may not have the capability to conceptually represent emissions WFSA, which makes straightforward implementations difficult or unrealistic. Systems and methods of the present disclosure address this problem with special adapters, such as the emission adapter $\mathcal{D}^{<\epsilon>}(Y)$, composed of supervisions WFSTs. The "adapted" supervisions WFSTs, when composed with CTC emissions WFSAs, may produce lattices that give forward and backward scores as if they were built with theoretical RNN-T emissions WFSAs. Because of the problems with implementation, such as using k2 with respect to emissions WFSA, lattice calculations may be revised and/or reformed by reshaping the log-probabilities sensor. For example, as noted herein, the original tensor may be a four-dimensional (4D) tensor. By adjusting the tensor to a three-dimensional (3D) tensor by combining T and U as T*U, the tensor is converted from (B, T, U, D) to (B, T*U, D). Additionally, as shown in the representation, systems and methods may also include the <ϵ> emission with a log probability of 0 to the tokens of the emissions WFSA. As a result, systems and methods may include the adapter WFSAs composed of supervisions WFSTs before the composition with the emissions WFSA.

Various embodiments may describe the epsilon-transducer as systems and methods of constructing a desired lattice to obtain loss with WFST. Instead of merely following a CTC pipeline, as done with present technologies, at least one embodiment adds additional steps and/or modifies a CTC pipeline via tensor reshaping, additions of epsilon outputs with log-probabilities of zero, incorporation of the emission adapter, and composing adapters with alignment WFSTs.

Various embodiments may also, or alternatively, implement one or more compose-transducers to form the RNN-T associated with WFST models. These models may further simplify operations, enabling faster processing and smaller models that use less memory. In at least one embodiment, systems and methods are used to generate empty lattices and then filling/populating those lattices with the appropriate outputs. For example, as noted herein, calculating the RNN-T lattice $\mathcal{L}$ as $\Sigma \circ A$ removes unnecessary arcs from E, but does not address the use of explicit ϵ. Accordingly, systems and methods may reformulate the lattice calculation such that:

$$\mathcal{L}_{rnnt}(X, Y) = \text{Populate}(S_{time}(X) \circ S_{unit}(Y), X)$$

where $S_{time}(X)$ is a temporal RNN-T Scheme and $S_{unit}(Y)$ is a target unit sequence RNN-T Schema.

In at least one embodiment, the schemas for the compose-transducer have additional labels beside input and output labels, such as those seen with the epsilon-transducer. By way of example, $S_{time}$ may be formulated with time-frame indices and $S_{unit}$ may be formulated with unit indices. Moreover, in at least one embodiment, $S_{unit}$ may be substantially equivalent to $\mathcal{A}_{rnnt}$ with added unit indices. These labels may then all be mapped, for example using k2, from composition components to the resulting WFST, which allows the indices to be used to populate the arcs of $S_{time} \circ S_{unit}$ with the corresponding log probabilities of X.

Accordingly, systems and methods of the present disclosure may be used to develop one or more executable algorithms to generate one or more lattices for population with selected outputs. Various embodiments may include lattice construction, where each arc of the lattices includes indices of a text unit, a unit id, and a time. A joint tensor may then be obtained and a log softmax may be computed (with a variety of different precisions, such as fp16, bf16, fp32, etc.) to populate lattices with selected outputs via vectorized code. Thereafter, operations may be executed to calculate scores, such as by evaluating forward/backward algorithms, loss values, gradients, and the like.

Figure 3:
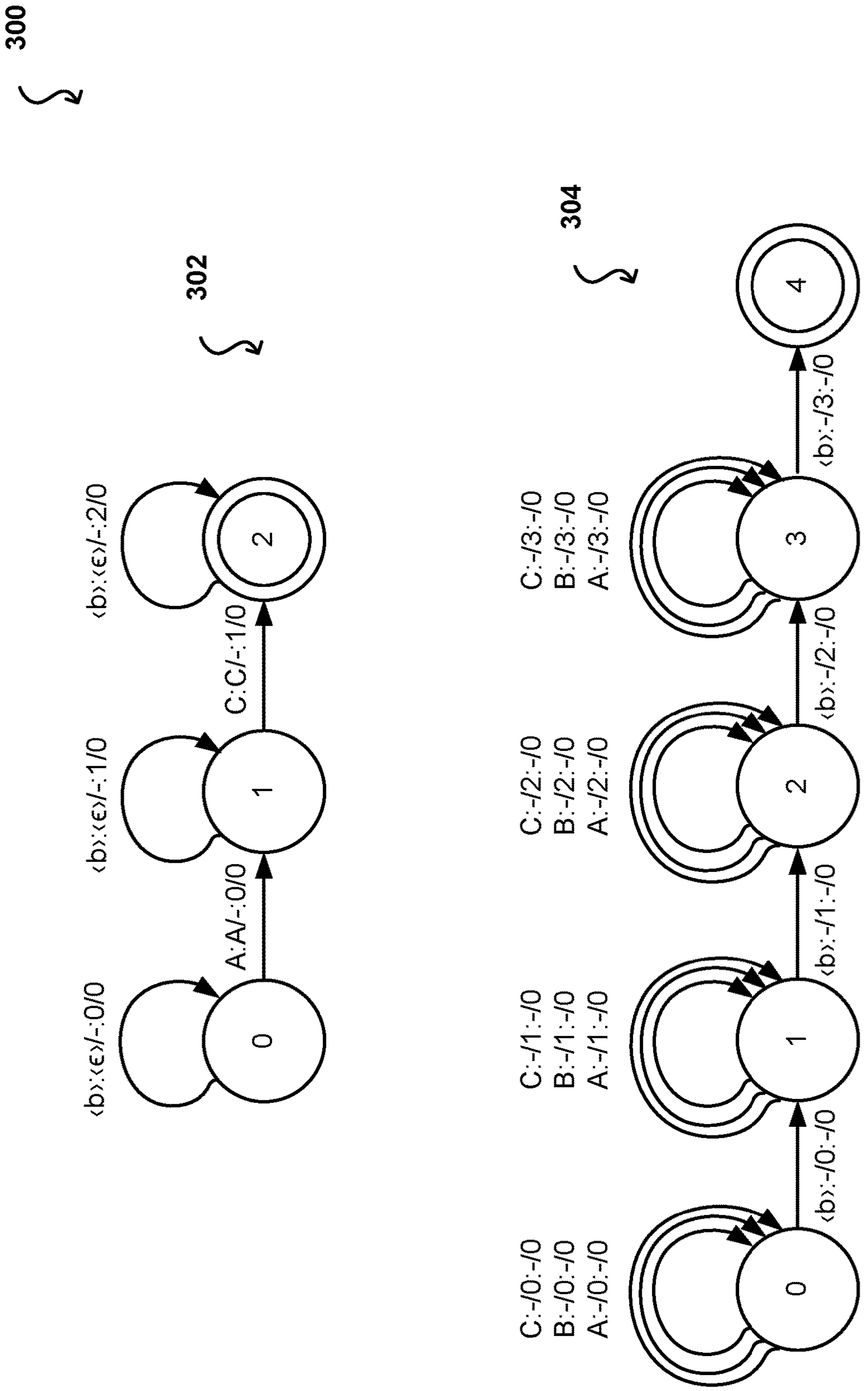
FIG. 3 illustrates an example representation of a compose transducer, according to at least one embodiment.

FIG. 3 is a representation 300 of a compose-transducer that may be used with embodiments of the present disclosure. In this example, the nodes are identified by reference numbers 0, 1, 2, etc., but such identification is provided for ease with the follow discussion and not intended to limit the scope of the claims, as various embodiments may include more or fewer nodes. Unlike the lattice of FIG. 1C, various embodiments decompose the lattice into smaller parts, which may be referred to as schema or schemes. For example, a temporal RNN-T scheme may incorporate timestamp indices and an audio length while a unit sequence RNN-T scheme may be an alignment WFST with unit indices. These indices are then used to populate the lattice, with timestamp indices for a Taxis, unit indices for a U axis, and input labels for a V axis.

A unit schema 302 and a time schema 304 are illustrated for an utterance "A C" with a vocabulary of four identified as <b> (the blanks), [A], [B], and [C]. In other words, at each node, the model is associated with a probability that one of the four vocabulary items will be emitted. As shown, different paths (e.g., arcs) are labeled according to input output/time: unit idx/weight. Additionally, omitted symbols are represented by "-." As an example, a first arc from node 0 to node 1 of the unit schema 302 corresponds to an input of A, an output of A at an omitted time, a unit index of zero, and a weight of zero. Accordingly, for the utterance "A C" there are only two possible units (e.g., A at position 1 and C at position 2) along with the initial zero position (e.g., node 0) prior to the initial emission. With respect to the time schema 304, different emission possibilities are shown at each frame, which in operation, will be populated with different values for the output, unit index, and weight. In at least one embodiment, these schemas 302, 304 may be used to reduce and/or eliminate the use of the epsilon-transitions. As a result, an associated lattice (such as the lattice in FIG. 1C) may be reduced, thereby providing a more modular, customizable, smaller, and faster model. For example, the schemas 302, 304 may be composed together to represent an RNN-T lattice and the "missing" labels will be populated in accordance with the operation.

As discussed herein, one or more indexes may be used to virtualize dimensions of the joint tensor. That is, the dimension T*U may be indexed. The two schemas 302, 304 may be composed to develop a blank lattice (at least structurally) that is than populated with one or more indices, for example based on output tensors from one or more neural networks. Compared to the epsilon-transducer, which does not require explicit filing of the lattice because the epsilon-transducer lattice is filled by design because of the transformation of the output of a dimensional tensor into the emissions graph, the compose-transducer seeks to reduce the size of the lattice to provide improvements in both memory use and storage requirements. Accordingly, composing the two schema 302, 304 enables building of the lattice equivalent and then filling the lattice with the appropriate indices. Systems and methods of the present disclosure develop a differentiable lattice and then loss may be computed. Therefore, after the lattice is filled, the forward backward algorithm may be executed to determine losses.

Various embodiments may further improve existing systems and methods through implementation of a grid-transducer. For example, an RNN-T lattice is generally represented as a rectangular grid with temporal and target unit sequence axes. As shown in FIG. 1C, embodiments may represent the temporal axis as the horizontal and the unit axis as the vertical. Based on that representation, every horizontal arc is (blank) and each column of arcs is the same. Advantageously, this regular structure allows for direct lattice construction instead of the schemas composition, as noted herein. Accordingly, systems and methods that deploy a grid-transducer may provide a more efficient implementation that reduces coding requirements, thereby simplifying debugging and review. These operations may be implemented in vectorized operations, such as from Pytorch tensors, to provide further improvements in operation.

Accordingly, systems and methods of the present disclosure may be used to compose the compose-transducer described herein directly in code and convert the composition to one or more desired frameworks. Because the structure of the lattice is known, the use of schemas may be avoided, and therefore the need for composition, which may improve efficiency with both generation and execution.

Figure 4A:
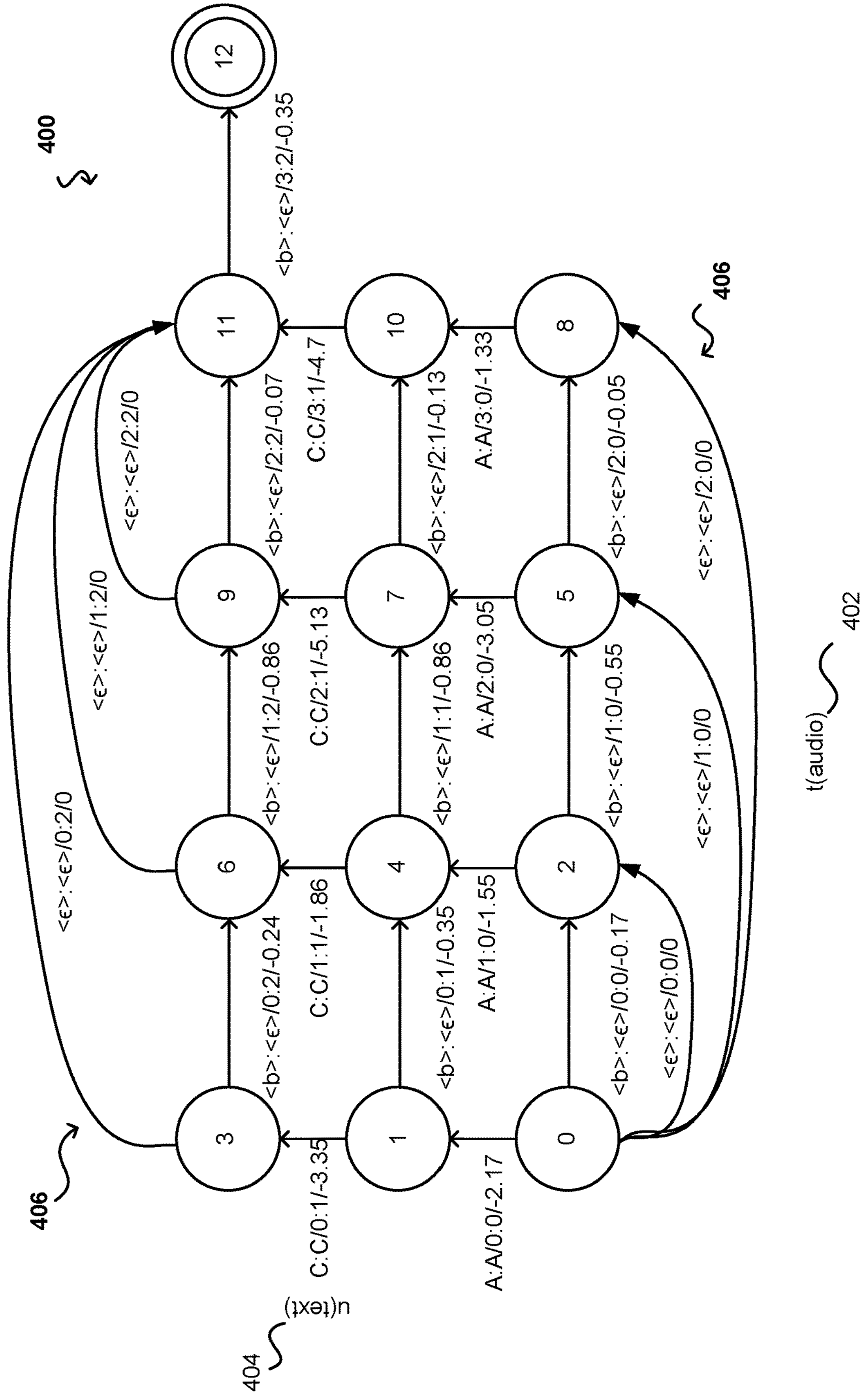
FIG. 4A illustrates an example representation of a W-transducer, according to at least one embodiment.

FIG. 4A is a representation 400 of a lattice $\mathcal{L}$ corresponding to a W-transducer, which may be incorporated or used with embodiments of the present disclosure. In weakly supervised learning, a target unit sequence is incomplete, leading to a partial alignment problem. Additionally, other factors may also lead to a weakly supervised learning setup. For example, it may be challenging to map the audio sequence to a unit sequence in which the target sequence is a sub-sequence. As noted herein, one framework used with ASR is CTC, which may be expanded by introducing one or more wild cards, which may be referred to as Wildcard CTC (W-CTC). The introduction of the wild cards partially addresses the alignment problem by training the model on a data with untranscribed beginnings and ends of the utterance. W-CTC further introduces an optional virtual symbol, the wild card, which may be represented as "*", at the beginning of the sequence. The per-frame probability for the wild card is the sum of all unit probabilities. Therefore, the loss does not penalize the model for any inference. This allows for skipping (not forcing <blank> emissions), which may be particularly useful in certain situations such as starting or ending frames. Additionally, the forward-backward algorithm is also allowed to terminate immediately after aligning the partial target sequence and thus not force <blank> emissions in the remaining frames.

As shown, instead of sequentially iterating over wild card frames, embodiments of the present disclosure allow the algorithm to begin from any frame by introducing skip-frame connections, labeled as <ϵ> arcs in FIG. 4A. These arcs have a probability of one from the initial state to any state before non-<blank> emissions. Embodiments of the present disclosure may further extend the W-CTC concept for incorporation with RNN-T loss, as discussed herein.

The ability to terminate immediately after the partial alignment can also be implemented with skip-frame connections. However, with RNN-T models, at least one <blank> unit is required after all units are emitted. To ensure this rule, the "final" skip-frame connections, introduced after language units emission, point to the previous-to-final state (node 11 in FIG. 4A). In FIG. 4A, the lattice includes a horizonal axis 402 representative of time and a vertical axis 404 representative of units, similar to the arrangement illustrated in FIG. 1C. In this example, a four-frame utterance of "A C" is illustrated. While embodiments discussed herein may refer to input utterances, systems and methods may be applicable to both speech translation and speech-to-speech tasks. As noted herein, the nodes are identified by reference numbers 0, 1, 2, etc., but such identification is provided for ease with the follow discussion and not intended to limit the scope of the claims, as various embodiments may include more or fewer nodes. In this example, skips are provided and represented by arcs 406, which are denoted by <ϵ> and include zero weight/cost. As a result, from certain nodes, skipping is permitted without cost to the path. However, as shown, the skipping is not included at each node, but rather, at particularized nodes have one or more specific features. For example, the starting node 0 includes skips 406 to any of the other frames represented by node 2, node 5, and node 8. This may correspond to silence at the start of an audio segment, for example. Additionally, skips 406 are also provided at the "ends" of columns after both [A] and [C] have been emitted, thereby reducing the cost for forcing blanks for the remaining frames. This may correspond to silence at the end of an audio segment, for example. In this manner, path costs may be more accurately determined because blanks are no longer forced.

Figure 4B:
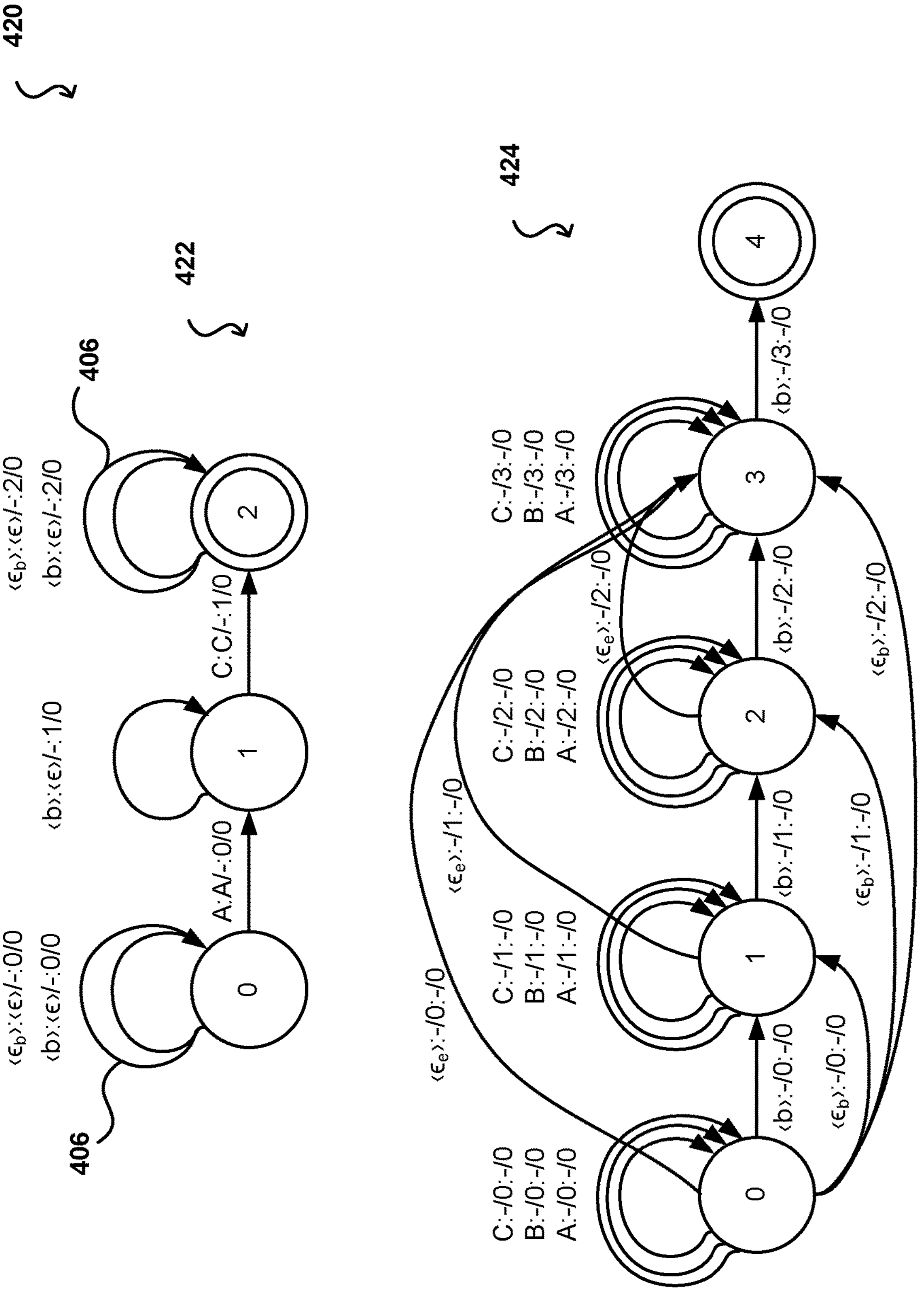
FIG. 4B illustrates an example representation of a compose W-transducer, according to at least one embodiment.

FIG. 4B is a representation 420 of a W-compose-transducer, which may be used with embodiments of the present disclosure and may incorporate one or more features discussed herein with respect to FIG. 3. In this example, lattice schemas are provided, including a unit schema 422 and a time schema 424. As noted with respect to FIG. 4A, an additional skip connection represented by <ϵ> arcs may be included at node 0 (e.g., the start) of both the unit schema 422 and the time scheme 424. Starting with the unit schema 422, the skips 406 enable the schema to not penalize a path by no longer forcing a blank, but rather, adding the skips 406 for a given unit. In certain embodiments, skips may be weighted, but in this example there are no weights added. Similarly, with respect to the time schema 424, the skips 406 allow movement along the frames, such as to the frame shown as node 2, without penalization for using skips 406 rather than emitting blanks. As noted, these schema 422, 424 may be composed to represent the lattice 400 and then "missing" labels may be populated based on gradient outputs from a neural network.

Figure 4C:
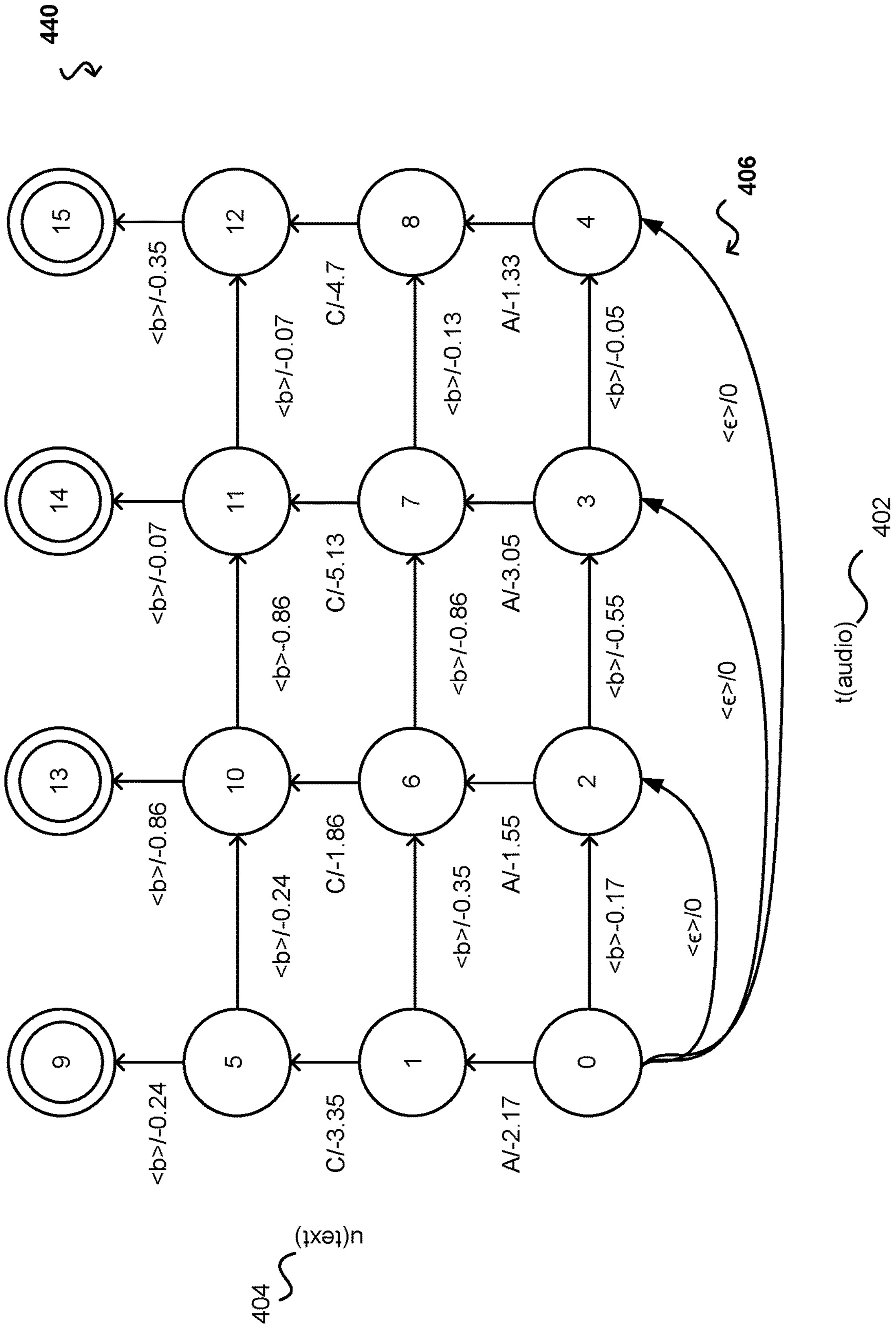
FIG. 4C illustrates an example representation of a W-transducer, according to at least one embodiment.

FIG. 4C is a representation 440 of a W-transducer, which may be used with embodiments of the present disclosure. In this example, multiple skips 406 have been removed, illustrating how once emissions end, a final blank is forced to an end state. In this example, a three-frame utterance of "A C" is illustrated, similar to the embodiments of FIGS. 4A and 4B. As noted herein, the nodes are identified by reference numbers 0, 1, 2, etc., but such identification is provided for ease with the follow discussion and not intended to limit the scope of the claims, as various embodiments may include more or fewer nodes. In this example, skips 406 are provided and represented by arcs, which are denoted by <ϵ> and include zero weight/cost. The illustrated skips 406 are associated with the time axis 402, which eliminates the use of blanks for pauses or the like. For example, if the first frame is blank because there have not been any emissions, rather than penalizing the path by adding a negative weight for forcing a blank, systems and methods allow the skip connection to move to the next frame (e.g., node 2) without cost.

Embodiments of the present disclosure further simplify and arrangement of the lattice by removing the skip connections at the "ends" of each column, as shown in FIG. 4A. As noted, once emissions are complete, systems and methods that incorporate the W-transducer may skip to the next-to-last frame prior to emitting a blank at the final state. In this example, final states are defined (e.g., node 9, node 13, node 14, node 15) at the end of emission with each frame with an associated cost for a blank. The configuration eliminates the use of the additional skip connections, with the cost of added some additional end states.

Figure 5A:
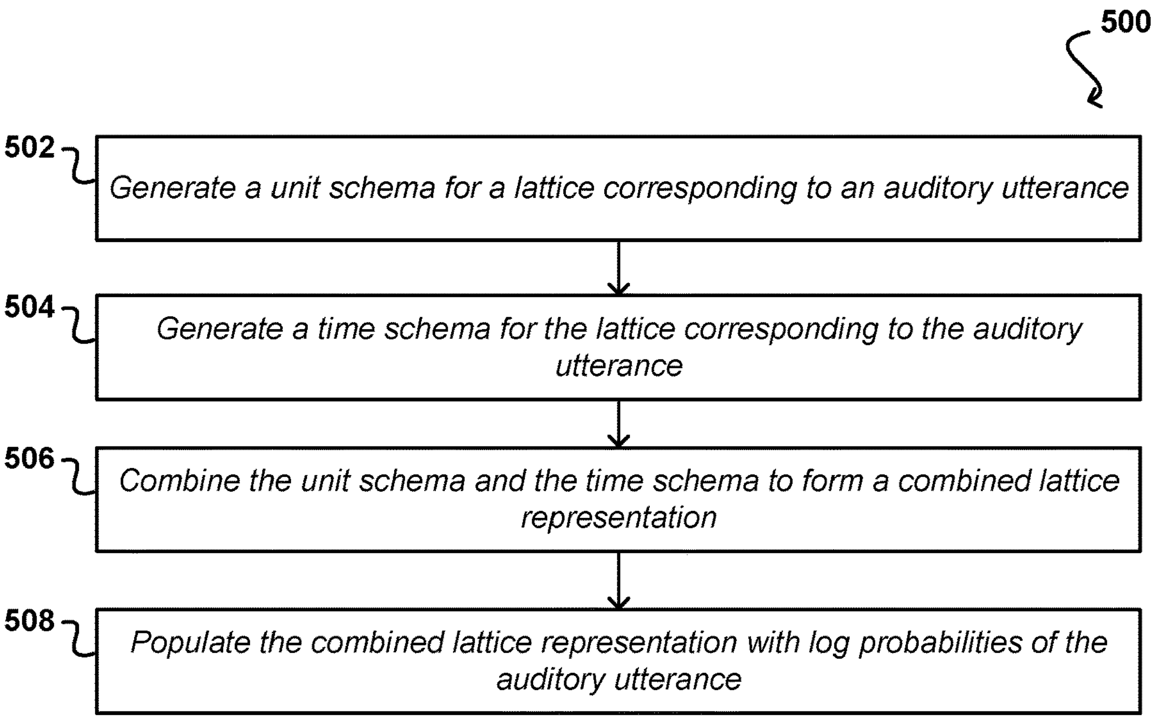
FIG. 5A illustrates an example flow chart of a process for populating a lattice representation, according to at least one embodiment.

FIG. 5A illustrates an example process 500 for generating a lattice for training one or more networks. It should be understood that for this and other processes presented herein that there can be additional, fewer, or alternative operations performed in similar or alternative order, or at least partially in parallel, within the scope of various embodiments unless otherwise specifically stated. In this example, a unit schema is generated for a lattice representation of an auditory utterance 502. The unit schema may correspond to an alignment WFST with unit indices, as described herein. In at least one embodiment, a time schema (e.g., temporal schema) may also be generated for the lattice representation of the auditory utterance 504. Both of the time schema and unit schema may be associated with the utterance, with the time schema incorporating timestamps indices for the audio length.

The schema may be representative of various paths to generate an utterance with a given vocabulary, which may include arcs or paths between different nodes, as described herein. The arcs may be labeled to indicate various features of the arc, such as input and output conditions, time stamps, unit index, and/or weights. In at least one embodiment, one or more omitted labels may be incorporated into the respective schema, which may permit generation of blank lattices that can then be populated with desired outputs. In at least one embodiment, the unit schema and time schema are combined to form a combined lattice representation 506. The combined representation may be mathematically equivalent to one or more lattices and may, in certain embodiments, include one or more omitted labels. Systems and methods may then populate the combined lattice representation with log probabilities of the auditory utterance 508. In this manner, the schema composition may leverage the knowledge of lattice configurations to form blank lattices that can be rapidly populated for a given auditory input.

Figure 5B:
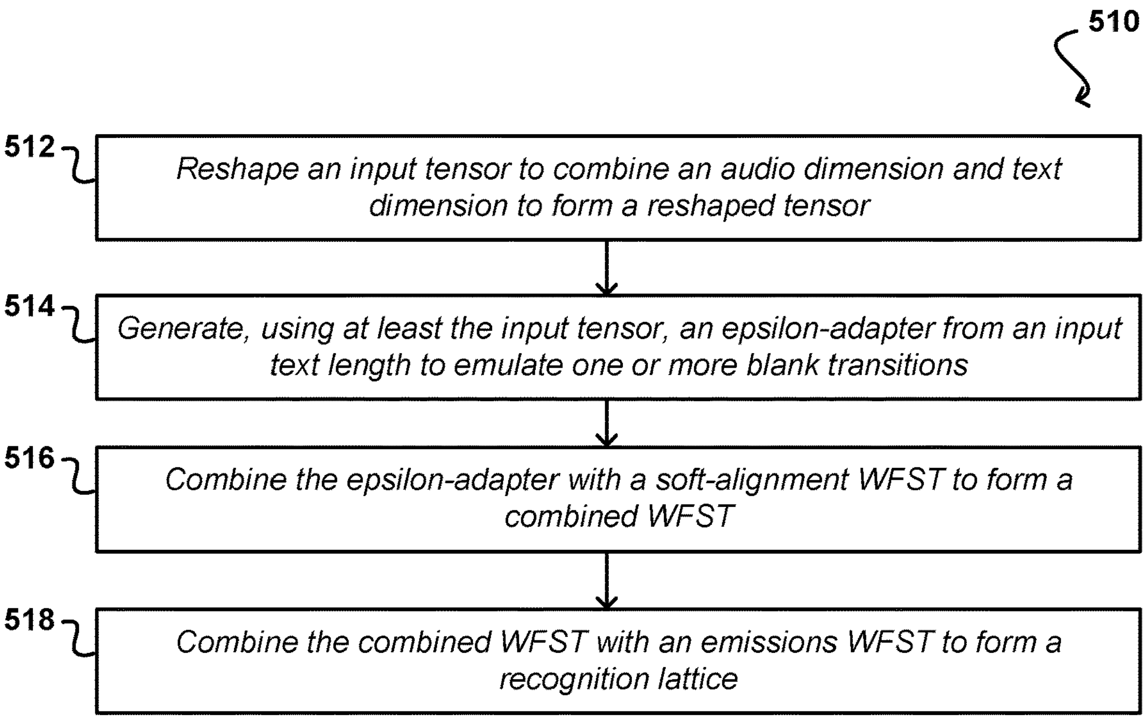
FIG. 5B illustrates an example flow chart of a process for generating a recognition lattice, according to at least one embodiment.

FIG. 5B illustrates an example process 510 for generating a recognition lattice. In this example, an input tensor is reshaped from a 4D tensor to a 3D tensor 512. For example, an audio dimension and a text dimension may be "squeezed," such as converting T and U to T*U, as described herein. Using at least the reshaped tensor, an epsilon-adapter may be generated for an input text length 514. The epsilon-adapter may include one or more blank transition emulations. For example, in at least one embodiment, the epsilon-adapter includes one or more arcs with an epsilon emission that has a resulting zero weight (although various embodiments may include different weights or costs for epsilon emissions). The epsilon-adapter may be combined with a soft-alignment WFST to from a combined WFST 516. Thereafter, the combined WFST may be combined with an emission WFST to form a recognition lattice 518.

Figure 5C:
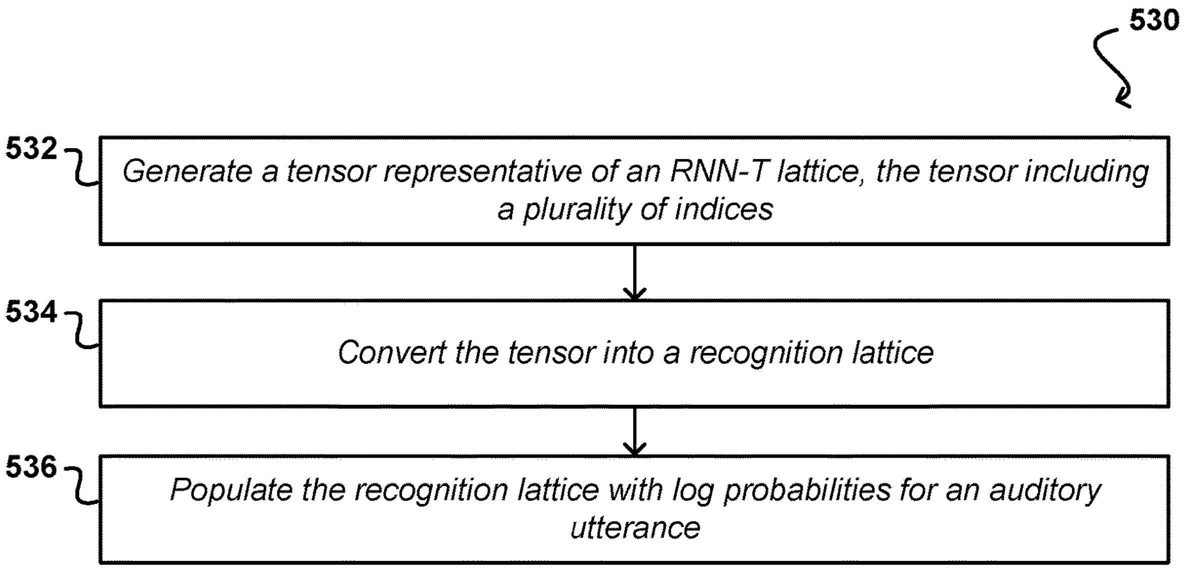
FIG. 5C illustrates an example flow chart of a process for populating a recognition lattice, according to at least one embodiment.

FIG. 5C illustrates an example process 530 for generating a recognition lattice. In this example, a tensor is generated for an RNN-T lattice 532. In at least one embodiment, the tensor is a 3D tensor that includes indices for time, unit, and vocabulary. The tensor may be converted into a recognition lattice 534. In at least one embodiment, one or more of the indices in the tensor may be considered to be missing or omitted values, which may be populated and/or filled in accordance with one or more features of a received audio input. The tensor recognition lattice may then be populated based on an auditory utterance 536, for example, with log probabilities.

Figure 5D:
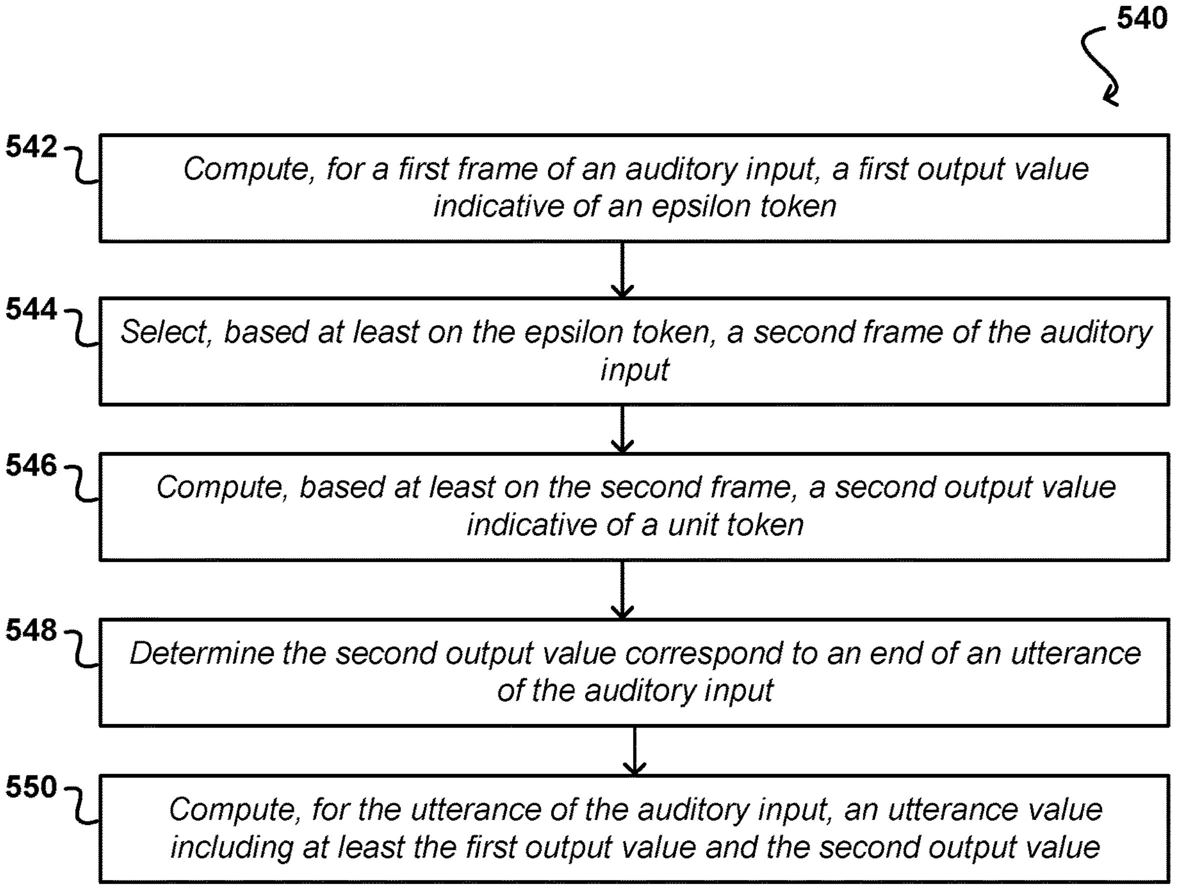
FIG. 5D illustrates an example flow chart of a process for computing a path cost for a lattice representation, according to at least one embodiment.

FIG. 5D illustrates an example process 540 for traversing a path through a graphical representation corresponding to a lattice. In this example, a first output value for an auditory input is computed 542. The output value may correspond to an emission for a frame within a lattice representation, such as an emission of a character, sound, sub-word, etc. and/or for a blank. The first output value may further correspond to a cost associated with a path through the lattice, where the cost may be associated with one or more weights based on log probabilities of emissions. In various embodiments, the first output value may correspond to an epsilon token, which may be associated with a skip along one or more frames and/or with zero cost. A second frame of the auditory input may be selected 544.

At the second frame, a second output value may be computed 546. In at least one embodiment, the second output value is associated with a unit token, which may correspond to an emission for a sound, letter, sub-word, phoneme, and/or the like. As noted herein, the second output value may be associated with a cost of traversing the path through the lattice. In at least one embodiment, it is determined that the second output value corresponds to an end of an utterance of the auditory input 548. Determination of the end may lead to additional traversal through a representative lattice, such as by emitting blanks or the like to reach an output state. An utterance value may be computed for the auditory input 550, which may include at least the first output value and the second output value. In various embodiments, the utterance value may be associated with a path cost for a given set of emissions, where it may be desirable to minimize or reduce path cost.

Figure 5E:
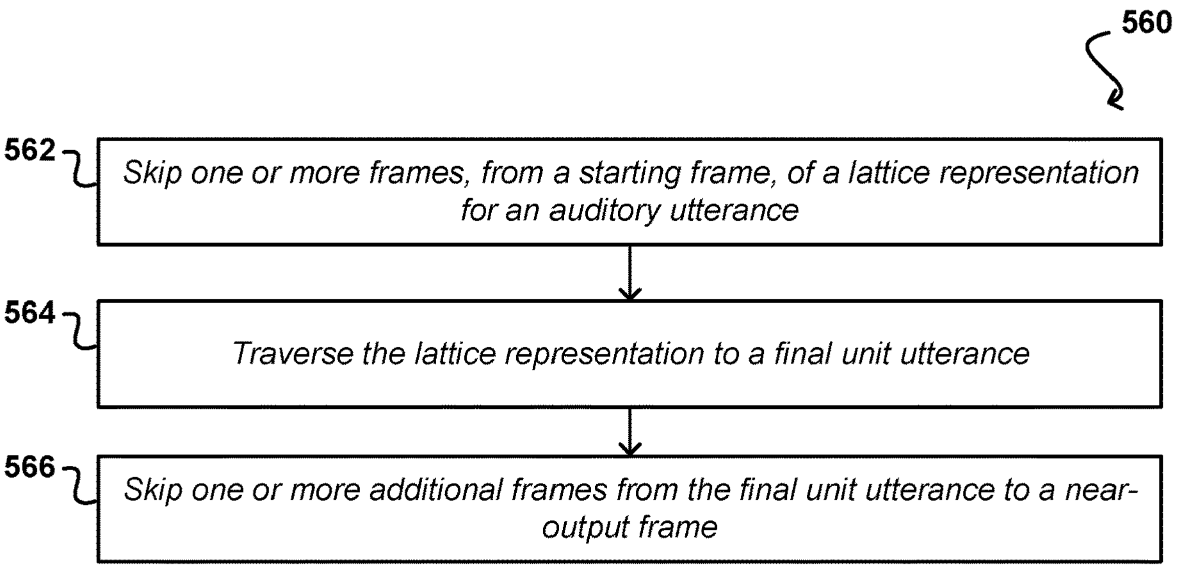
FIG. 5E illustrates an example flow chart for a process for traversing a lattice representation for a W-transducer, according to at least one embodiment.

FIG. 5E illustrates an example process 560 for traversing a lattice representation for an auditory utterance. In this example, one or more frames, from a starting frame of the lattice representation, are skipped 562. As noted herein, skipping the frames may be associated with the W-Transducer to permit different alignments via lattice construction. Skipping one or more frames may correspond to horizontal movement along the lattice representation. The skipped frames may correspond to pre-emission silence and/or utterances that are unhelpful in determining a unit token for the given frame. In at least one embodiment, applying the skips may include a zero-value cost, and therefore, a path through the lattice representation may not be penalized for using the skips. In at least one embodiment, the lattice representation is traversed, such as using log probabilities for different emissions, to a final unit utterance 564. The final unit utterance may be emitted at a frame that is less than an output or last frame of the auditory utterance. In at least one embodiment, once the final unit utterance is determined, one or more additional frames may be skipped to a near-output fame 566. The near-output frame may correspond to a next to last frame prior to a final blank emission to a final output. In this manner, zero cost skips can be applied at a start and end of an auditory input to determine path costs through the lattice representation.

Figure 5F:
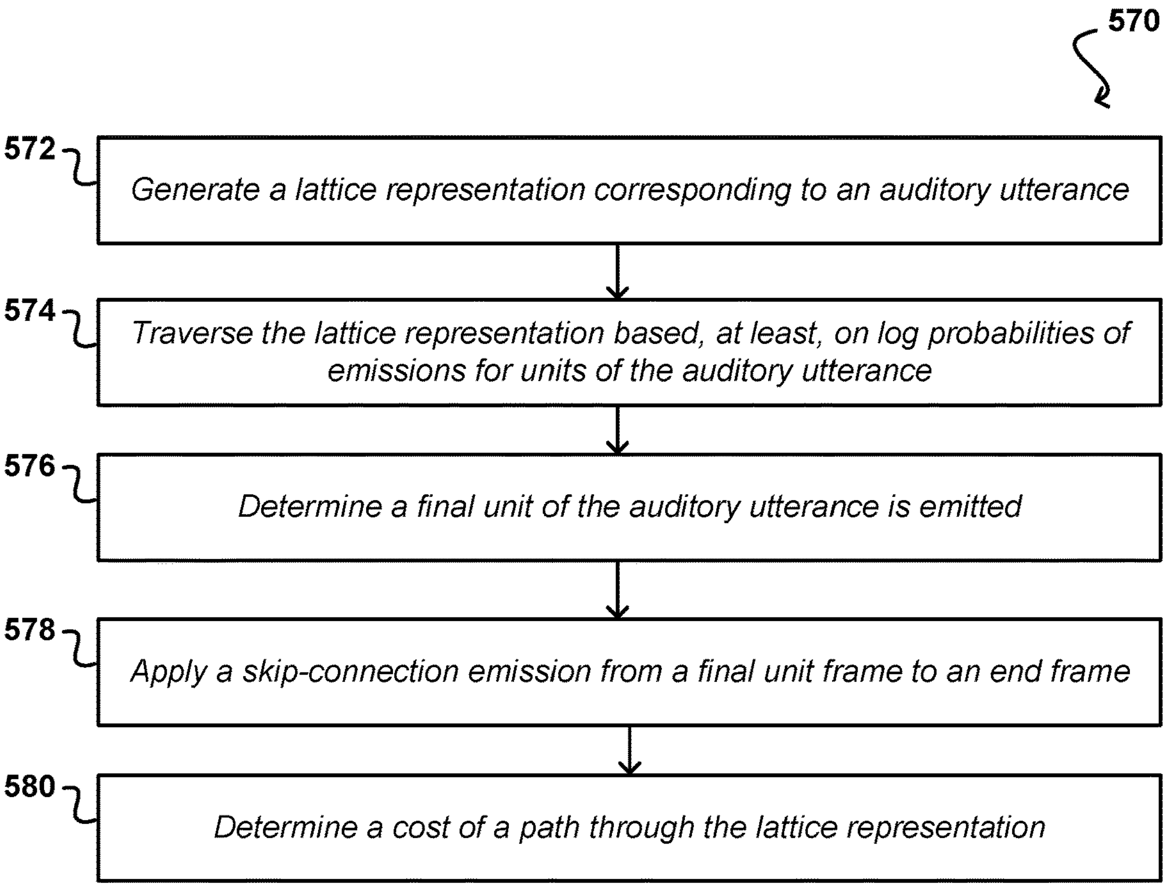
FIG. 5F illustrates an example flow chart for a process for determining a path cost through a lattice representation, according to at least one embodiment.

FIG. 5F illustrates an example process 570 for traversing a lattice representation for an auditory utterance. In this example, a lattice representation for an auditory utterance over a plurality of frames is generated 572. The lattice representation may include different frames of the utterance and one or more paths or arcs with an associated log probability and/or weight. The lattice representation may be traversed based, at least, one properties of the paths, such as the log probabilities 574. A final unit of the auditory utterance may be determined 576 and then a skip-connection emission may be applied from the frame corresponding to the final unit emission to an end frame 578. In at least one embodiment, the end frame corresponds to a next-to-last output frame and a final blank is added to the end of the path. In one or more embodiments, the end frame may correspond to a final output frame. A cost for the path through the lattice representation may then be determined 580. In at least one embodiment, the cost associated with the skip-connection emissions may be zero.

Figure 5G:
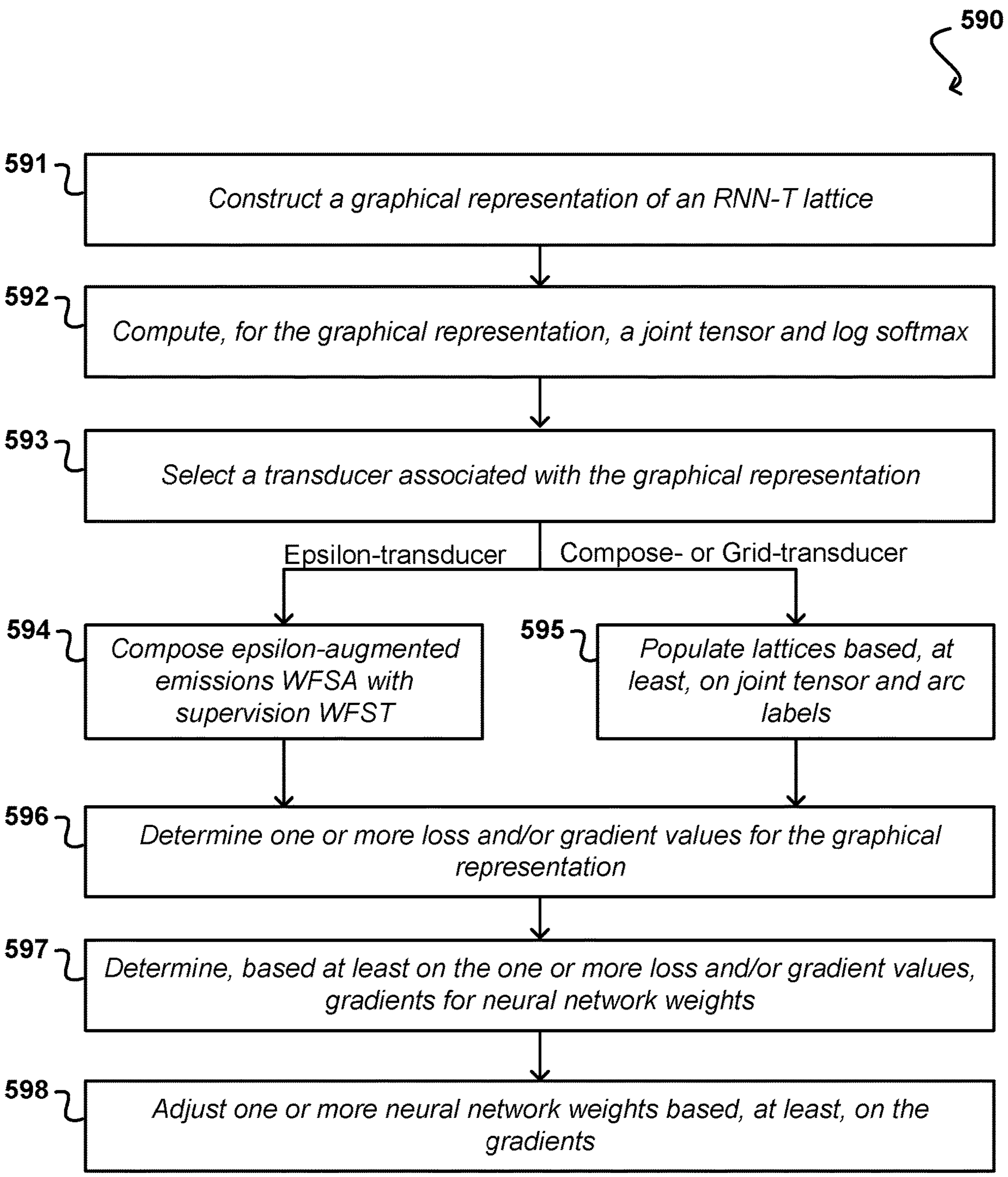
FIG. 5G illustrates an example flow chart for a process for training one or more systems of an automatic speech recognition system, according to at least one embodiment.

FIG. 5G illustrates an example process 590 for training a neural network that may incorporate one or more RNN-Ts. In this example, a graphical representation of an RNN-T lattice is constructed 591 and a joint tensor and log softmax are computed 592. A transducer associated with the graphical representation may be selected 593, where the selection of the transducer may determine how different lattices are generated and/or populated. Along a first path associated with an epsilon-transducer, an epsilon-augmented emissions WFSA with a supervision WFST may be compared 594. Along a select path associated with a compose- or grid-transducer, lattices may be populated using at least the computed joint tensor and arc labels 595. Thereafter, one or more loss and/or gradient values may be computed 596 and used to determine gradients for neural network works 597. These gradients may then be used to adjust one or more neural network weight 598.

As discussed, aspects of various approaches presented herein can be lightweight enough to execute on a device such as a client device, such as a personal computer or gaming console, in real time. Such processing can be performed on, or for, content that is generated on, or received by, that client device or received from an external source, such as streaming data or other content received over at least one network. In some instances, the processing and/or determination of this content may be performed by one of these other devices, systems, or entities, then provided to the client device (or another such recipient) for presentation or another such use.

Figure 6:
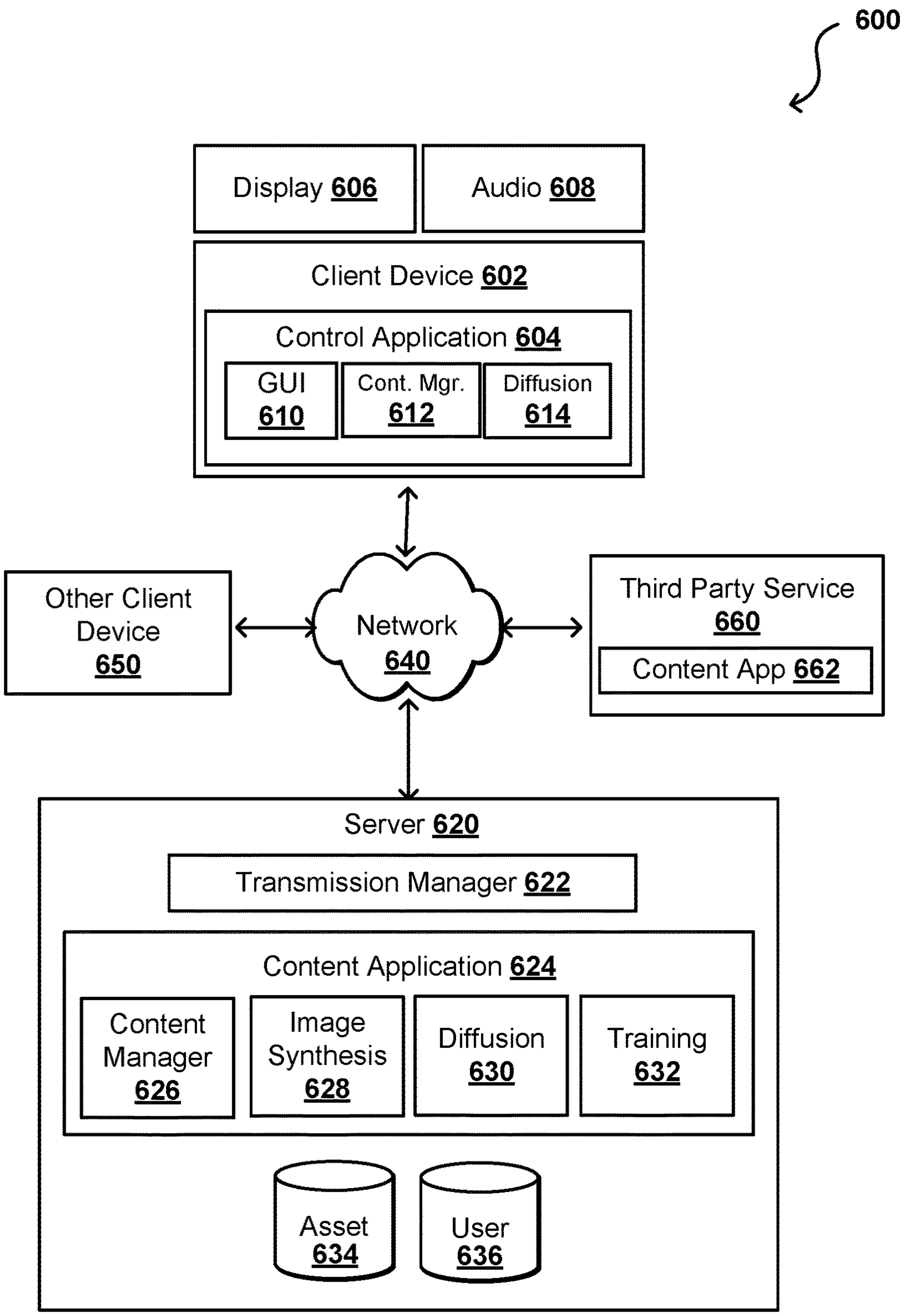
FIG. 6 illustrates components of a distributed system that can be utilized to update or perform inferencing using a machine learning model, according to at least one embodiment.

As an example, FIG. 6 illustrates an example network configuration 600 that can be used to provide, generate, modify, encode, process, and/or transmit image data or other such content. In at least one embodiment, a client device 602 can generate or receive data for a session using components of a control application 604 on client device 602 and data stored locally on that client device. In at least one embodiment, a content application 624 executing on a server 620 (e.g., a cloud server or edge server) may initiate a session associated with at least one client device 602, as may utilize a session manager and user data stored in a user database 636, and can cause content such as one or more digital assets (e.g., object representations) from an asset repository 634 to be determined by a content manager 626. A content manager 626 may work with an image synthesis module 628 to generate or synthesize new objects, digital assets, or other such content to be provided for presentation via the client device 602. In at least one embodiment, this image synthesis module 628 can use one or more neural networks, or machine learning models, which can be trained or updated using a training module 632 or system that is on, or in communication with, the server 620. This can include training and/or using a diffusion model 630 to generate content tiles that can be used by an image synthesis module 628, for example, to apply a non-repeating texture to a region of an environment for which image or video data is to be presented via a client device 602. At least a portion of the generated content may be transmitted to the client device 602 using an appropriate transmission manager 622 to send by download, streaming, or another such transmission channel. An encoder may be used to encode and/or compress at least some of this data before transmitting to the client device 602. In at least one embodiment, the client device 602 receiving such content can provide this content to a corresponding control application 604, which may also or alternatively include a graphical user interface 610, content manager 612, and image synthesis or diffusion module 614 for use in providing, synthesizing, modifying, or using content for presentation (or other purposes) on or by the client device 602. A decoder may also be used to decode data received over the network(s) 640 for presentation via client device 602, such as image or video content through a display 606 and audio, such as sounds and music, through at least one audio playback device 608, such as speakers or headphones. In at least one embodiment, at least some of this content may already be stored on, rendered on, or accessible to client device 602 such that transmission over network 640 is not required for at least that portion of content, such as where that content may have been previously downloaded or stored locally on a hard drive or optical disk. In at least one embodiment, a transmission mechanism such as data streaming can be used to transfer this content from server 620, or user database 636, to client device 602. In at least one embodiment, at least a portion of this content can be obtained, enhanced, and/or streamed from another source, such as a third party service 660 or other client device 650, that may also include a content application 662 for generating, enhancing, or providing content. In at least one embodiment, portions of this functionality can be performed using multiple computing devices, or multiple processors within one or more computing devices, such as may include a combination of CPUs and GPUs.

In this example, these client devices can include any appropriate computing devices, as may include a desktop computer, notebook computer, set-top box, streaming device, gaming console, smartphone, tablet computer, VR headset, AR goggles, wearable computer, or a smart television. Each client device can submit a request across at least one wired or wireless network, as may include the Internet, an Ethernet, a local area network (LAN), or a cellular network, among other such options. In this example, these requests can be submitted to an address associated with a cloud provider, who may operate or control one or more electronic resources in a cloud provider environment, such as may include a data center or server farm. In at least one embodiment, the request may be received or processed by at least one edge server, that sits on a network edge and is outside at least one security layer associated with the cloud provider environment. In this way, latency can be reduced by enabling the client devices to interact with servers that are in closer proximity, while also improving security of resources in the cloud provider environment.

In at least one embodiment, such a system can be used for performing graphical rendering operations. In other embodiments, such a system can be used for other purposes, such as for providing image or video content to test or validate autonomous machine applications, or for performing deep learning operations. In at least one embodiment, such a system can be implemented using an edge device, or may incorporate one or more Virtual Machines (VMs). In at least one embodiment, such a system can be implemented at least partially in a data center or at least partially using cloud computing resources.

Inference and Training Logic

Figure 7A:
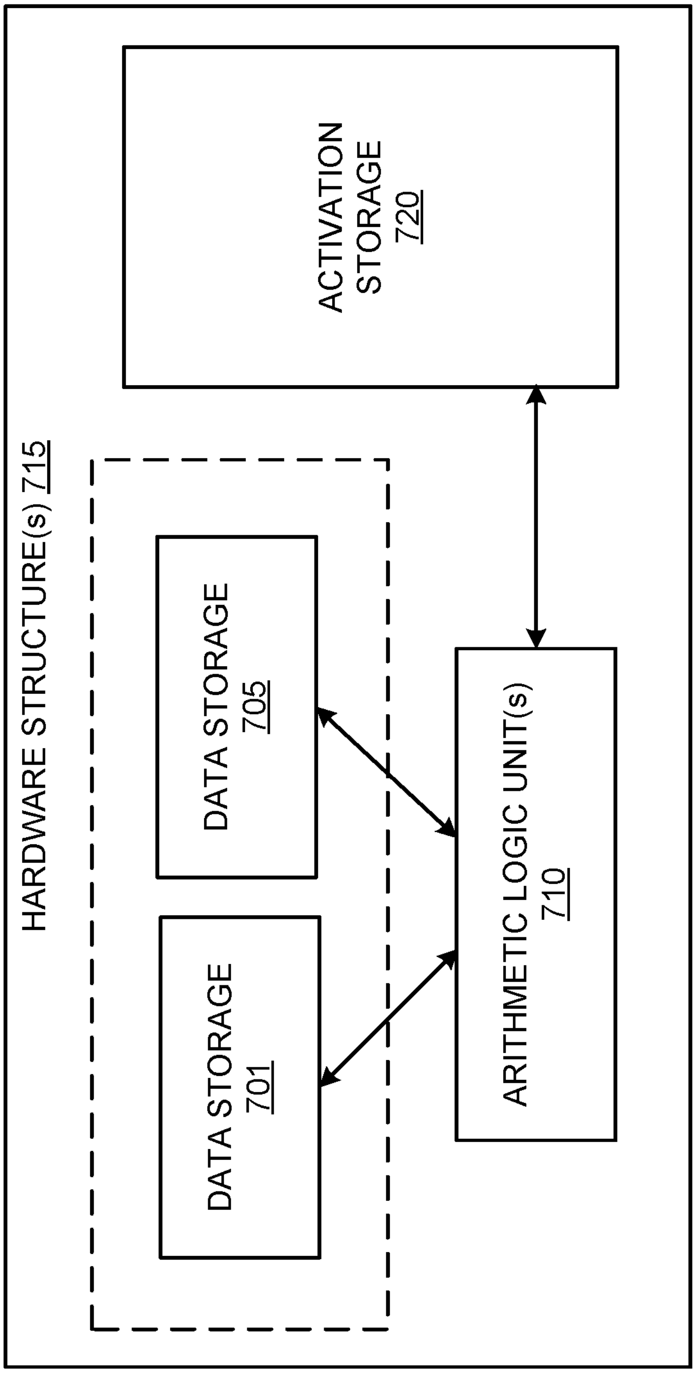
FIG. 7A illustrates inference and/or training logic, according to at least one embodiment.

FIG. 7A illustrates inference and/or training logic 715 used to perform inferencing and/or training operations associated with one or more embodiments. Details regarding inference and/or training logic 715 are provided below in conjunction with FIGS. 7A and/or 7B.

In at least one embodiment, inference and/or training logic 715 may include, without limitation, code and/or data storage 701 to store forward and/or output weight and/or input/output data, and/or other parameters to configure neurons or layers of a neural network trained and/or used for inferencing in aspects of one or more embodiments. In at least one embodiment, training logic 715 may include, or be coupled to code and/or data storage 701 to store graph code or other software to control timing and/or order, in which weight and/or other parameter information is to be loaded to configure, logic, including integer and/or floating point units (collectively, arithmetic logic units (ALUs). In at least one embodiment, code, such as graph code, loads weight or other parameter information into processor ALUs based on an architecture of a neural network to which the code corresponds. In at least one embodiment, code and/or data storage 701 stores weight parameters and/or input/output data of each layer of a neural network trained or used in conjunction with one or more embodiments during forward propagation of input/output data and/or weight parameters during training and/or inferencing using aspects of one or more embodiments. In at least one embodiment, any portion of code and/or data storage 701 may be included with other on-chip or off-chip data storage, including a processor's L1, L2, or L3 cache or system memory.

In at least one embodiment, any portion of code and/or data storage 701 may be internal or external to one or more processors or other hardware logic devices or circuits. In at least one embodiment, code and/or data storage 701 may be cache memory, dynamic randomly addressable memory ("DRAM"), static randomly addressable memory ("SRAM"), non-volatile memory (e.g., Flash memory), or other storage. In at least one embodiment, choice of whether code and/or data storage 701 is internal or external to a processor, for example, or comprised of DRAM, SRAM, Flash or some other storage type may depend on available storage on-chip versus off-chip, latency requirements of training and/or inferencing functions being performed, batch size of data used in inferencing and/or training of a neural network, or some combination of these factors.

In at least one embodiment, inference and/or training logic 715 may include, without limitation, a code and/or data storage 705 to store backward and/or output weight and/or input/output data corresponding to neurons or layers of a neural network trained and/or used for inferencing in aspects of one or more embodiments. In at least one embodiment, code and/or data storage 705 stores weight parameters and/or input/output data of each layer of a neural network trained or used in conjunction with one or more embodiments during backward propagation of input/output data and/or weight parameters during training and/or inferencing using aspects of one or more embodiments. In at least one embodiment, training logic 715 may include, or be coupled to code and/or data storage 705 to store graph code or other software to control timing and/or order, in which weight and/or other parameter information is to be loaded to configure, logic, including integer and/or floating point units (collectively, arithmetic logic units (ALUs). In at least one embodiment, code, such as graph code, loads weight or other parameter information into processor ALUs based on an architecture of a neural network to which the code corresponds. In at least one embodiment, any portion of code and/or data storage 705 may be included with other on-chip or off-chip data storage, including a processor's L1, L2, or L3 cache or system memory. In at least one embodiment, any portion of code and/or data storage 705 may be internal or external to on one or more processors or other hardware logic devices or circuits. In at least one embodiment, code and/or data storage 705 may be cache memory, DRAM, SRAM, non-volatile memory (e.g., Flash memory), or other storage. In at least one embodiment, choice of whether code and/or data storage 705 is internal or external to a processor, for example, or comprised of DRAM, SRAM, Flash or some other storage type may depend on available storage on-chip versus off-chip, latency requirements of training and/or inferencing functions being performed, batch size of data used in inferencing and/or training of a neural network, or some combination of these factors.

In at least one embodiment, code and/or data storage 701 and code and/or data storage 705 may be separate storage structures. In at least one embodiment, code and/or data storage 701 and code and/or data storage 705 may be same storage structure. In at least one embodiment, code and/or data storage 701 and code and/or data storage 705 may be partially same storage structure and partially separate storage structures. In at least one embodiment, any portion of code and/or data storage 701 and code and/or data storage 705 may be included with other on-chip or off-chip data storage, including a processor's L1, L2, or L3 cache or system memory.

In at least one embodiment, inference and/or training logic 715 may include, without limitation, one or more arithmetic logic unit(s) ("ALU(s)") 710, including integer and/or floating point units, to perform logical and/or mathematical operations based, at least in part on, or indicated by, training and/or inference code (e.g., graph code), a result of which may produce activations (e.g., output values from layers or neurons within a neural network) stored in an activation storage 720 that are functions of input/output and/or weight parameter data stored in code and/or data storage 701 and/or code and/or data storage 705. In at least one embodiment, activations stored in activation storage 720 are generated according to linear algebraic and or matrix-based mathematics performed by ALU(s) 710 in response to performing instructions or other code, wherein weight values stored in code and/or data storage 705 and/or code and/or data storage 701 are used as operands along with other values, such as bias values, gradient information, momentum values, or other parameters or hyperparameters, any or all of which may be stored in code and/or data storage 705 or code and/or data storage 701 or another storage on or off-chip.

In at least one embodiment, ALU(s) 710 are included within one or more processors or other hardware logic devices or circuits, whereas in another embodiment, ALU(s) 710 may be external to a processor or other hardware logic device or circuit that uses them (e.g., a co-processor). In at least one embodiment, ALU(s) 710 may be included within a processor's execution units or otherwise within a bank of ALUs accessible by a processor's execution units either within same processor or distributed between different processors of different types (e.g., central processing units, graphics processing units, fixed function units, etc.). In at least one embodiment, code and/or data storage 701, code and/or data storage 705, and activation storage 720 may be on same processor or other hardware logic device or circuit, whereas in another embodiment, they may be in different processors or other hardware logic devices or circuits, or some combination of same and different processors or other hardware logic devices or circuits. In at least one embodiment, any portion of activation storage 720 may be included with other on-chip or off-chip data storage, including a processor's L1, L2, or L3 cache or system memory. Furthermore, inferencing and/or training code may be stored with other code accessible to a processor or other hardware logic or circuit and fetched and/or processed using a processor's fetch, decode, scheduling, execution, retirement and/or other logical circuits.

In at least one embodiment, activation storage 720 may be cache memory, DRAM, SRAM, non-volatile memory (e.g., Flash memory), or other storage. In at least one embodiment, activation storage 720 may be completely or partially within or external to one or more processors or other logical circuits. In at least one embodiment, choice of whether activation storage 720 is internal or external to a processor, for example, or comprised of DRAM, SRAM, Flash or some other storage type may depend on available storage on-chip versus off-chip, latency requirements of training and/or inferencing functions being performed, batch size of data used in inferencing and/or training of a neural network, or some combination of these factors. In at least one embodiment, inference and/or training logic 715 illustrated in FIG. 7A may be used in conjunction with an application-specific integrated circuit ("ASIC"), such as Tensorflow® Processing Unit from Google, an inference processing unit (IPU) from Graphcore™, or a Nervana® (e.g., "Lake Crest") processor from Intel Corp. In at least one embodiment, inference and/or training logic 715 illustrated in FIG. 7A may be used in conjunction with central processing unit ("CPU") hardware, graphics processing unit ("GPU") hardware or other hardware, such as field programmable gate arrays ("FPGAs").

Figure 7B:
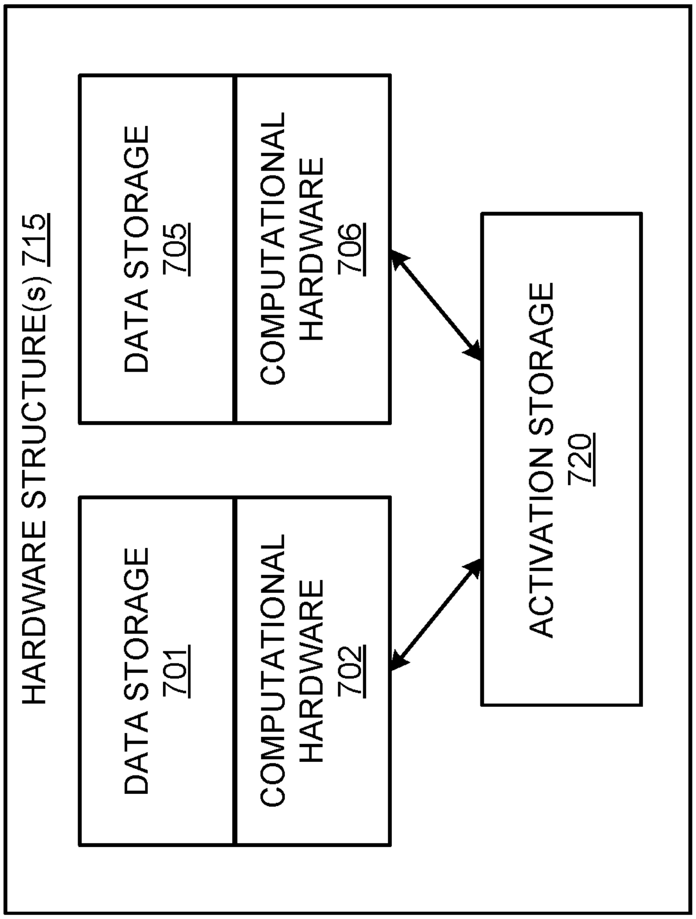
FIG. 7B illustrates inference and/or training logic, according to at least one embodiment.

FIG. 7B illustrates inference and/or training logic 715, according to at least one or more embodiments. In at least one embodiment, inference and/or training logic 715 may include, without limitation, hardware logic in which computational resources are dedicated or otherwise exclusively used in conjunction with weight values or other information corresponding to one or more layers of neurons within a neural network. In at least one embodiment, inference and/or training logic 715 illustrated in FIG. 7B may be used in conjunction with an application-specific integrated circuit (ASIC), such as Tensorflow® Processing Unit from Google, an inference processing unit (IPU) from Graphcore™, or a Nervana® (e.g., "Lake Crest") processor from Intel Corp. In at least one embodiment, inference and/or training logic 715 illustrated in FIG. 7B may be used in conjunction with central processing unit (CPU) hardware, graphics processing unit (GPU) hardware or other hardware, such as field programmable gate arrays (FPGAs). In at least one embodiment, inference and/or training logic 715 includes, without limitation, code and/or data storage 701 and code and/or data storage 705, which may be used to store code (e.g., graph code), weight values and/or other information, including bias values, gradient information, momentum values, and/or other parameter or hyperparameter information. In at least one embodiment illustrated in FIG. 7B, each of code and/or data storage 701 and code and/or data storage 705 is associated with a dedicated computational resource, such as computational hardware 702 and computational hardware 706, respectively. In at least one embodiment, each of computational hardware 702 and computational hardware 706 comprises one or more ALUs that perform mathematical functions, such as linear algebraic functions, only on information stored in code and/or data storage 701 and code and/or data storage 705, respectively, result of which is stored in activation storage 720.

In at least one embodiment, each of code and/or data storage 701 and 705 and corresponding computational hardware 702 and 706, respectively, correspond to different layers of a neural network, such that resulting activation from one "storage/computational pair 701/702" of code and/or data storage 701 and computational hardware 702 is provided as an input to "storage/computational pair 705/706" of code and/or data storage 705 and computational hardware 706, in order to mirror conceptual organization of a neural network. In at least one embodiment, each of storage/computational pairs 701/702 and 705/706 may correspond to more than one neural network layer. In at least one embodiment, additional storage/computation pairs (not shown) subsequent to or in parallel with storage computation pairs 701/702 and 705/706 may be included in inference and/or training logic 715.

Data Center

Figure 8:
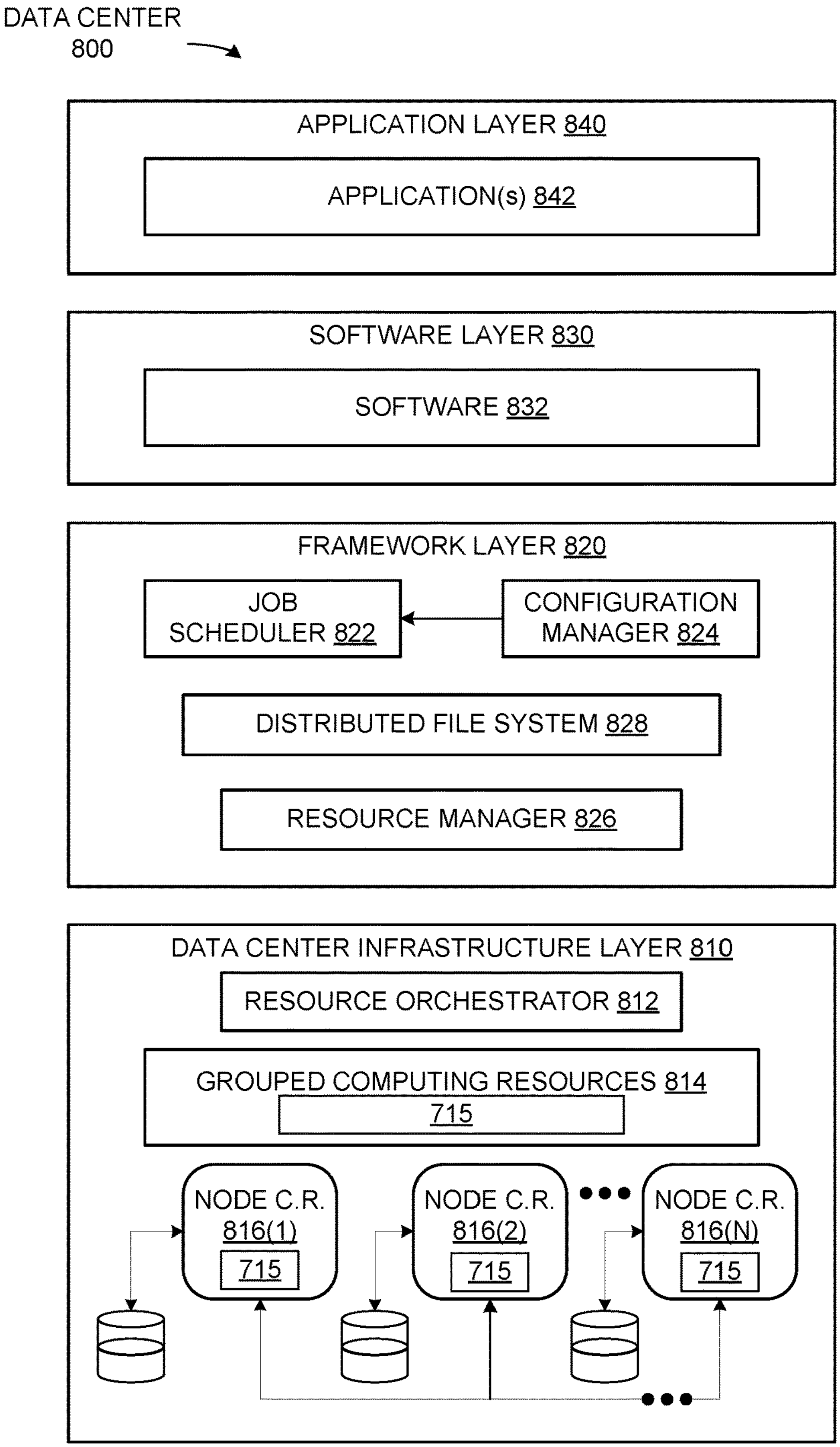
FIG. 8 illustrates an example data center system, according to at least one embodiment.

FIG. 8 illustrates an example data center 800, in which at least one embodiment may be used. In at least one embodiment, data center 800 includes a data center infrastructure layer 810, a framework layer 820, a software layer 830, and an application layer 840.

In at least one embodiment, as shown in FIG. 8, data center infrastructure layer 810 may include a resource orchestrator 812, grouped computing resources 814, and node computing resources ("node C.R.s") 816(1)-816(N), where "N" represents any whole, positive integer. In at least one embodiment, node C.R.s 816(1)-816(N) may include, but are not limited to, any number of central processing units ("CPUs") or other processors (including accelerators, field programmable gate arrays (FPGAs), graphics processors, etc.), memory devices (e.g., dynamic read-only memory), storage devices (e.g., solid state or disk drives), network input/output ("NW I/O") devices, network switches, virtual machines ("VMs"), power modules, and cooling modules, etc. In at least one embodiment, one or more node C.R.s from among node C.R.s 816(1)-816(N) may be a server having one or more of above-mentioned computing resources.

In at least one embodiment, grouped computing resources 814 may include separate groupings of node C.R.s housed within one or more racks (not shown), or many racks housed in data centers at various geographical locations (also not shown). Separate groupings of node C.R.s within grouped computing resources 814 may include grouped compute, network, memory or storage resources that may be configured or allocated to support one or more workloads. In at least one embodiment, several node C.R.s including CPUs or processors may be grouped within one or more racks to provide compute resources to support one or more workloads. In at least one embodiment, one or more racks may also include any number of power modules, cooling modules, and network switches, in any combination.

In at least one embodiment, resource orchestrator 812 may configure or otherwise control one or more node C.R.s 816(1)-816(N) and/or grouped computing resources 814. In at least one embodiment, resource orchestrator 812 may include a software design infrastructure ("SDI") management entity for data center 800. In at least one embodiment, resource orchestrator 812 may include hardware, software or some combination thereof.

In at least one embodiment, as shown in FIG. 8, framework layer 820 includes a job scheduler 822, a configuration manager 824, a resource manager 826 and a distributed file system 828. In at least one embodiment, framework layer 820 may include a framework to support software 832 of software layer 830 and/or one or more application(s) 842 of application layer 840. In at least one embodiment, software 832 or application(s) 842 may respectively include web-based service software or applications, such as those provided by Amazon Web Services, Google Cloud and Microsoft Azure. In at least one embodiment, framework layer 820 may be, but is not limited to, a type of free and open-source software web application framework such as Apache Spark™ (hereinafter "Spark") that may use distributed file system 828 for large-scale data processing (e.g., "big data"). In at least one embodiment, job scheduler 822 may include a Spark driver to facilitate scheduling of workloads supported by various layers of data center 800. In at least one embodiment, configuration manager 824 may be capable of configuring different layers such as software layer 830 and framework layer 820 including Spark and distributed file system 828 for supporting large-scale data processing. In at least one embodiment, resource manager 826 may be capable of managing clustered or grouped computing resources mapped to or allocated for support of distributed file system 828 and job scheduler 822. In at least one embodiment, clustered or grouped computing resources may include grouped computing resource 814 at data center infrastructure layer 810. In at least one embodiment, resource manager 826 may coordinate with resource orchestrator 812 to manage these mapped or allocated computing resources.

In at least one embodiment, software 832 included in software layer 830 may include software used by at least portions of node C.R.s 816(1)-816(N), grouped computing resources 814, and/or distributed file system 828 of framework layer 820. The one or more types of software may include, but are not limited to, Internet web page search software, e-mail virus scan software, database software, and streaming video content software.

In at least one embodiment, application(s) 842 included in application layer 840 may include one or more types of applications used by at least portions of node C.R.s 816(1)-816(N), grouped computing resources 814, and/or distributed file system 828 of framework layer 820. One or more types of applications may include, but are not limited to, any number of a genomics application, a cognitive compute, and a machine learning application, including training or inferencing software, machine learning framework software (e.g., PyTorch, TensorFlow, Caffe, etc.) or other machine learning applications used in conjunction with one or more embodiments.

In at least one embodiment, any of configuration manager 824, resource manager 826, and resource orchestrator 812 may implement any number and type of self-modifying actions based on any amount and type of data acquired in any technically feasible fashion. In at least one embodiment, self-modifying actions may relieve a data center operator of data center 800 from making possibly bad configuration decisions and possibly avoiding underused and/or poor performing portions of a data center.

In at least one embodiment, data center 800 may include tools, services, software or other resources to train one or more machine learning models or predict or infer information using one or more machine learning models according to one or more embodiments described herein. For example, in at least one embodiment, a machine learning model may be trained by calculating weight parameters according to a neural network architecture using software and computing resources described above with respect to data center 800. In at least one embodiment, trained machine learning models corresponding to one or more neural networks may be used to infer or predict information using resources described above with respect to data center 800 by using weight parameters calculated through one or more training techniques described herein.

In at least one embodiment, data center may use CPUs, application-specific integrated circuits (ASICs), GPUs, FPGAs, or other hardware to perform training and/or inferencing using above-described resources. Moreover, one or more software and/or hardware resources described above may be configured as a service to allow users to train or performing inferencing of information, such as image recognition, speech recognition, or other artificial intelligence services.

Inference and/or training logic 715 are used to perform inferencing and/or training operations associated with one or more embodiments. Details regarding inference and/or training logic 715 are provided below in conjunction with FIGS. 7A and/or 7B. In at least one embodiment, inference and/or training logic 715 may be used in system FIG. 8 for inferencing or predicting operations based, at least in part, on weight parameters calculated using neural network training operations, neural network functions and/or architectures, or neural network use cases described herein.

Such components can be used for development and training of ASR systems.

Computer Systems

Figure 9:
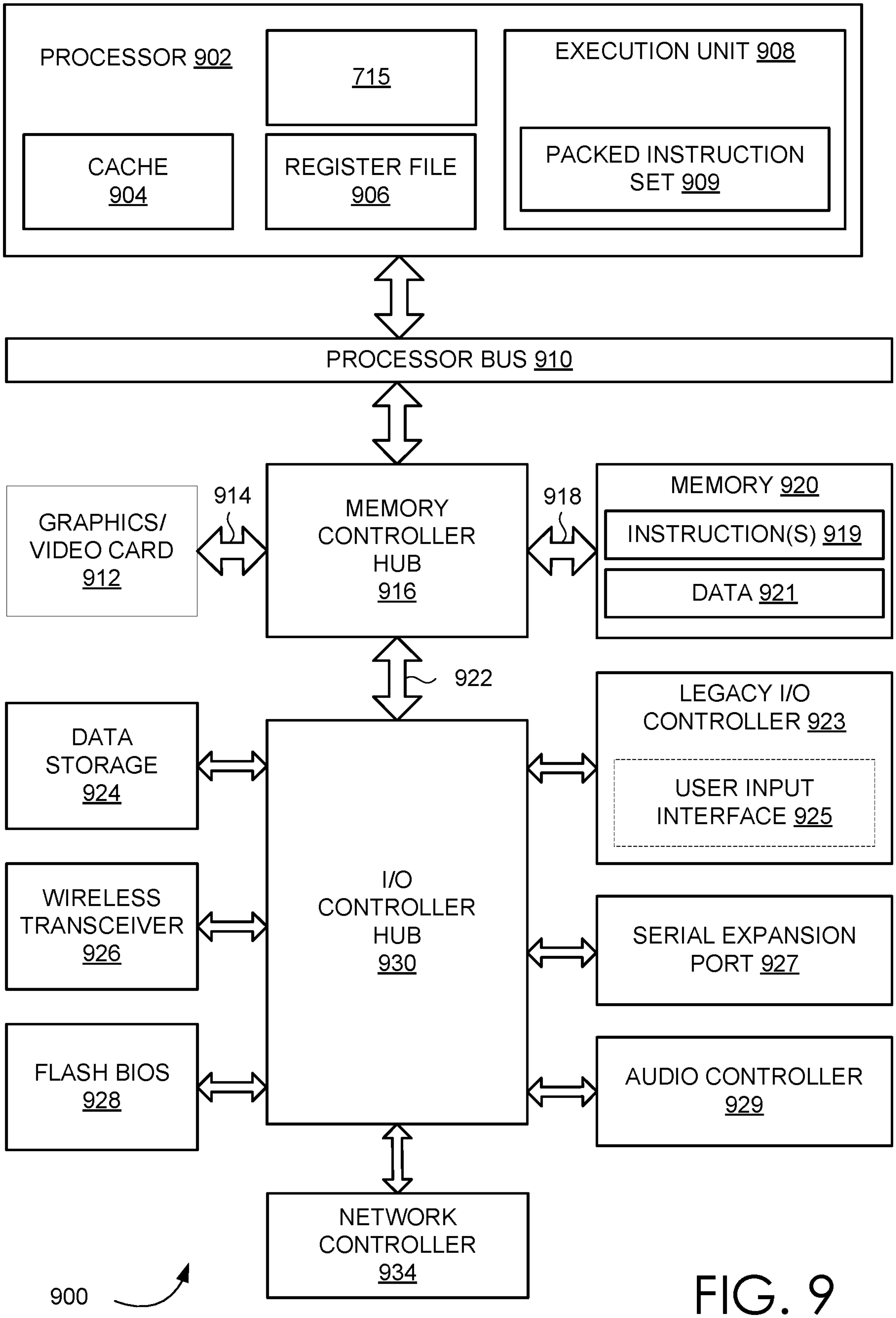
FIG. 9 illustrates a computer system, according to at least one embodiment.

FIG. 9 is a block diagram illustrating an exemplary computer system, which may be a system with interconnected devices and components, a system-on-a-chip (SOC) or some combination thereof 900 formed with a processor that may include execution units to execute an instruction, according to at least one embodiment. In at least one embodiment, computer system 900 may include, without limitation, a component, such as a processor 902 to employ execution units including logic to perform algorithms for process data, in accordance with present disclosure, such as in embodiment described herein. In at least one embodiment, computer system 900 may include processors, such as PENTIUM® Processor family, Xeon™, Itanium®, XScale™ and/or StrongARM™, Intel® Core™, or Intel® Nervana™ microprocessors available from Intel Corporation of Santa Clara, California, although other systems (including PCs having other microprocessors, engineering workstations, set-top boxes and like) may also be used. In at least one embodiment, computer system 900 may execute a version of WINDOWS' operating system available from Microsoft Corporation of Redmond, Wash., although other operating systems (UNIX and Linux for example), embedded software, and/or graphical user interfaces, may also be used.

Embodiments may be used in other devices such as handheld devices and embedded applications. Some examples of handheld devices include cellular phones, Internet Protocol devices, digital cameras, personal digital assistants ("PDAs"), and handheld PCs. In at least one embodiment, embedded applications may include a microcontroller, a digital signal processor ("DSP"), system on a chip, network computers ("NetPCs"), set-top boxes, network hubs, wide area network ("WAN") switches, or any other system that may perform one or more instructions in accordance with at least one embodiment.

In at least one embodiment, computer system 900 may include, without limitation, processor 902 that may include, without limitation, one or more execution units 908 to perform machine learning model training and/or inferencing according to techniques described herein. In at least one embodiment, computer system 900 is a single processor desktop or server system, but in another embodiment computer system 900 may be a multiprocessor system. In at least one embodiment, processor 902 may include, without limitation, a complex instruction set computing ("CISC") microprocessor, a reduced instruction set computing ("RISC") microprocessor, a very long instruction word ("VLIW") computing microprocessor, a processor implementing a combination of instruction sets, or any other processor device, such as a digital signal processor, for example. In at least one embodiment, processor 902 may be coupled to a processor bus 910 that may transmit data signals between processor 902 and other components in computer system 900.

In at least one embodiment, processor 902 may include, without limitation, a Level 1 ("L1") internal cache memory ("cache") 904. In at least one embodiment, processor 902 may have a single internal cache or multiple levels of internal cache. In at least one embodiment, cache memory may reside external to processor 902. Other embodiments may also include a combination of both internal and external caches depending on particular implementation and needs. In at least one embodiment, register file 906 may store different types of data in various registers including, without limitation, integer registers, floating point registers, status registers, and instruction pointer register.

In at least one embodiment, execution unit 908, including, without limitation, logic to perform integer and floating point operations, also resides in processor 902. In at least one embodiment, processor 902 may also include a microcode ("ucode") read only memory ("ROM") that stores microcode for certain macro instructions. In at least one embodiment, execution unit 908 may include logic to handle a packed instruction set 909. In at least one embodiment, by including packed instruction set 909 in an instruction set of a general-purpose processor 902, along with associated circuitry to execute instructions, operations used by many multimedia applications may be performed using packed data in a general-purpose processor 902. In one or more embodiments, many multimedia applications may be accelerated and executed more efficiently by using full width of a processor's data bus for performing operations on packed data, which may eliminate need to transfer smaller units of data across processor's data bus to perform one or more operations one data element at a time.

In at least one embodiment, execution unit 908 may also be used in microcontrollers, embedded processors, graphics devices, DSPs, and other types of logic circuits. In at least one embodiment, computer system 900 may include, without limitation, a memory 920. In at least one embodiment, memory 920 may be implemented as a Dynamic Random Access Memory ("DRAM") device, a Static Random Access Memory ("SRAM") device, flash memory device, or other memory device. In at least one embodiment, memory 920 may store instruction(s) 919 and/or data 921 represented by data signals that may be executed by processor 902.

In at least one embodiment, system logic chip may be coupled to processor bus 910 and memory 920. In at least one embodiment, system logic chip may include, without limitation, a memory controller hub ("MCH") 916, and processor 902 may communicate with MCH 916 via processor bus 910. In at least one embodiment, MCH 916 may provide a high bandwidth memory path 918 to memory 920 for instruction and data storage and for storage of graphics commands, data and textures. In at least one embodiment, MCH 916 may direct data signals between processor 902, memory 920, and other components in computer system 900 and to bridge data signals between processor bus 910, memory 920, and a system I/O 922. In at least one embodiment, system logic chip may provide a graphics port for coupling to a graphics controller. In at least one embodiment, MCH 916 may be coupled to memory 920 through a high bandwidth memory path 918 and graphics/video card 912 may be coupled to MCH 916 through an Accelerated Graphics Port ("AGP") interconnect 914.

In at least one embodiment, computer system 900 may use system I/O 922 that is a proprietary hub interface bus to couple MCH 916 to I/O controller hub ("ICH") 930. In at least one embodiment, ICH 930 may provide direct connections to some I/O devices via a local I/O bus. In at least one embodiment, local I/O bus may include, without limitation, a high-speed I/O bus for connecting peripherals to memory 920, chipset, and processor 902. Examples may include, without limitation, an audio controller 929, a firmware hub ("flash BIOS") 928, a wireless transceiver 926, a data storage 924, a legacy I/O controller 923 containing user input and keyboard interfaces 925, a serial expansion port 927, such as Universal Serial Bus ("USB"), and a network controller 934. Data storage 924 may comprise a hard disk drive, a floppy disk drive, a CD-ROM device, a flash memory device, or other mass storage device.

In at least one embodiment, FIG. 9 illustrates a system, which includes interconnected hardware devices or "chips", whereas in other embodiments, FIG. 9 may illustrate an exemplary System on a Chip ("SoC"). In at least one embodiment, devices may be interconnected with proprietary interconnects, standardized interconnects (e.g., PCIe) or some combination thereof. In at least one embodiment, one or more components of computer system 900 are interconnected using compute express link (CXL) interconnects.

Inference and/or training logic 715 are used to perform inferencing and/or training operations associated with one or more embodiments. Details regarding inference and/or training logic 715 are provided below in conjunction with FIGS. 7A and/or 7B. In at least one embodiment, inference and/or training logic 715 may be used in system FIG. 9 for inferencing or predicting operations based, at least in part, on weight parameters calculated using neural network training operations, neural network functions and/or architectures, or neural network use cases described herein.

Such components can be used for development and training of ASR systems.

Figure 10:
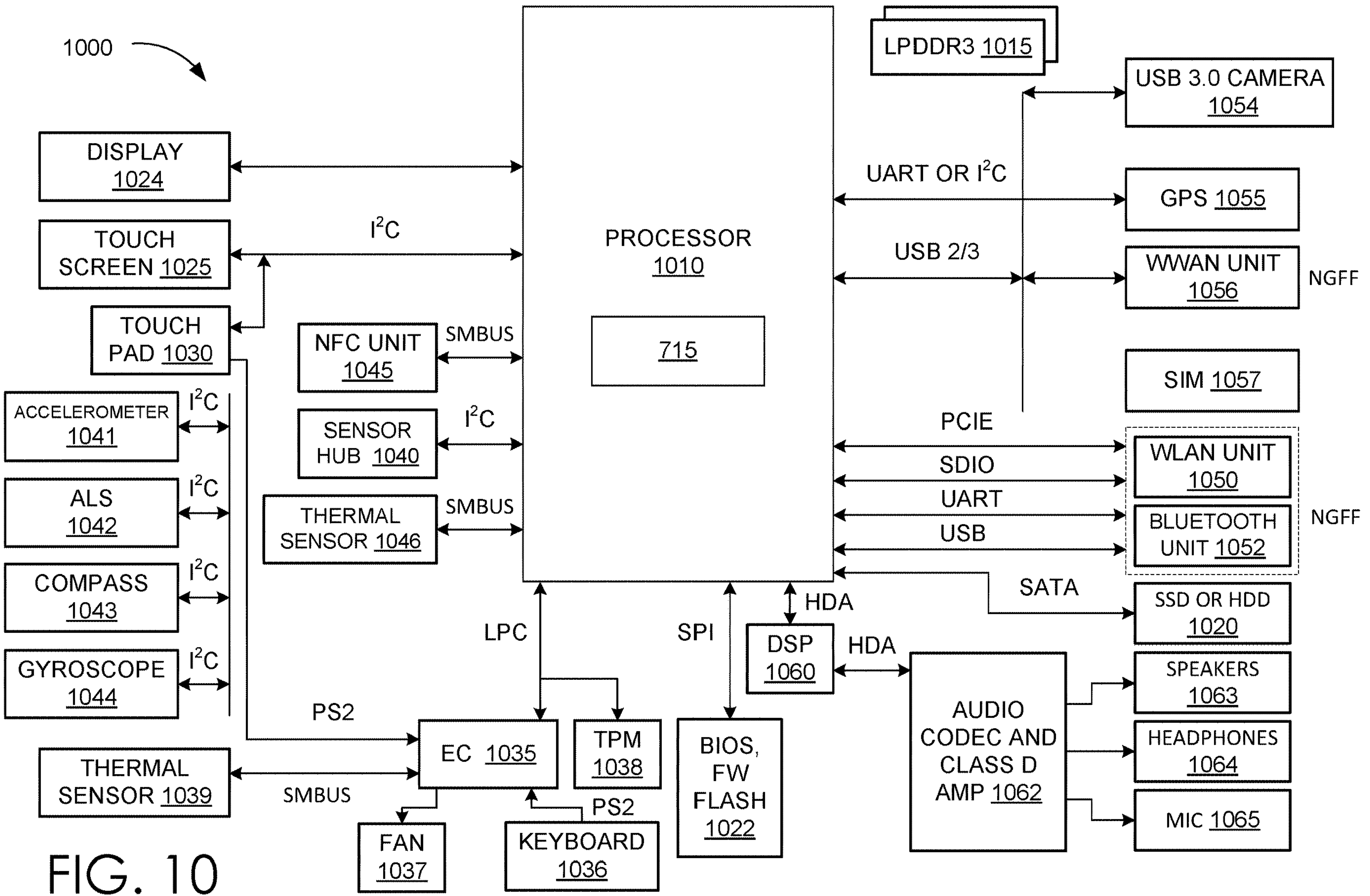
FIG. 10 illustrates a computer system, according to at least one embodiment.

FIG. 10 is a block diagram illustrating an electronic device 1000 for utilizing a processor 1010, according to at least one embodiment. In at least one embodiment, electronic device 1000 may be, for example and without limitation, a notebook, a tower server, a rack server, a blade server, a laptop, a desktop, a tablet, a mobile device, a phone, an embedded computer, or any other suitable electronic device.

In at least one embodiment, system 1000 may include, without limitation, processor 1010 communicatively coupled to any suitable number or kind of components, peripherals, modules, or devices. In at least one embodiment, processor 1010 coupled using a bus or interface, such as a 1° C. bus, a System Management Bus ("SMBus"), a Low Pin Count (LPC) bus, a Serial Peripheral Interface ("SPI"), a High Definition Audio ("HDA") bus, a Serial Advance Technology Attachment ("SATA") bus, a Universal Serial Bus ("USB") (versions 1, 2, 3), or a Universal Asynchronous Receiver/Transmitter ("UART") bus. In at least one embodiment, FIG. 10 illustrates a system, which includes interconnected hardware devices or "chips", whereas in other embodiments, FIG. 10 may illustrate an exemplary System on a Chip ("SoC"). In at least one embodiment, devices illustrated in FIG. 10 may be interconnected with proprietary interconnects, standardized interconnects (e.g., PCIe) or some combination thereof. In at least one embodiment, one or more components of FIG. 10 are interconnected using compute express link (CXL) interconnects.

In at least one embodiment, FIG. 10 may include a display 1024, a touch screen 1025, a touch pad 1030, a Near Field Communications unit ("NFC") 1045, a sensor hub 1040, a thermal sensor 1046, an Express Chipset ("EC") 1035, a Trusted Platform Module ("TPM") 1038, BIOS/firmware/flash memory ("BIOS, FW Flash") 1022, a DSP 1060, a drive 1020 such as a Solid State Disk ("SSD") or a Hard Disk Drive ("HDD"), a wireless local area network unit ("WLAN") 1050, a Bluetooth unit 1052, a Wireless Wide Area Network unit ("WWAN") 1056, a Global Positioning System (GPS) 1055, a camera ("USB 3.0 camera") 1054 such as a USB 3.0 camera, and/or a Low Power Double Data Rate ("LPDDR") memory unit ("LPDDR3") 1015 implemented in, for example, LPDDR3 standard. These components may each be implemented in any suitable manner.

In at least one embodiment, other components may be communicatively coupled to processor 1010 through components discussed above. In at least one embodiment, an accelerometer 1041, Ambient Light Sensor ("ALS") 1042, compass 1043, and a gyroscope 1044 may be communicatively coupled to sensor hub 1040. In at least one embodiment, thermal sensor 1039, a fan 1037, a keyboard 1036, and a touch pad 1030 may be communicatively coupled to EC 1035. In at least one embodiment, speakers 1063, headphones 1064, and microphone ("mic") 1065 may be communicatively coupled to an audio unit ("audio codec and class d amp") 1062, which may in turn be communicatively coupled to DSP 1060. In at least one embodiment, audio unit 1062 may include, for example and without limitation, an audio coder/decoder ("codec") and a class D amplifier. In at least one embodiment, SIM card ("SIM") 1057 may be communicatively coupled to WWAN unit 1056. In at least one embodiment, components such as WLAN unit 1050 and Bluetooth unit 1052, as well as WWAN unit 1056 may be implemented in a Next Generation Form Factor ("NGFF").

Inference and/or training logic 715 are used to perform inferencing and/or training operations associated with one or more embodiments. Details regarding inference and/or training logic 715 are provided below in conjunction with FIGS. 7A and/or 7B. In at least one embodiment, inference and/or training logic 715 may be used in system FIG. 10 for inferencing or predicting operations based, at least in part, on weight parameters calculated using neural network training operations, neural network functions and/or architectures, or neural network use cases described herein.

Such components can be used for development and training of ASR systems.

Figure 11:
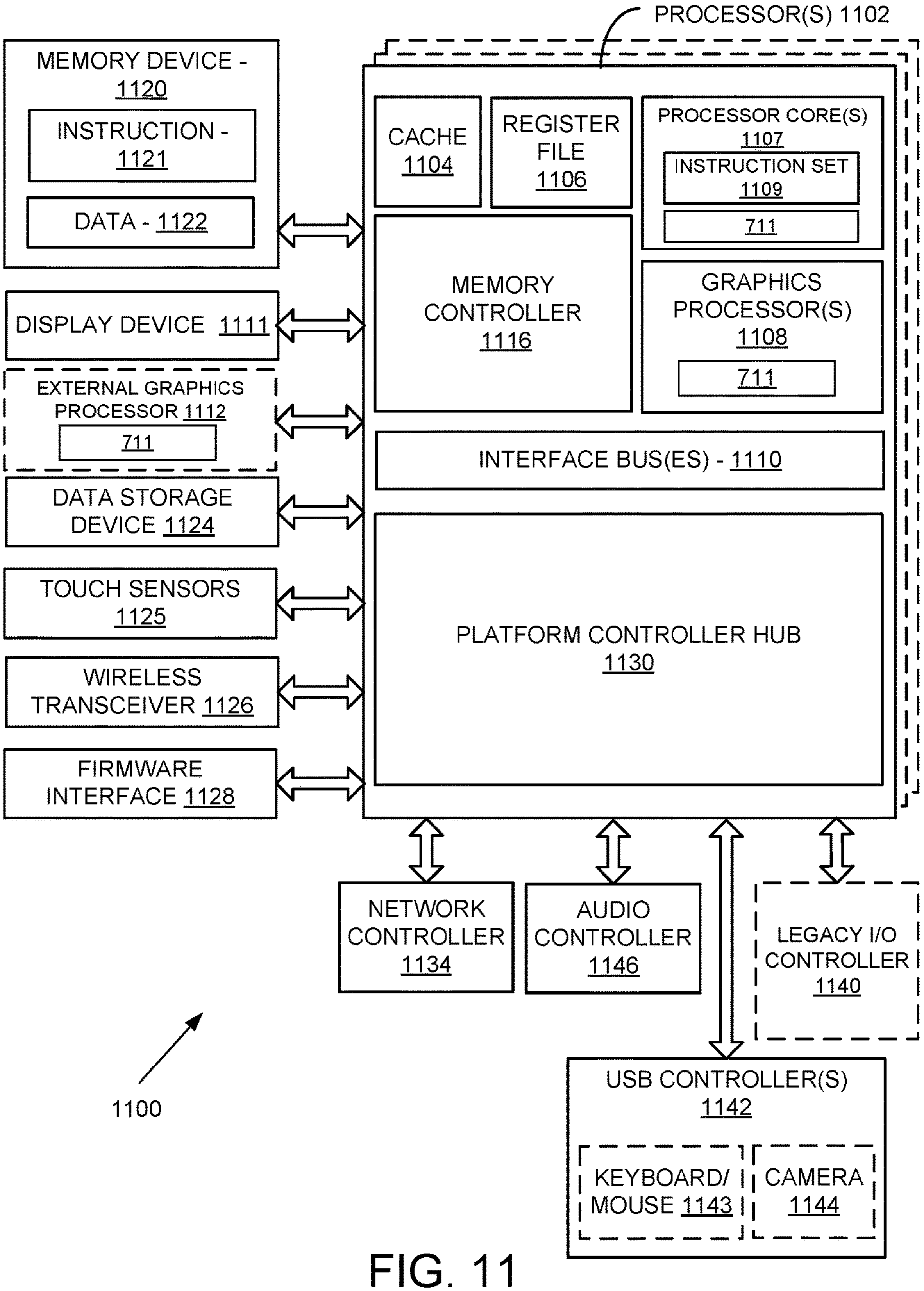
FIG. 11 illustrates at least portions of a graphics processor, according to one or more embodiments.

FIG. 11 is a block diagram of a processing system, according to at least one embodiment. In at least one embodiment, system 1100 includes one or more processor(s) 1102 and one or more graphics processor(s) 1108, and may be a single processor desktop system, a multiprocessor workstation system, or a server system having a large number of processor(s) 1102 or processor core(s) 1107. In at least one embodiment, system 1100 is a processing platform incorporated within a system-on-a-chip (SoC) integrated circuit for use in mobile, handheld, or embedded devices.

In at least one embodiment, system 1100 can include, or be incorporated within a server-based gaming platform, a game console, including a game and media console, a mobile gaming console, a handheld game console, or an online game console. In at least one embodiment, system 1100 is a mobile phone, smart phone, tablet computing device or mobile Internet device. In at least one embodiment, processing system 1100 can also include, coupled with, or be integrated within a wearable device, such as a smart watch wearable device, smart eyewear device, augmented reality device, or virtual reality device. In at least one embodiment, processing system 1100 is a television or set top box device having one or more processor(s) 1102 and a graphical interface generated by one or more graphics processor(s) 1108.

In at least one embodiment, one or more processor(s) 1102 each include one or more processor core(s) 1107 to process instructions which, when executed, perform operations for system and user software. In at least one embodiment, each of one or more processor core(s) 1107 is configured to process a specific instruction set 1109. In at least one embodiment, instruction set 1109 may facilitate Complex Instruction Set Computing (CISC), Reduced Instruction Set Computing (RISC), or computing via a Very Long Instruction Word (VLIW). In at least one embodiment, processor core(s) 1107 may each process a different instruction set 1109, which may include instructions to facilitate emulation of other instruction sets. In at least one embodiment, processor core(s) 1107 may also include other processing devices, such a Digital Signal Processor (DSP).

In at least one embodiment, processor(s) 1102 includes cache memory 1104. In at least one embodiment, processor (s) 1102 can have a single internal cache or multiple levels of internal cache. In at least one embodiment, cache memory is shared among various components of processor(s) 1102. In at least one embodiment, processor(s) 1102 also uses an external cache (e.g., a Level-3 (L3) cache or Last Level Cache (LLC)) (not shown), which may be shared among processor core(s) 1107 using known cache coherency techniques. In at least one embodiment, register file 1106 is additionally included in processor(s) 1102 which may include different types of registers for storing different types of data (e.g., integer registers, floating point registers, status registers, and an instruction pointer register). In at least one embodiment, register file 1106 may include general-purpose registers or other registers.

In at least one embodiment, one or more processor(s) 1102 are coupled with one or more interface bus(es) 1110 to transmit communication signals such as address, data, or control signals between processor(s) 1102 and other components in system 1100. In at least one embodiment, interface bus(es) 1110, in one embodiment, can be a processor bus, such as a version of a Direct Media Interface (DMI) bus. In at least one embodiment, interface bus(es) 1110 is not limited to a DMI bus, and may include one or more Peripheral Component Interconnect buses (e.g., PCI, PCI Express), memory busses, or other types of interface busses. In at least one embodiment processor(s) 1102 include an integrated memory controller 1116 and a platform controller hub 1130. In at least one embodiment, memory controller 1116 facilitates communication between a memory device and other components of system 1100, while platform controller hub (PCH) 1130 provides connections to I/O devices via a local I/O bus.

In at least one embodiment, memory device 1120 can be a dynamic random access memory (DRAM) device, a static random access memory (SRAM) device, flash memory device, phase-change memory device, or some other memory device having suitable performance to serve as process memory. In at least one embodiment memory device 1120 can operate as system memory for system 1100, to store data 1122 and instruction 1121 for use when one or more processor(s) 1102 executes an application or process. In at least one embodiment, memory controller 1116 also couples with an optional external graphics processor 1112, which may communicate with one or more graphics processor(s) 1108 in processor(s) 1102 to perform graphics and media operations. In at least one embodiment, a display device 1111 can connect to processor(s) 1102. In at least one embodiment display device 1111 can include one or more of an internal display device, as in a mobile electronic device or a laptop device or an external display device attached via a display interface (e.g., DisplayPort, etc.). In at least one embodiment, display device 1111 can include a head mounted display (HMD) such as a stereoscopic display device for use in virtual reality (VR) applications or augmented reality (AR) applications.

In at least one embodiment, platform controller hub 1130 enables peripherals to connect to memory device 1120 and processor(s) 1102 via a high-speed I/O bus. In at least one embodiment, I/O peripherals include, but are not limited to, an audio controller 1146, a network controller 1134, a firmware interface 1128, a wireless transceiver 1126, touch sensors 1125, a data storage device 1124 (e.g., hard disk drive, flash memory, etc.). In at least one embodiment, data storage device 1124 can connect via a storage interface (e.g., SATA) or via a peripheral bus, such as a Peripheral Component Interconnect bus (e.g., PCI, PCI Express). In at least one embodiment, touch sensors 1125 can include touch screen sensors, pressure sensors, or fingerprint sensors. In at least one embodiment, wireless transceiver 1126 can be a Wi-Fi transceiver, a Bluetooth transceiver, or a mobile network transceiver such as a 3G, 4G, or Long Term Evolution (LTE) transceiver. In at least one embodiment, firmware interface 1128 enables communication with system firmware, and can be, for example, a unified extensible firmware interface (UEFI). In at least one embodiment, network controller 1134 can enable a network connection to a wired network. In at least one embodiment, a high-performance network controller (not shown) couples with interface bus(es) 1110. In at least one embodiment, audio controller 1146 is a multi-channel high definition audio controller. In at least one embodiment, system 1100 includes an optional legacy I/O controller 1140 for coupling legacy (e.g., Personal System 2 (PS/2)) devices to system. In at least one embodiment, platform controller hub 1130 can also connect to one or more Universal Serial Bus (USB) controller(s) 1142 connect input devices, such as keyboard and mouse 1143 combinations, a camera 1144, or other USB input devices.

In at least one embodiment, an instance of memory controller 1116 and platform controller hub 1130 may be integrated into a discreet external graphics processor, such as external graphics processor 1112. In at least one embodiment, platform controller hub 1130 and/or memory controller 1116 may be external to one or more processor(s) 1102. For example, in at least one embodiment, system 1100 can include an external memory controller 1116 and platform controller hub 1130, which may be configured as a memory controller hub and peripheral controller hub within a system chipset that is in communication with processor(s) 1102.

Inference and/or training logic 715 are used to perform inferencing and/or training operations associated with one or more embodiments. Details regarding inference and/or training logic 715 are provided below in conjunction with FIGS. 7A and/or 7B. In at least one embodiment portions or all of inference and/or training logic 715 may be incorporated into graphics processor 1500. For example, in at least one embodiment, training and/or inferencing techniques described herein may use one or more of ALUs embodied in a graphics processor. Moreover, in at least one embodiment, inferencing and/or training operations described herein may be done using logic other than logic illustrated in FIGS. 7A and/or 7B. In at least one embodiment, weight parameters may be stored in on-chip or off-chip memory and/or registers (shown or not shown) that configure ALUs of a graphics processor to perform one or more machine learning algorithms, neural network architectures, use cases, or training techniques described herein.

Such components can be used for development and training of ASR systems.

Figure 12:
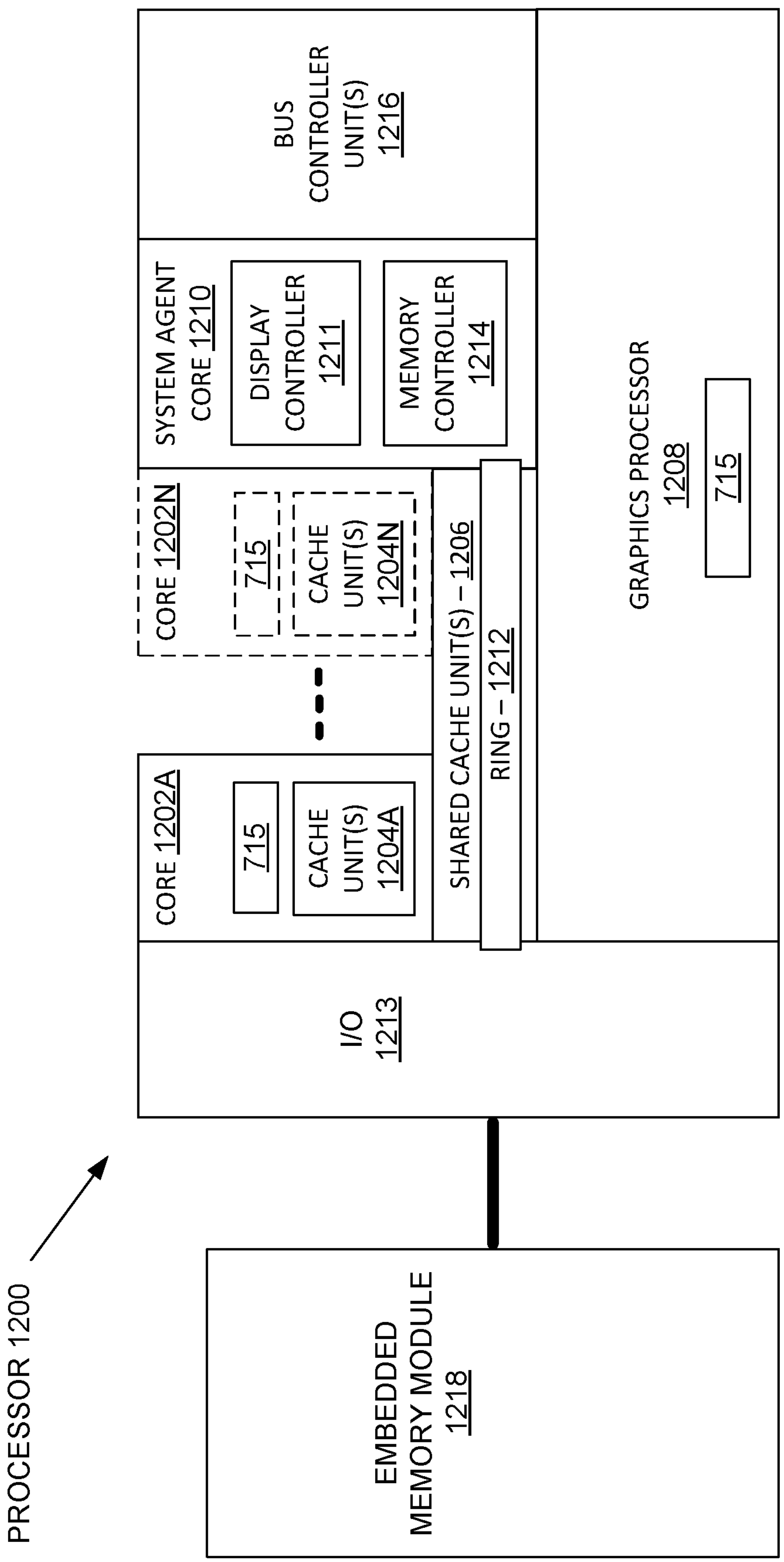
FIG. 12 illustrates at least portions of a graphics processor, according to one or more embodiments.

FIG. 12 is a block diagram of a processor 1200 having one or more processor core(s) 1202A-1202N, an integrated memory controller 1214, and an integrated graphics processor 1208, according to at least one embodiment. In at least one embodiment, processor 1200 can include additional cores up to and including additional core 1202N represented by dashed lined boxes. In at least one embodiment, each of processor core(s) 1202A-1202N includes one or more internal cache unit(s) 1204A-1204N. In at least one embodiment, each processor core also has access to one or more shared cached unit(s) 1206.

In at least one embodiment, internal cache unit(s) 1204A-1204N and shared cache unit(s) 1206 represent a cache memory hierarchy within processor 1200. In at least one embodiment, cache unit(s) 1204A-1204N may include at least one level of instruction and data cache within each processor core and one or more levels of shared mid-level cache, such as a Level 2 (L2), Level 3 (L3), Level 4 (L4), or other levels of cache, where a highest level of cache before external memory is classified as an LLC. In at least one embodiment, cache coherency logic maintains coherency between various cache unit(s) 1206 and 1204A-1204N.

In at least one embodiment, processor 1200 may also include a set of one or more bus controller unit(s) 1216 and a system agent core 1210. In at least one embodiment, one or more bus controller unit(s) 1216 manage a set of peripheral buses, such as one or more PCI or PCI express busses. In at least one embodiment, system agent core 1210 provides management functionality for various processor components. In at least one embodiment, system agent core 1210 includes one or more integrated memory controllers 1214 to manage access to various external memory devices (not shown).

In at least one embodiment, one or more of processor core(s) 1202A-1202N include support for simultaneous multi-threading. In at least one embodiment, system agent core 1210 includes components for coordinating and processor core(s) 1202A-1202N during multi-threaded processing. In at least one embodiment, system agent core 1210 may additionally include a power control unit (PCU), which includes logic and components to regulate one or more power states of processor core(s) 1202A-1202N and graphics processor 1208.

In at least one embodiment, processor 1200 additionally includes graphics processor 1208 to execute graphics processing operations. In at least one embodiment, graphics processor 1208 couples with shared cache unit(s) 1206, and system agent core 1210, including one or more integrated memory controllers 1214. In at least one embodiment, system agent core 1210 also includes a display controller 1211 to drive graphics processor output to one or more coupled displays. In at least one embodiment, display controller 1211 may also be a separate module coupled with graphics processor 1208 via at least one interconnect, or may be integrated within graphics processor 1208.

In at least one embodiment, a ring based interconnect unit 1212 is used to couple internal components of processor 1200. In at least one embodiment, an alternative interconnect unit may be used, such as a point-to-point interconnect, a switched interconnect, or other techniques. In at least one embodiment, graphics processor 1208 couples with a ring based interconnect unit 1212 via an I/O link 1213.

In at least one embodiment, I/O link 1213 represents at least one of multiple varieties of I/O interconnects, including an on package I/O interconnect which facilitates communication between various processor components and a high-performance embedded memory module 1218, such as an eDRAM module. In at least one embodiment, each of processor core(s) 1202A-1202N and graphics processor 1208 use embedded memory modules 1218 as a shared Last Level Cache.

In at least one embodiment, processor core(s) 1202A-1202N are homogenous cores executing a common instruction set architecture. In at least one embodiment, processor core(s) 1202A-1202N are heterogeneous in terms of instruction set architecture (ISA), where one or more of processor core(s) 1202A-1202N execute a common instruction set, while one or more other cores of processor core(s) 1202A-1202N executes a subset of a common instruction set or a different instruction set. In at least one embodiment, processor core(s) 1202A-1202N are heterogeneous in terms of microarchitecture, where one or more cores having a relatively higher power consumption couple with one or more power cores having a lower power consumption. In at least one embodiment, processor 1200 can be implemented on one or more chips or as an SoC integrated circuit.

Inference and/or training logic 715 are used to perform inferencing and/or training operations associated with one or more embodiments. Details regarding inference and/or training logic 715 are provided below in conjunction with FIGS. 7A and/or 7B. In at least one embodiment portions or all of inference and/or training logic 715 may be incorporated into processor 1200. For example, in at least one embodiment, training and/or inferencing techniques described herein may use one or more of ALUs embodied in graphics processor 1208, graphics core(s) 1202A-1202N, or other components in FIG. 12. Moreover, in at least one embodiment, inferencing and/or training operations described herein may be done using logic other than logic illustrated in FIGS. 7A and/or 7B. In at least one embodiment, weight parameters may be stored in on-chip or off-chip memory and/or registers (shown or not shown) that configure ALUs of graphics processor 1200 to perform one or more machine learning algorithms, neural network architectures, use cases, or training techniques described herein.

Such components can be used for development and training of ASR systems.

Virtualized Computing Platform

Figure 13:
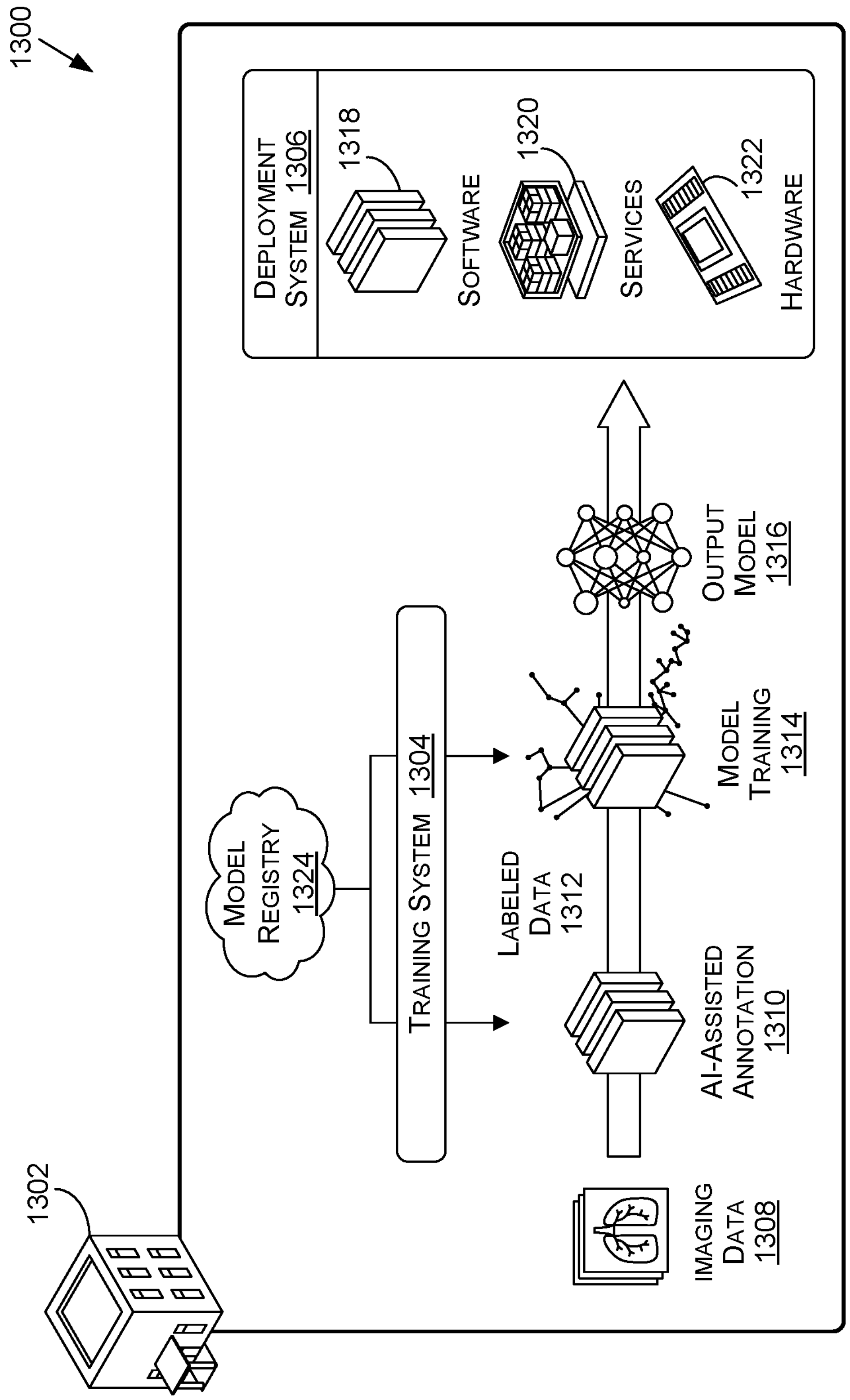
FIG. 13 is an example data flow diagram for an advanced computing pipeline, in accordance with at least one embodiment.

FIG. 13 is an example data flow diagram for a process 1300 of generating and deploying an image processing and inferencing pipeline, in accordance with at least one embodiment. In at least one embodiment, process 1300 may be deployed for use with imaging devices, processing devices, and/or other device types at one or more facilities 1302. Process 1300 may be executed within a training system 1304 and/or a deployment system 1306. In at least one embodiment, training system 1304 may be used to perform training, deployment, and implementation of machine learning models (e.g., neural networks, object detection algorithms, computer vision algorithms, etc.) for use in deployment system 1306. In at least one embodiment, deployment system 1306 may be configured to offload processing and compute resources among a distributed computing environment to reduce infrastructure requirements at facility 1302. In at least one embodiment, one or more applications in a pipeline may use or call upon services (e.g., inference, visualization, compute, AI, etc.) of deployment system 1306 during execution of applications.

In at least one embodiment, some of applications used in advanced processing and inferencing pipelines may use machine learning models or other AI to perform one or more processing steps. In at least one embodiment, machine learning models may be trained at facility 1302 using data 1308 (such as imaging data) generated at facility 1302 (and stored on one or more picture archiving and communication system (PACS) servers at facility 1302), may be trained using imaging or sequencing data 1308 from another facility(ies), or a combination thereof. In at least one embodiment, training system 1304 may be used to provide applications, services, and/or other resources for generating working, deployable machine learning models for deployment system 1306.

In at least one embodiment, model registry 1324 may be backed by object storage that may support versioning and object metadata. In at least one embodiment, object storage may be accessible through, for example, a cloud storage compatible application programming interface (API) from within a cloud platform. In at least one embodiment, machine learning models within model registry 1324 may uploaded, listed, modified, or deleted by developers or partners of a system interacting with an API. In at least one embodiment, an API may provide access to methods that allow users with appropriate credentials to associate models with applications, such that models may be executed as part of execution of containerized instantiations of applications.

In at least one embodiment, training system 1304 (FIG. 13) may include a scenario where facility 1302 is training their own machine learning model, or has an existing machine learning model that needs to be optimized or updated. In at least one embodiment, imaging data 1308 generated by imaging device(s), sequencing devices, and/or other device types may be received. In at least one embodiment, once imaging data 1308 is received, AI-assisted annotation 1310 may be used to aid in generating annotations corresponding to imaging data 1308 to be used as ground truth data for a machine learning model. In at least one embodiment, AI-assisted annotation 1310 may include one or more machine learning models (e.g., convolutional neural networks (CNNs)) that may be trained to generate annotations corresponding to certain types of imaging data 1308 (e.g., from certain devices). In at least one embodiment, AI-assisted annotation 1310 may then be used directly, or may be adjusted or fine-tuned using an annotation tool to generate ground truth data. In at least one embodiment, AI-assisted annotation 1310, labeled data 1312, or a combination thereof may be used as ground truth data for training a machine learning model. In at least one embodiment, a trained machine learning model may be referred to as output model(s) 1316, and may be used by deployment system 1306, as described herein.

In at least one embodiment, a training pipeline may include a scenario where facility 1302 needs a machine learning model for use in performing one or more processing tasks for one or more applications in deployment system 1306, but facility 1302 may not currently have such a machine learning model (or may not have a model that is optimized, efficient, or effective for such purposes). In at least one embodiment, an existing machine learning model may be selected from a model registry 1324. In at least one embodiment, model registry 1324 may include machine learning models trained to perform a variety of different inference tasks on imaging data. In at least one embodiment, machine learning models in model registry 1324 may have been trained on imaging data from different facilities than facility 1302 (e.g., facilities remotely located). In at least one embodiment, machine learning models may have been trained on imaging data from one location, two locations, or any number of locations. In at least one embodiment, when being trained on imaging data from a specific location, training may take place at that location, or at least in a manner that protects confidentiality of imaging data or restricts imaging data from being transferred off-premises. In at least one embodiment, once a model is trained—or partially trained—at one location, a machine learning model may be added to model registry 1324. In at least one embodiment, a machine learning model may then be retrained, or updated, at any number of other facilities, and a retrained or updated model may be made available in model registry 1324. In at least one embodiment, a machine learning model may then be selected from model registry 1324—and referred to as output model(s) 1316—and may be used in deployment system 1306 to perform one or more processing tasks for one or more applications of a deployment system.

In at least one embodiment, a scenario may include facility 1302 requiring a machine learning model for use in performing one or more processing tasks for one or more applications in deployment system 1306, but facility 1302 may not currently have such a machine learning model (or may not have a model that is optimized, efficient, or effective for such purposes). In at least one embodiment, a machine learning model selected from model registry 1324 may not be fine-tuned or optimized for imaging data 1308 generated at facility 1302 because of differences in populations, robustness of training data used to train a machine learning model, diversity in anomalies of training data, and/or other issues with training data. In at least one embodiment, AI-assisted annotation 1310 may be used to aid in generating annotations corresponding to imaging data 1308 to be used as ground truth data for retraining or updating a machine learning model. In at least one embodiment, labeled data 1312 may be used as ground truth data for training a machine learning model. In at least one embodiment, retraining or updating a machine learning model may be referred to as model training 1314. In at least one embodiment, model training 1314—e.g., AI-assisted annotation 1310, labeled data 1312, or a combination thereof—may be used as ground truth data for retraining or updating a machine learning model. In at least one embodiment, a trained machine learning model may be referred to as output model(s) 1316, and may be used by deployment system 1306, as described herein.

In at least one embodiment, deployment system 1306 may include software 1318, services 1320, hardware 1322, and/or other components, features, and functionality. In at least one embodiment, deployment system 1306 may include a software "stack," such that software 1318 may be built on top of services 1320 and may use services 1320 to perform some or all of processing tasks, and services 1320 and software 1318 may be built on top of hardware 1322 and use hardware 1322 to execute processing, storage, and/or other compute tasks of deployment system 1306. In at least one embodiment, software 1318 may include any number of different containers, where each container may execute an instantiation of an application. In at least one embodiment, each application may perform one or more processing tasks in an advanced processing and inferencing pipeline (e.g., inferencing, object detection, feature detection, segmentation, image enhancement, calibration, etc.). In at least one embodiment, an advanced processing and inferencing pipeline may be defined based on selections of different containers that are desired or required for processing imaging data 1308, in addition to containers that receive and configure imaging data for use by each container and/or for use by facility 1302 after processing through a pipeline (e.g., to convert outputs back to a usable data type). In at least one embodiment, a combination of containers within software 1318 (e.g., that make up a pipeline) may be referred to as a virtual instrument (as described in more detail herein), and a virtual instrument may leverage services 1320 and hardware 1322 to execute some or all processing tasks of applications instantiated in containers.

In at least one embodiment, a data processing pipeline may receive input data (e.g., imaging data 1308) in a specific format in response to an inference request (e.g., a request from a user of deployment system 1306). In at least one embodiment, input data may be representative of one or more images, video, and/or other data representations generated by one or more imaging devices. In at least one embodiment, data may undergo pre-processing as part of data processing pipeline to prepare data for processing by one or more applications. In at least one embodiment, post-processing may be performed on an output of one or more inferencing tasks or other processing tasks of a pipeline to prepare an output data for a next application and/or to prepare output data for transmission and/or use by a user (e.g., as a response to an inference request). In at least one embodiment, inferencing tasks may be performed by one or more machine learning models, such as trained or deployed neural networks, which may include output model(s) 1316 of training system 1304.

In at least one embodiment, tasks of data processing pipeline may be encapsulated in a container(s) that each represents a discrete, fully functional instantiation of an application and virtualized computing environment that is able to reference machine learning models. In at least one embodiment, containers or applications may be published into a private (e.g., limited access) area of a container registry (described in more detail herein), and trained or deployed models may be stored in model registry 1324 and associated with one or more applications. In at least one embodiment, images of applications (e.g., container images) may be available in a container registry, and once selected by a user from a container registry for deployment in a pipeline, an image may be used to generate a container for an instantiation of an application for use by a user's system.

In at least one embodiment, developers (e.g., software developers, clinicians, doctors, etc.) may develop, publish, and store applications (e.g., as containers) for performing image processing and/or inferencing on supplied data. In at least one embodiment, development, publishing, and/or storing may be performed using a software development kit (SDK) associated with a system (e.g., to ensure that an application and/or container developed is compliant with or compatible with a system). In at least one embodiment, an application that is developed may be tested locally (e.g., at a first facility, on data from a first facility) with an SDK which may support at least some of services 1320 as a system (e.g., system 1200 of FIG. 12). In at least one embodiment, because DICOM objects may contain anywhere from one to hundreds of images or other data types, and due to a variation in data, a developer may be responsible for managing (e.g., setting constructs for, building pre-processing into an application, etc.) extraction and preparation of incoming data. In at least one embodiment, once validated by system 1300 (e.g., for accuracy), an application may be available in a container registry for selection and/or implementation by a user to perform one or more processing tasks with respect to data at a facility (e.g., a second facility) of a user.

In at least one embodiment, developers may then share applications or containers through a network for access and use by users of a system (e.g., system 1300 of FIG. 13). In at least one embodiment, completed and validated applications or containers may be stored in a container registry and associated machine learning models may be stored in model registry 1324. In at least one embodiment, a requesting entity—who provides an inference or image processing request—may browse a container registry and/or model registry 1324 for an application, container, dataset, machine learning model, etc., select a desired combination of elements for inclusion in data processing pipeline, and submit an imaging processing request. In at least one embodiment, a request may include input data (and associated patient data, in some examples) that is necessary to perform a request, and/or may include a selection of application(s) and/or machine learning models to be executed in processing a request. In at least one embodiment, a request may then be passed to one or more components of deployment system 1306 (e.g., a cloud) to perform processing of data processing pipeline. In at least one embodiment, processing by deployment system 1306 may include referencing selected elements (e.g., applications, containers, models, etc.) from a container registry and/or model registry 1324. In at least one embodiment, once results are generated by a pipeline, results may be returned to a user for reference (e.g., for viewing in a viewing application suite executing on a local, on-premises workstation or terminal).

In at least one embodiment, to aid in processing or execution of applications or containers in pipelines, services 1320 may be leveraged. In at least one embodiment, services 1320 may include compute services, artificial intelligence (AI) services, visualization services, and/or other service types. In at least one embodiment, services 1320 may provide functionality that is common to one or more applications in software 1318, so functionality may be abstracted to a service that may be called upon or leveraged by applications. In at least one embodiment, functionality provided by services 1320 may run dynamically and more efficiently, while also scaling well by allowing applications to process data in parallel (e.g., using a parallel computing platform 1230 (FIG. 12)). In at least one embodiment, rather than each application that shares a same functionality offered by services 1320 being required to have a respective instance of services 1320, services 1320 may be shared between and among various applications. In at least one embodiment, services may include an inference server or engine that may be used for executing detection or segmentation tasks, as non-limiting examples. In at least one embodiment, a model training service may be included that may provide machine learning model training and/or retraining capabilities. In at least one embodiment, a data augmentation service may further be included that may provide GPU accelerated data (e.g., DICOM, RIS, CIS, REST compliant, RPC, raw, etc.) extraction, resizing, scaling, and/or other augmentation. In at least one embodiment, a visualization service may be used that may add image rendering effects—such as ray-tracing, rasterization, denoising, sharpening, etc.—to add realism to two-dimensional (2D) and/or three-dimensional (3D) models. In at least one embodiment, virtual instrument services may be included that provide for beam-forming, segmentation, inferencing, imaging, and/or support for other applications within pipelines of virtual instruments.

In at least one embodiment, where services 1320 includes an AI service (e.g., an inference service), one or more machine learning models may be executed by calling upon (e.g., as an API call) an inference service (e.g., an inference server) to execute machine learning model(s), or processing thereof, as part of application execution. In at least one embodiment, where another application includes one or more machine learning models for segmentation tasks, an application may call upon an inference service to execute machine learning models for performing one or more of processing operations associated with segmentation tasks. In at least one embodiment, software 1318 implementing advanced processing and inferencing pipeline that includes segmentation application and anomaly detection application may be streamlined because each application may call upon a same inference service to perform one or more inferencing tasks.

In at least one embodiment, hardware 1322 may include GPUs, CPUs, graphics cards, an AI/deep learning system (e.g., an AI supercomputer, such as NVIDIA's DGX), a cloud platform, or a combination thereof. In at least one embodiment, different types of hardware 1322 may be used to provide efficient, purpose-built support for software 1318 and services 1320 in deployment system 1306. In at least one embodiment, use of GPU processing may be implemented for processing locally (e.g., at facility 1302), within an AI/deep learning system, in a cloud system, and/or in other processing components of deployment system 1306 to improve efficiency, accuracy, and efficacy of image processing and generation. In at least one embodiment, software 1318 and/or services 1320 may be optimized for GPU processing with respect to deep learning, machine learning, and/or high-performance computing, as non-limiting examples. In at least one embodiment, at least some of computing environment of deployment system 1306 and/or training system 1304 may be executed in a datacenter one or more supercomputers or high performance computing systems, with GPU optimized software (e.g., hardware and software combination of NVIDIA's DGX System). In at least one embodiment, hardware 1322 may include any number of GPUs that may be called upon to perform processing of data in parallel, as described herein. In at least one embodiment, cloud platform may further include GPU processing for GPU-optimized execution of deep learning tasks, machine learning tasks, or other computing tasks. In at least one embodiment, cloud platform (e.g., NVIDIA's NGC) may be executed using an AI/deep learning supercomputer(s) and/or GPU-optimized software (e.g., as provided on NVIDIA's DGX Systems) as a hardware abstraction and scaling platform. In at least one embodiment, cloud platform may integrate an application container clustering system or orchestration system (e.g., KUBERNETES) on multiple GPUs to enable seamless scaling and load balancing.

Figure 14:
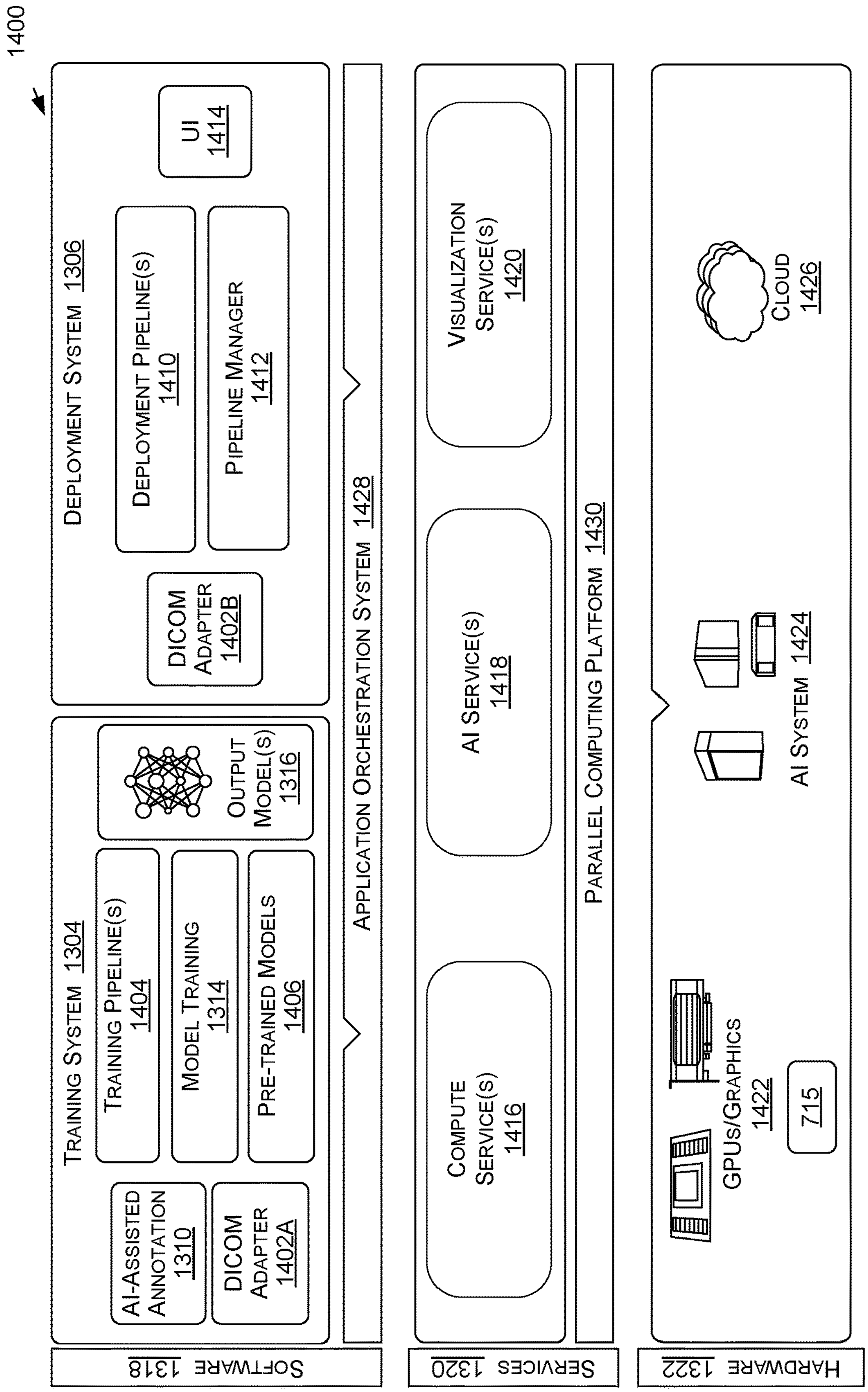
FIG. 14 is a system diagram for an example system for training, adapting, instantiating and deploying machine learning models in an advanced computing pipeline, in accordance with at least one embodiment.

FIG. 14 is a system diagram for an example system 1400 for generating and deploying an imaging deployment pipeline, in accordance with at least one embodiment. In at least one embodiment, system 1400 may be used to implement process 1300 of FIG. 13 and/or other processes including advanced processing and inferencing pipelines. In at least one embodiment, system 1400 may include training system 1304 and deployment system 1306. In at least one embodiment, training system 1304 and deployment system 1306 may be implemented using software 1318, services 1320, and/or hardware 1322, as described herein.

In at least one embodiment, system 1400 (e.g., training system 1304 and/or deployment system 1306) may implemented in a cloud computing environment (e.g., using cloud 1426). In at least one embodiment, system 1400 may be implemented locally with respect to a healthcare services facility, or as a combination of both cloud and local computing resources. In at least one embodiment, access to APIs in cloud 1426 may be restricted to authorized users through enacted security measures or protocols. In at least one embodiment, a security protocol may include web tokens that may be signed by an authentication (e.g., AuthN, AuthZ, Gluecon, etc.) service and may carry appropriate authorization. In at least one embodiment, APIs of virtual instruments (described herein), or other instantiations of system 1400, may be restricted to a set of public IPs that have been vetted or authorized for interaction.

In at least one embodiment, various components of system 1400 may communicate between and among one another using any of a variety of different network types, including but not limited to local area networks (LANs) and/or wide area networks (WANs) via wired and/or wireless communication protocols. In at least one embodiment, communication between facilities and components of system 1400 (e.g., for transmitting inference requests, for receiving results of inference requests, etc.) may be communicated over data bus(ses), wireless data protocols (Wi-Fi), wired data protocols (e.g., Ethernet), etc.

In at least one embodiment, training system 1304 may execute training pipelines 1404, similar to those described herein with respect to FIG. 13. In at least one embodiment, where one or more machine learning models are to be used in deployment pipeline(s) 1410 by deployment system 1306, training pipelines 1404 may be used to train or retrain one or more (e.g. pre-trained) models, and/or implement one or more of pre-trained models 1406 (e.g., without a need for retraining or updating). In at least one embodiment, as a result of training pipelines 1404, output model(s) 1316 may be generated. In at least one embodiment, training pipelines 1404 may include any number of processing steps, such as but not limited to imaging data (or other input data) conversion or adaption In at least one embodiment, for different machine learning models used by deployment system 1306, different training pipelines 1404 may be used. In at least one embodiment, training pipeline 1404 similar to a first example described with respect to FIG. 13 may be used for a first machine learning model, training pipeline 1404 similar to a second example described with respect to FIG. 13 may be used for a second machine learning model, and training pipeline 1404 similar to a third example described with respect to FIG. 13 may be used for a third machine learning model. In at least one embodiment, any combination of tasks within training system 1304 may be used depending on what is required for each respective machine learning model. In at least one embodiment, one or more of machine learning models may already be trained and ready for deployment so machine learning models may not undergo any processing by training system 1304, and may be implemented by deployment system 1306.

In at least one embodiment, output model(s) 1316 and/or pre-trained models 1406 may include any types of machine learning models depending on implementation or embodiment. In at least one embodiment, and without limitation, machine learning models used by system 1400 may include machine learning model(s) using linear regression, logistic regression, decision trees, support vector machines (SVM), Naïve Bayes, k-nearest neighbor (Knn), K means clustering, random forest, dimensionality reduction algorithms, gradient boosting algorithms, neural networks (e.g., auto-encoders, convolutional, recurrent, perceptrons, Long/Short Term Memory (LSTM), Hopfield, Boltzmann, deep belief, deconvolutional, generative adversarial, liquid state machine, etc.), and/or other types of machine learning models.

In at least one embodiment, training pipelines 1404 may include AI-assisted annotation, as described in more detail herein with respect to at least FIG. 14B. In at least one embodiment, labeled data 1312 (e.g., traditional annotation) may be generated by any number of techniques. In at least one embodiment, labels or other annotations may be generated within a drawing program (e.g., an annotation program), a computer aided design (CAD) program, a labeling program, another type of program suitable for generating annotations or labels for ground truth, and/or may be hand drawn, in some examples. In at least one embodiment, ground truth data may be synthetically produced (e.g., generated from computer models or renderings), real produced (e.g., designed and produced from real-world data), machine-automated (e.g., using feature analysis and learning to extract features from data and then generate labels), human annotated (e.g., labeler, or annotation expert, defines location of labels), and/or a combination thereof. In at least one embodiment, for each instance of imaging data 1308 (or other data type used by machine learning models), there may be corresponding ground truth data generated by training system 1304. In at least one embodiment, AI-assisted annotation may be performed as part of deployment pipeline(s) 1410; either in addition to, or in lieu of AI-assisted annotation included in training pipelines 1404. In at least one embodiment, system 1400 may include a multi-layer platform that may include a software layer (e.g., software 1318) of diagnostic applications (or other application types) that may perform one or more medical imaging and diagnostic functions. In at least one embodiment, system 1400 may be communicatively coupled to (e.g., via encrypted links) PACS server networks of one or more facilities. In at least one embodiment, system 1400 may be configured to access and referenced data from PACS servers to perform operations, such as training machine learning models, deploying machine learning models, image processing, inferencing, and/or other operations.

In at least one embodiment, a software layer may be implemented as a secure, encrypted, and/or authenticated API through which applications or containers may be invoked (e.g., called) from an external environment(s) (e.g., facility 1302). In at least one embodiment, applications may then call or execute one or more services 1320 for performing compute, AI, or visualization tasks associated with respective applications, and software 1318 and/or services 1320 may leverage hardware 1322 to perform processing tasks in an effective and efficient manner. In at least one embodiment, communications sent to, or received by, a training system 1304 and a deployment system 1306 may occur using a pair of DICOM adapters 1402A, 1402B.

In at least one embodiment, deployment system 1306 may execute deployment pipeline(s) 1410. In at least one embodiment, deployment pipeline(s) 1410 may include any number of applications that may be sequentially, non-sequentially, or otherwise applied to imaging data (and/or other data types) generated by imaging devices, sequencing devices, genomics devices, etc.—including AI-assisted annotation, as described above. In at least one embodiment, as described herein, a deployment pipeline(s) 1410 for an individual device may be referred to as a virtual instrument for a device (e.g., a virtual ultrasound instrument, a virtual CT scan instrument, a virtual sequencing instrument, etc.). In at least one embodiment, for a single device, there may be more than one deployment pipeline(s) 1410 depending on information desired from data generated by a device. In at least one embodiment, where detections of anomalies are desired from an MRI machine, there may be a first deployment pipeline(s) 1410, and where image enhancement is desired from output of an MRI machine, there may be a second deployment pipeline(s) 1410.

In at least one embodiment, an image generation application may include a processing task that includes use of a machine learning model. In at least one embodiment, a user may desire to use their own machine learning model, or to select a machine learning model from model registry 1324. In at least one embodiment, a user may implement their own machine learning model or select a machine learning model for inclusion in an application for performing a processing task. In at least one embodiment, applications may be selectable and customizable, and by defining constructs of applications, deployment and implementation of applications for a particular user are presented as a more seamless user experience. In at least one embodiment, by leveraging other features of system 1400—such as services 1320 and hardware 1322—deployment pipeline(s) 1410 may be even more user friendly, provide for easier integration, and produce more accurate, efficient, and timely results.

In at least one embodiment, deployment system 1306 may include a user interface ("UI") 1414 (e.g., a graphical user interface, a web interface, etc.) that may be used to select applications for inclusion in deployment pipeline(s) 1410, arrange applications, modify or change applications or parameters or constructs thereof, use and interact with deployment pipeline(s) 1410 during set-up and/or deployment, and/or to otherwise interact with deployment system 1306. In at least one embodiment, although not illustrated with respect to training system 1304, UI 1414 (or a different user interface) may be used for selecting models for use in deployment system 1306, for selecting models for training, or retraining, in training system 1304, and/or for otherwise interacting with training system 1304.

In at least one embodiment, pipeline manager 1412 may be used, in addition to an application orchestration system 1428, to manage interaction between applications or containers of deployment pipeline(s) 1410 and services 1320 and/or hardware 1322. In at least one embodiment, pipeline manager 1412 may be configured to facilitate interactions from application to application, from application to services 1320, and/or from application or service to hardware 1322. In at least one embodiment, although illustrated as included in software 1318, this is not intended to be limiting, and in some examples pipeline manager 1412 may be included in services 1320. In at least one embodiment, application orchestration system 1428 (e.g., Kubernetes, DOCKER, etc.) may include a container orchestration system that may group applications into containers as logical units for coordination, management, scaling, and deployment. In at least one embodiment, by associating applications from deployment pipeline(s) 1410 (e.g., a reconstruction application, a segmentation application, etc.) with individual containers, each application may execute in a self-contained environment (e.g., at a kernel level) to increase speed and efficiency.

In at least one embodiment, each application and/or container (or image thereof) may be individually developed, modified, and deployed (e.g., a first user or developer may develop, modify, and deploy a first application and a second user or developer may develop, modify, and deploy a second application separate from a first user or developer), which may allow for focus on, and attention to, a task of a single application and/or container(s) without being hindered by tasks of another application(s) or container(s). In at least one embodiment, communication, and cooperation between different containers or applications may be aided by pipeline manager 1412 and application orchestration system 1428. In at least one embodiment, so long as an expected input and/or output of each container or application is known by a system (e.g., based on constructs of applications or containers), application orchestration system 1428 and/or pipeline manager 1412 may facilitate communication among and between, and sharing of resources among and between, each of applications or containers. In at least one embodiment, because one or more of applications or containers in deployment pipeline(s) 1410 may share same services and resources, application orchestration system 1428 may orchestrate, load balance, and determine sharing of services or resources between and among various applications or containers. In at least one embodiment, a scheduler may be used to track resource requirements of applications or containers, current usage or planned usage of these resources, and resource availability. In at least one embodiment, a scheduler may thus allocate resources to different applications and distribute resources between and among applications in view of requirements and availability of a system. In some examples, a scheduler (and/or other component of application orchestration system 1428) may determine resource availability and distribution based on constraints imposed on a system (e.g., user constraints), such as quality of service (QoS), urgency of need for data outputs (e.g., to determine whether to execute real-time processing or delayed processing), etc.

In at least one embodiment, services 1320 leveraged by and shared by applications or containers in deployment system 1306 may include compute service(s) 1416, AI service(s) 1418, visualization service(s) 1420, and/or other service types. In at least one embodiment, applications may call (e.g., execute) one or more of services 1320 to perform processing operations for an application. In at least one embodiment, compute service(s) 1416 may be leveraged by applications to perform super-computing or other high-performance computing (HPC) tasks. In at least one embodiment, compute service(s) 1416 may be leveraged to perform parallel processing (e.g., using a parallel computing platform 1430) for processing data through one or more of applications and/or one or more tasks of a single application, substantially simultaneously. In at least one embodiment, parallel computing platform 1430 (e.g., NVIDIA's CUDA) may enable general purpose computing on GPUs (GPGPU) (e.g., GPUs/Graphics 1422). In at least one embodiment, a software layer of parallel computing platform 1430 may provide access to virtual instruction sets and parallel computational elements of GPUs, for execution of compute kernels. In at least one embodiment, parallel computing platform 1430 may include memory and, in some embodiments, a memory may be shared between and among multiple containers, and/or between and among different processing tasks within a single container. In at least one embodiment, inter-process communication (IPC) calls may be generated for multiple containers and/or for multiple processes within a container to use same data from a shared segment of memory of parallel computing platform 1430 (e.g., where multiple different stages of an application or multiple applications are processing same information). In at least one embodiment, rather than making a copy of data and moving data to different locations in memory (e.g., a read/write operation), same data in same location of a memory may be used for any number of processing tasks (e.g., at a same time, at different times, etc.). In at least one embodiment, as data is used to generate new data as a result of processing, this information of a new location of data may be stored and shared between various applications. In at least one embodiment, location of data and a location of updated or modified data may be part of a definition of how a payload is understood within containers.

In at least one embodiment, AI service(s) 1418 may be leveraged to perform inferencing services for executing machine learning model(s) associated with applications (e.g., tasked with performing one or more processing tasks of an application). In at least one embodiment, AI service(s) 1418 may leverage AI system 1424 to execute machine learning model(s) (e.g., neural networks, such as CNNs) for segmentation, reconstruction, object detection, feature detection, classification, and/or other inferencing tasks. In at least one embodiment, applications of deployment pipeline(s) 1410 may use one or more of output model(s) 1316 from training system 1304 and/or other models of applications to perform inference on imaging data. In at least one embodiment, two or more examples of inferencing using application orchestration system 1428 (e.g., a scheduler) may be available. In at least one embodiment, a first category may include a high priority/low latency path that may achieve higher service level agreements, such as for performing inference on urgent requests during an emergency, or for a radiologist during diagnosis. In at least one embodiment, a second category may include a standard priority path that may be used for requests that may be non-urgent or where analysis may be performed at a later time. In at least one embodiment, application orchestration system 1428 may distribute resources (e.g., services 1320 and/or hardware 1322) based on priority paths for different inferencing tasks of AI service(s) 1418.

In at least one embodiment, shared storage may be mounted to AI service(s) 1418 within system 1400. In at least one embodiment, shared storage may operate as a cache (or other storage device type) and may be used to process inference requests from applications. In at least one embodiment, when an inference request is submitted, a request may be received by a set of API instances of deployment system 1306, and one or more instances may be selected (e.g., for best fit, for load balancing, etc.) to process a request. In at least one embodiment, to process a request, a request may be entered into a database, a machine learning model may be located from model registry 1324 if not already in a cache, a validation step may ensure appropriate machine learning model is loaded into a cache (e.g., shared storage), and/or a copy of a model may be saved to a cache. In at least one embodiment, a scheduler (e.g., of pipeline manager 1412) may be used to launch an application that is referenced in a request if an application is not already running or if there are not enough instances of an application. In at least one embodiment, if an inference server is not already launched to execute a model, an inference server may be launched. Any number of inference servers may be launched per model. In at least one embodiment, in a pull model, in which inference servers are clustered, models may be cached whenever load balancing is advantageous. In at least one embodiment, inference servers may be statically loaded in corresponding, distributed servers.

In at least one embodiment, inferencing may be performed using an inference server that runs in a container. In at least one embodiment, an instance of an inference server may be associated with a model (and optionally a plurality of versions of a model). In at least one embodiment, if an instance of an inference server does not exist when a request to perform inference on a model is received, a new instance may be loaded. In at least one embodiment, when starting an inference server, a model may be passed to an inference server such that a same container may be used to serve different models so long as inference server is running as a different instance.

In at least one embodiment, during application execution, an inference request for a given application may be received, and a container (e.g., hosting an instance of an inference server) may be loaded (if not already), and a start procedure may be called. In at least one embodiment, pre-processing logic in a container may load, decode, and/or perform any additional pre-processing on incoming data (e.g., using a CPU(s) and/or GPU(s)). In at least one embodiment, once data is prepared for inference, a container may perform inference as necessary on data. In at least one embodiment, this may include a single inference call on one image (e.g., a hand X-ray), or may require inference on hundreds of images (e.g., a chest CT). In at least one embodiment, an application may summarize results before completing, which may include, without limitation, a single confidence score, pixel level-segmentation, voxel-level segmentation, generating a visualization, or generating text to summarize findings. In at least one embodiment, different models or applications may be assigned different priorities. For example, some models may have a real-time (TAT<1 min) priority while others may have lower priority (e.g., TAT<10 min). In at least one embodiment, model execution times may be measured from requesting institution or entity and may include partner network traversal time, as well as execution on an inference service.

In at least one embodiment, transfer of requests between services 1320 and inference applications may be hidden behind a software development kit (SDK), and robust transport may be provide through a queue. In at least one embodiment, a request will be placed in a queue via an API for an individual application/tenant ID combination and an SDK will pull a request from a queue and give a request to an application. In at least one embodiment, a name of a queue may be provided in an environment from where an SDK will pick it up. In at least one embodiment, asynchronous communication through a queue may be useful as it may allow any instance of an application to pick up work as it becomes available. Results may be transferred back through a queue, to ensure no data is lost. In at least one embodiment, queues may also provide an ability to segment work, as highest priority work may go to a queue with most instances of an application connected to it, while lowest priority work may go to a queue with a single instance connected to it that processes tasks in an order received. In at least one embodiment, an application may run on a GPU-accelerated instance generated in cloud 1426, and an inference service may perform inferencing on a GPU.

In at least one embodiment, visualization service(s) 1420 may be leveraged to generate visualizations for viewing outputs of applications and/or deployment pipeline(s) 1410. In at least one embodiment, GPUs/Graphics 1422 may be leveraged by visualization service(s) 1420 to generate visualizations. In at least one embodiment, rendering effects, such as ray-tracing, may be implemented by visualization service(s) 1420 to generate higher quality visualizations. In at least one embodiment, visualizations may include, without limitation, 2D image renderings, 3D volume renderings, 3D volume reconstruction, 2D tomographic slices, virtual reality displays, augmented reality displays, etc. In at least one embodiment, virtualized environments may be used to generate a virtual interactive display or environment (e.g., a virtual environment) for interaction by users of a system (e.g., doctors, nurses, radiologists, etc.). In at least one embodiment, visualization service(s) 1420 may include an internal visualizer, cinematics, and/or other rendering or image processing capabilities or functionality (e.g., ray tracing, rasterization, internal optics, etc.).

In at least one embodiment, hardware 1322 may include GPUs/Graphics 1422, AI system 1424, cloud 1426, and/or any other hardware used for executing training system 1304 and/or deployment system 1306. In at least one embodiment, GPUs/Graphics 1422 (e.g., NVIDIA's TESLA and/or QUADRO GPUs) may include any number of GPUs that may be used for executing processing tasks of compute service(s) 1416, AI service(s) 1418, visualization service(s) 1420, other services, and/or any of features or functionality of software 1318. For example, with respect to AI service(s) 1418, GPUs/Graphics 1422 may be used to perform pre-processing on imaging data (or other data types used by machine learning models), post-processing on outputs of machine learning models, and/or to perform inferencing (e.g., to execute machine learning models). In at least one embodiment, cloud 1426, AI system 1424, and/or other components of system 1400 may use GPUs/Graphics 1422. In at least one embodiment, cloud 1426 may include a GPU-optimized platform for deep learning tasks. In at least one embodiment, AI system 1424 may use GPUs, and cloud 1426—or at least a portion tasked with deep learning or inferencing—may be executed using one or more AI systems 1424. As such, although hardware 1322 is illustrated as discrete components, this is not intended to be limiting, and any components of hardware 1322 may be combined with, or leveraged by, any other components of hardware 1322.

In at least one embodiment, AI system 1424 may include a purpose-built computing system (e.g., a super-computer or an HPC) configured for inferencing, deep learning, machine learning, and/or other artificial intelligence tasks. In at least one embodiment, AI system 1424 (e.g., NVIDIA's DGX) may include GPU-optimized software (e.g., a software stack) that may be executed using a plurality of GPUs/Graphics 1422, in addition to CPUs, RAM, storage, and/or other components, features, or functionality. In at least one embodiment, one or more AI systems 1424 may be implemented in cloud 1426 (e.g., in a data center) for performing some or all of AI-based processing tasks of system 1400.

In at least one embodiment, cloud 1426 may include a GPU-accelerated infrastructure (e.g., NVIDIA's NGC) that may provide a GPU-optimized platform for executing processing tasks of system 1400. In at least one embodiment, cloud 1426 may include an AI system 1424 for performing one or more of AI-based tasks of system 1400 (e.g., as a hardware abstraction and scaling platform). In at least one embodiment, cloud 1426 may integrate with application orchestration system 1428 leveraging multiple GPUs to enable seamless scaling and load balancing between and among applications and services 1320. In at least one embodiment, cloud 1426 may tasked with executing at least some of services 1320 of system 1400, including compute service(s) 1416, AI service(s) 1418, and/or visualization service(s) 1420, as described herein. In at least one embodiment, cloud 1426 may perform small and large batch inference (e.g., executing NVIDIA's TENSOR RT), provide an accelerated parallel computing API and platform 1430 (e.g., NVIDIA's CUDA), execute application orchestration system 1428 (e.g., KUBERNETES), provide a graphics rendering API and platform (e.g., for ray-tracing, 2D graphics, 3D graphics, and/or other rendering techniques to produce higher quality cinematics), and/or may provide other functionality for system 1400.

Figure 15A:
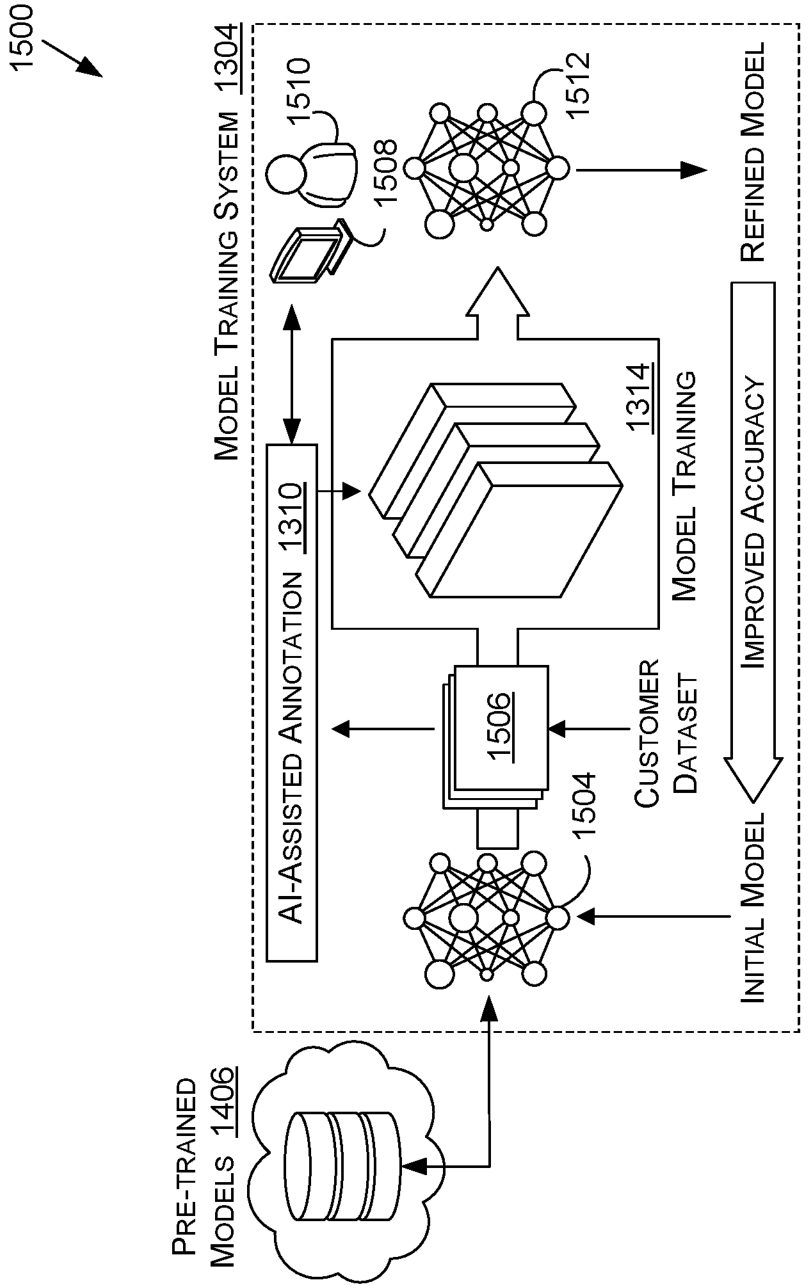
FIGS. 15A and 15B illustrate a data flow diagram for a process to train a machine learning model, as well as client-server architecture to enhance annotation tools with pre-trained annotation models, in accordance with at least one embodiment.

FIG. 15A illustrates a data flow diagram for a process 1500 to train, retrain, or update a machine learning model, in accordance with at least one embodiment. In at least one embodiment, process 1500 may be executed using, as a non-limiting example, system 1400 of FIG. 14. In at least one embodiment, process 1500 may leverage services and/or hardware as described herein. In at least one embodiment, refined models 1512 generated by process 1500 may be executed by a deployment system for one or more containerized applications in deployment pipelines.

In at least one embodiment, model training 1514 may include retraining or updating an initial model 1504 (e.g., a pre-trained model) using new training data (e.g., new input data, such as customer dataset 1506, and/or new ground truth data associated with input data). In at least one embodiment, to retrain, or update, initial model 1504, output or loss layer(s) of initial model 1504 may be reset, deleted, and/or replaced with an updated or new output or loss layer(s). In at least one embodiment, initial model 1504 may have previously fine-tuned parameters (e.g., weights and/or biases) that remain from prior training, so training or retraining 1514 may not take as long or require as much processing as training a model from scratch. In at least one embodiment, during model training 1514, by having reset or replaced output or loss layer(s) of initial model 1504, parameters may be updated and re-tuned for a new data set based on loss calculations associated with accuracy of output or loss layer(s) at generating predictions on new, customer dataset 1506.

In at least one embodiment, pre-trained models 1506 may be stored in a data store, or registry. In at least one embodiment, pre-trained models 1506 may have been trained, at least in part, at one or more facilities other than a facility executing process 1500. In at least one embodiment, to protect privacy and rights of patients, subjects, or clients of different facilities, pre-trained models 1506 may have been trained, on-premise, using customer or patient data generated on-premise. In at least one embodiment, pre-trained models 1306 may be trained using a cloud and/or other hardware, but confidential, privacy protected patient data may not be transferred to, used by, or accessible to any components of a cloud (or other off premise hardware). In at least one embodiment, where pre-trained models 1506 is trained at using patient data from more than one facility, pre-trained models 1506 may have been individually trained for each facility prior to being trained on patient or customer data from another facility. In at least one embodiment, such as where a customer or patient data has been released of privacy concerns (e.g., by waiver, for experimental use, etc.), or where a customer or patient data is included in a public data set, a customer or patient data from any number of facilities may be used to train pre-trained models 1506 on-premise and/or off premise, such as in a datacenter or other cloud computing infrastructure.

In at least one embodiment, when selecting applications for use in deployment pipelines, a user may also select machine learning models to be used for specific applications. In at least one embodiment, a user may not have a model for use, so a user may select a pre-trained model to use with an application. In at least one embodiment, pre-trained model may not be optimized for generating accurate results on customer dataset 1506 of a facility of a user (e.g., based on patient diversity, demographics, types of medical imaging devices used, etc.). In at least one embodiment, prior to deploying a pre-trained model into a deployment pipeline for use with an application(s), pre-trained model may be updated, retrained, and/or fine-tuned for use at a respective facility.

In at least one embodiment, a user may select pre-trained model that is to be updated, retrained, and/or fine-tuned, and this pre-trained model may be referred to as initial model 1504 for a training system within process 1500. In at least one embodiment, a customer dataset 1506 (e.g., imaging data, genomics data, sequencing data, or other data types generated by devices at a facility) may be used to perform model training (which may include, without limitation, transfer learning) on initial model 1504 to generate refined model 1512. In at least one embodiment, ground truth data corresponding to customer dataset 1506 may be generated by training system 1304. In at least one embodiment, ground truth data may be generated, at least in part, by clinicians, scientists, doctors, practitioners, at a facility.

In at least one embodiment, AI-assisted annotation may be used in some examples to generate ground truth data. In at least one embodiment, AI-assisted annotation (e.g., implemented using an AI-assisted annotation SDK) may leverage machine learning models (e.g., neural networks) to generate suggested or predicted ground truth data for a customer dataset. In at least one embodiment, a user may use annotation tools within a user interface (a graphical user interface (GUI)) on a computing device.

In at least one embodiment, user 1510 may interact with a GUI via computing device 1508 to edit or fine-tune (auto)annotations. In at least one embodiment, a polygon editing feature may be used to move vertices of a polygon to more accurate or fine-tuned locations.

In at least one embodiment, once customer dataset 1506 has associated ground truth data, ground truth data (e.g., from AI-assisted annotation, manual labeling, etc.) may be used by during model training to generate refined model 1512. In at least one embodiment, customer dataset 1506 may be applied to initial model 1504 any number of times, and ground truth data may be used to update parameters of initial model 1504 until an acceptable level of accuracy is attained for refined model 1512. In at least one embodiment, once refined model 1512 is generated, refined model 1512 may be deployed within one or more deployment pipelines at a facility for performing one or more processing tasks with respect to medical imaging data.

In at least one embodiment, refined model 1512 may be uploaded to pre-trained models in a model registry to be selected by another facility. In at least one embodiment, this process may be completed at any number of facilities such that refined model 1512 may be further refined on new datasets any number of times to generate a more universal model.

Figure 15B:
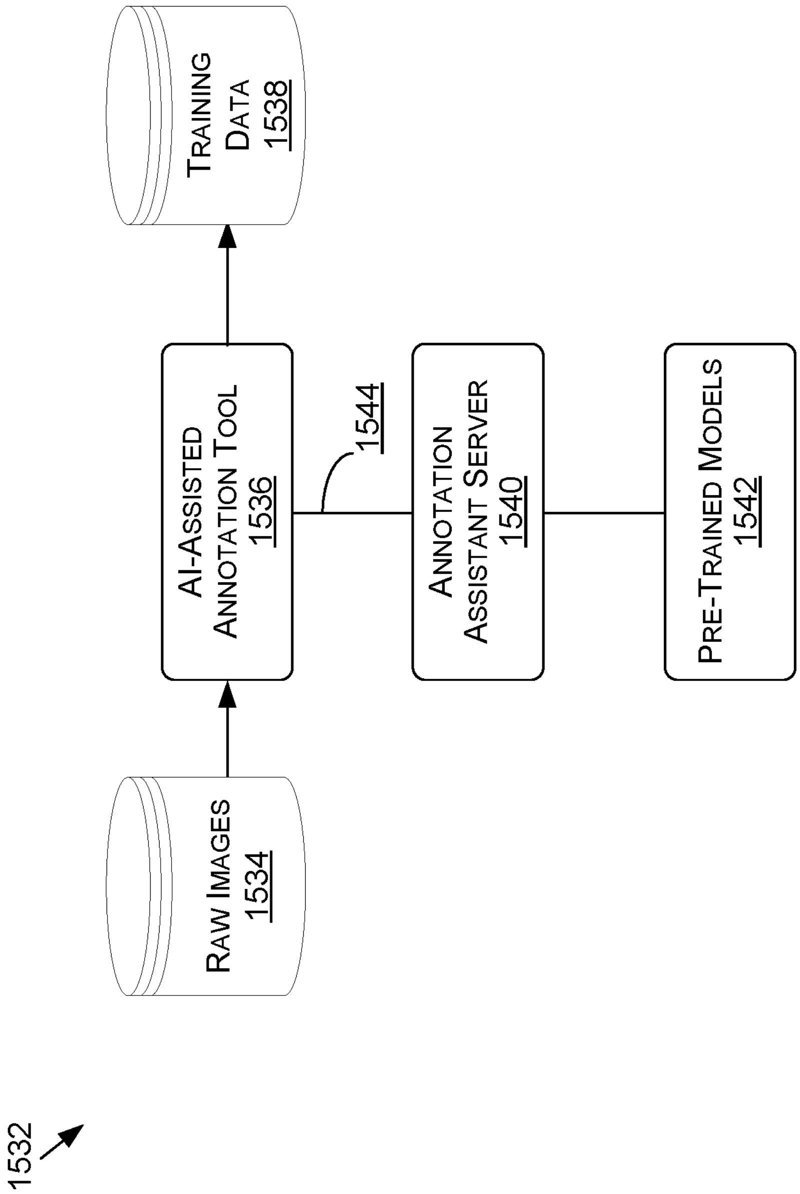

FIG. 15B is an example illustration of a client-server architecture 1532 to enhance annotation tools with pre-trained annotation models, in accordance with at least one embodiment. In at least one embodiment, AI-assisted annotation tool 1536 may be instantiated based on a client-server architecture 1532. In at least one embodiment, AI-assisted annotation tool 1536 in imaging applications may aid radiologists, for example, identify organs and abnormalities. In at least one embodiment, imaging applications may include software tools that help user 1510 to identify, as a non-limiting example, a few extreme points on a particular organ of interest in raw images 1534 (e.g., in a 3D MRI or CT scan) and receive auto-annotated results for all 2D slices of a particular organ. In at least one embodiment, results may be stored in a data store as training data 1538 and used as (for example and without limitation) ground truth data for training. In at least one embodiment, when computing device 1508 sends extreme points for AI-assisted annotation, a deep learning model, for example, may receive this data as input and return inference results of a segmented organ or abnormality. In at least one embodiment, pre-instantiated annotation tools, such as AI-assisted annotation tool 1536 in FIG. 15B, may be enhanced by making API calls (e.g., API Call 1544) to a server, such as an Annotation Assistant Server 1540 that may include a set of pre-trained models 1542 stored in an annotation model registry, for example. In at least one embodiment, an annotation model registry may store pre-trained models 1542 (e.g., machine learning models, such as deep learning models) that are pre-trained to perform AI-assisted annotation on a particular organ or abnormality. These models may be further updated by using training pipelines. In at least one embodiment, pre-installed annotation tools may be improved over time as new labeled data is added.

Various embodiments can be described by the following clauses:

1. A method, comprising:
generating a unit schema for a lattice corresponding to an auditory utterance;
generating a time schema for the lattice corresponding to the auditory utterance;
combining the unit schema and the time schema to form a combined lattice representation; and
populating the combined lattice representation with log probabilities of the auditory utterance.

2. The method of clause 1, further comprising:
receiving an input tensor corresponding to the auditory utterance; and
reshaping the input tensor to combine an audio dimension and a text dimension into a single value.

3. The method of clause 2, wherein the combined lattice representation is formed from at least an epsilon adapter and a soft-alignment weighted finite state transducer.

4. The method of clause 3, wherein the combined lattice representation is formed from at least an emissions weighted finite state transducer.

5. The method of clause 1, wherein one or more arcs of the unit schema correspond to an epsilon emission.

6. The method of clause 5, wherein the epsilon emission has a weight of zero.

7. The method of clause 1, wherein labels corresponding to arcs of both the unit schema and the time schema include an input, an output, a time, a unit index, and a weight.

8. A system comprising:
at least one processor to:
compute, using a neural network and based at least on a first frame of an auditory input, a first output value indicative of an epsilon token;

based at least on the epsilon token, select, as a next frame for the neural network to process after the first frame, a second frame of the auditory input;

compute, using the neural network and based at least on the second frame, a second output value indicative of a unit token;

determine the second output value indicative of the unit token is an end of an utterance of the auditory input; and compute, for the utterance, an utterance value including at least the first output value and the second output value, wherein the first output value has a value of zero.

9. The system of clause 8, wherein the system comprises at least one of:

a system for performing simulation operations;

a system for performing simulation operations to test or validate autonomous machine applications;

a system for performing digital twin operations;

a system for performing light transport simulation;

a system for rendering graphical output;

a system for performing deep learning operations;

a system implemented using an edge device;

a system for generating or presenting virtual reality (VR) content;

a system for generating or presenting augmented reality (AR) content;

a system for generating or presenting mixed reality (MR) content;

a system incorporating one or more Virtual Machines (VMs);

a system for performing operations for a conversational AI application;

a system for performing operations for a generative AI application;

a system for performing operations using a language model;

a system implemented at least partially in a data center;

a system for performing hardware testing using simulation;

a system for synthetic data generation;

a collaborative content creation platform for 3D assets; or a system implemented at least partially using cloud computing resources.

10. The system of clause 8, wherein the neural network includes a recurrent neural network transducer (RNN-T).

11. The system of clause 8, wherein the computing the utterance value further causes the at least one processor to:

determine forward weights for a path from a start to the end;

determine backward weights for the path; and determine a path cost based at least on the one or more loss functions.

12. The system of clause 8, wherein a cost associated with the epsilon token is equal to zero.

13. The system of clause 8, wherein the at least one processor is further to:

generate an epsilon-adapter from a text length to emulate blank transitions;

combine the epsilon-adapter with a soft-alignment weighted finite state transducer (WFST) to form a modified WFST; and combine the modified WFST with an emissions WFST.

14. The system of clause 13, wherein the soft-alignment WFST is a composition of a topology WFST and a linear finite state acceptor.

15. The system of clause 13, wherein the at least one processor is further to:

reshape an input tensor to combine an audio dimension and a text dimension into a single value.

16. A processor comprising:

one or more processing units to perform, using a neural network (NN), one or more automatic speech recognition (ASR) operations with respect to a sequence of audio frames, wherein an output of the NN corresponding to at least one audio frame of the sequence of audio frames corresponds to an emulated blank causing an audio frame in the sequence of audio frames to be omitted from processing using the NN without affecting a loss score.

17. The processor of clause 16, wherein the processor is comprised at least one of:

a system for performing simulation operations;

a system for performing simulation operations to test or validate autonomous machine applications;

a system for performing digital twin operations;

a system for performing light transport simulation;

a system for rendering graphical output;

a system for performing deep learning operations;

a system implemented using an edge device;

a system for generating or presenting virtual reality (VR) content;

a system for generating or presenting augmented reality (AR) content;

a system for generating or presenting mixed reality (MR) content;

a system incorporating one or more Virtual Machines (VMs);

a system for performing operations for a conversational AI application;

a system for performing operations for a generative AI application;

a system for performing operations using a language model;

a system implemented at least partially in a data center;

a system for performing hardware testing using simulation;

a system for synthetic data generation;

a collaborative content creation platform for 3D assets; or a system implemented at least partially using cloud computing resources.

18. The processor of clause 16, wherein the neural network includes a recurrent neural network transducer (RNN-T).

19. The processor of clause 16, wherein the neural network is trained using at least one path through a probability lattice.

20. The processor of clause 19, wherein the probability lattice is formed based, at least, on a reshaped input tensor that is reduced from four dimensions to three dimensions.

21. A method, comprising:

generating a lattice representation corresponding to an auditory utterance;

traversing the lattice representation based, at least, on log probabilities of emissions for units of the auditory utterance;

determining a final unit of the auditory utterance is emitted;

applying a skip-connection emission from a final unit frame to an end frame of the plurality of frames; and determining a cost of a path through the lattice representation, wherein the skip-connection emission has a zero-value cost.

22. The method of clause 21, further comprising:

generating a unit schema for the lattice representation;

generating a time schema for the lattice representation; and combining the unit schema and the lattice representation.

23. The method of clause 22, wherein one or more labels of at least one of the unit schema or the time schema are omitted.

24. The method of clause 23, further comprising:

populating the omitted labels.

25. The method of clause 21, further comprising:

adding a blank emission to the path; and adding an associated blank cost to the cost.

26. The method of clause 21, further comprising:

applying the skip-connection emission from a start frame to an intermediate frame between the start frame and the end frame.

27. The method of clause 21, wherein the skip-connection emission traverses a time axis of the lattice representation for two or more frames.

28. A system comprising:

at least one processor to:

generate a lattice representation corresponding to an auditory utterance over a plurality of frames;

apply a skip-connection emission from a first frame of the plurality of frames to a selected second frame of the plurality of frames;

traverse the lattice representation based, at least, on log probabilities of emissions for units of the auditory utterance;

determine a final unit of the auditory utterance is emitted; and determine a cost of a path through the lattice representation, wherein the skip-connection emission has a zero-value cost.

29. The system of clause 28, wherein the system comprises at least one of:

a system for performing simulation operations;

a system for performing simulation operations to test or validate autonomous machine applications;

a system for performing digital twin operations;

a system for performing light transport simulation;

a system for rendering graphical output;

a system for performing deep learning operations;

a system implemented using an edge device;

a system for generating or presenting virtual reality (VR) content;

a system for generating or presenting augmented reality (AR) content;

a system for generating or presenting mixed reality (MR) content;

a system incorporating one or more Virtual Machines (VMs);

a system for performing operations for a conversational AI application;

a system for performing operations for a generative AI application;

a system for performing operations using a language model;

a system implemented at least partially in a data center;

a system for performing hardware testing using simulation;

a system for synthetic data generation;

a collaborative content creation platform for 3D assets; or a system implemented at least partially using cloud computing resources.

30. The system of clause 28, wherein the lattice representation is associated with a recurrent neural network transducer (RNN-T).

31. The system of clause 28, wherein the determining the cost of the path further causes the at least one processor to:

determine forward weights for a path from a start to the end;

determine backward weights for the path; and determine a path cost based at least on the one or more loss functions.

32 The system of clause 28, wherein the at least one processor is further to:

apply the skip-connection emission from the final unit to a near-last frame.

33 The system of clause 32, wherein the near-last frame is an immediately preceding frame of final output frame.

34 The system of clause 28, wherein the at least one processor is further to:

apply a blank emission after the near-last frame; and add a blank cost, for the blank emission, to the cost.

35. The system of clause 28, wherein the lattice representation includes a respective end state for each frame of the plurality of frames.

36. A processor comprising:

one or more processing units to perform, using a neural network (NN), one or more automatic speech recognition (ASR) operations with respect to a sequence of audio frames, wherein an output of the NN corresponding to at least one audio frame of the sequence of audio frames corresponds to a penalty-free blank emission causing an audio frame in the sequence of audio frames to be omitted from processing using the NN.

37. The processor of clause 36, wherein the processor is comprised at least one of:

a system for performing simulation operations;

a system for performing simulation operations to test or validate autonomous machine applications;

a system for performing digital twin operations;

a system for performing light transport simulation;

a system for rendering graphical output;

a system for performing deep learning operations;

a system implemented using an edge device;

a system for generating or presenting virtual reality (VR) content;

a system for generating or presenting augmented reality (AR) content;

a system for generating or presenting mixed reality (MR) content;

a system incorporating one or more Virtual Machines (VMs);

a system for performing operations for a conversational AI application;

a system for performing operations for a generative AI application;

a system for performing operations using a language model;

a system implemented at least partially in a data center;

a system for performing hardware testing using simulation;

a system for synthetic data generation;

a collaborative content creation platform for 3D assets; or a system implemented at least partially using cloud computing resources.

38 The processor of clause 36, wherein the neural network includes a recurrent neural network transducer (RNN-T).

39 The processor of clause 36, wherein the neural network is trained using at least one path through a probability lattice.

40. The processor of clause 36, wherein the penalty-free blank emission is applied from one of a first frame of the sequence of audio frames or between a final emission and an end frame of the sequence of audio frames.

Other variations are within spirit of present disclosure. Thus, while disclosed techniques are susceptible to various modifications and alternative constructions, certain illustrated embodiments thereof are shown in drawings and have been described above in detail. It should be understood, however, that there is no intention to limit disclosure to specific form or forms disclosed, but on contrary, intention is to cover all modifications, alternative constructions, and equivalents falling within spirit and scope of disclosure, as defined in appended claims.

Use of terms "a" and "an" and "the" and similar referents in context of describing disclosed embodiments (especially in context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. Term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within range, unless otherwise indicated herein and each separate value is incorporated into specification as if it were individually recited herein. Use of term "set" (e.g., "a set of items") or "subset," unless otherwise noted or contradicted by context, is to be construed as a nonempty collection comprising one or more members. Further, unless otherwise noted or contradicted by context, term "subset" of a corresponding set does not necessarily denote a proper subset of corresponding set, but subset and corresponding set may be equal.

Conjunctive language, such as phrases of form "at least one of A, B, and C," or "at least one of A, B and C," unless specifically stated otherwise or otherwise clearly contradicted by context, is otherwise understood with context as used in general to present that an item, term, etc., may be either A or B or C, or any nonempty subset of set of A and B and C. For instance, in illustrative example of a set having three members, conjunctive phrases "at least one of A, B, and C" and "at least one of A, B and C" refer to any of following sets: {A}, {B}, {C}, {A, B}, {A, C}, {B, C}, {A, B, C}. Thus, such conjunctive language is not generally intended to imply that certain embodiments require at least one of A, at least one of B, and at least one of C each to be present. In addition, unless otherwise noted or contradicted by context, term "plurality" indicates a state of being plural (e.g., "a plurality of items" indicates multiple items). A plurality is at least two items, but can be more when so indicated either explicitly or by context. Further, unless stated otherwise or otherwise clear from context, phrase "based on" means "based at least in part on" and not "based solely on."

Operations of processes described herein can be performed in any suitable order unless otherwise indicated herein or otherwise clearly contradicted by context. In at least one embodiment, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause computer system to perform operations described herein. A set of non-transitory computer-readable storage media, in at least one embodiment, comprises multiple non-transitory computer-readable storage media and one or more of individual non-transitory storage media of multiple non-transitory computer-readable storage media lack all of code while multiple non-transitory computer-readable storage media collectively store all of code. In at least one embodiment, executable instructions are executed such that different instructions are executed by different processors—for example, a non-transitory computer-readable storage medium store instructions and a main central processing unit ("CPU") executes some of instructions while a graphics processing unit ("GPU") executes other instructions. In at least one embodiment, different components of a computer system have separate processors and different processors execute different subsets of instructions.

Accordingly, in at least one embodiment, computer systems are configured to implement one or more services that singly or collectively perform operations of processes described herein and such computer systems are configured with applicable hardware and/or software that enable performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate embodiments of disclosure and does not pose a limitation on scope of disclosure unless otherwise claimed. No language in specification should be construed as indicating any non-claimed element as essential to practice of disclosure.

All references, including publications, patent applications, and patents, cited herein are hereby incorporated by reference to same extent as if each reference were individually and specifically indicated to be incorporated by reference and were set forth in its entirety herein.

In description and claims, terms "coupled" and "connected," along with their derivatives, may be used. It should be understood that these terms may be not intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to action and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, term "processor" may refer to any device or portion of a device that processes electronic data from registers and/or memory and transform that electronic data into other electronic data that may be stored in registers and/or memory. As non-limiting examples, "processor" may be a CPU or a GPU. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. Terms "system" and "method" are used herein interchangeably insofar as system may embody one or more methods and methods may be considered a system.

In present document, references may be made to obtaining, acquiring, receiving, or inputting analog or digital data into a subsystem, computer system, or computer-implemented machine. Obtaining, acquiring, receiving, or inputting analog and digital data can be accomplished in a variety of ways such as by receiving data as a parameter of a function call or a call to an application programming interface. In some implementations, process of obtaining, acquiring, receiving, or inputting analog or digital data can be accomplished by transferring data via a serial or parallel interface. In another implementation, process of obtaining, acquiring, receiving, or inputting analog or digital data can be accomplished by transferring data via a computer network from providing entity to acquiring entity. References may also be made to providing, outputting, transmitting, sending, or presenting analog or digital data. In various examples, process of providing, outputting, transmitting, sending, or presenting analog or digital data can be accomplished by transferring data as an input or output parameter of a function call, a parameter of an application programming interface or interprocess communication mechanism.

Although discussion above sets forth example implementations of described techniques, other architectures may be used to implement described functionality, and are intended to be within scope of this disclosure. Furthermore, although specific distributions of responsibilities are defined above for purposes of discussion, various functions and responsibilities might be distributed and divided in different ways, depending on circumstances.

Furthermore, although subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:

1. A processor comprising:

one or more circuits configured to perform, using a neural network (NN), one or more automatic speech recognition (ASR) operations with respect to a sequence of audio frames, the operations using at least a three-dimensional (3D) tensor converted from a four-dimensional (4D) tensor by combination of an audio dimension and a text dimension, the one or more circuits configured to, responsive to an output of the NN indicating an emulated blank for at least one audio frame of the sequence of audio frames, omit at least one audio frame from processing without affecting a loss score.

2. The processor of claim 1, wherein the processor is comprised at least one of:

a system for performing simulation operations;

a system for performing simulation operations to test or validate autonomous machine applications;

a system for performing digital twin operations;

a system for performing light transport simulation;

a system for rendering graphical output;

a system for performing deep learning operations;

a system implemented using an edge device;

a system for generating or presenting virtual reality (VR) content;

a system for generating or presenting augmented reality (AR) content;

a system for generating or presenting mixed reality (MR) content;

a system incorporating one or more Virtual Machines (VMs);

a system for performing operations for a conversational AI application;

a system for performing operations for a generative AI application;

a system for performing operations using a language model;

a system implemented at least partially in a data center;

a system for performing hardware testing using simulation;

a system for synthetic data generation;

a collaborative content creation platform for 3D assets; or a system implemented at least partially using cloud computing resources.

3. The processor of claim 1, wherein the NN includes a recurrent neural network transducer (RNN-T).

4. The processor of claim 1, wherein the NN is trained using at least one path through a probability lattice.

5. The processor of claim 4, wherein the probability lattice is formed based, at least, on the 3D tensor.

6. The processor of claim 5, wherein the one or more circuits are further to reshape the 4D tensor into the 3D tensor so that the combination of the audio dimension and text dimension are represented by a single value.

7. The processor of claim 1, wherein the one or more circuits are further to generate a combined lattice representation, for an utterance associated with the sequence of audio frames, including a unit schema and a time schema.

8. The processor of claim 7, wherein one or more arcs of the unit schema correspond to an epsilon emission with a weight of zero.

9. A method, comprising:

receiving a sequence of audio frames;

converting a four-dimensional (4D) tensor into a three-dimensional (3D) tensor at least by combining an audio dimension and a text dimension;

performing, using a neural network (NN), one or more automatic speech recognition (ASR) operations using the sequence of audio frames and the 3D tensor; and generating, using the NN, an output including at least one audio frame of the sequence of audio frames corresponding to an emulated blank, wherein the emulated blank causes an audio frame in the sequence of audio frames to be omitted from processing, by the NN, without affecting a loss score.

10. The method of claim 9, wherein the NN includes a recurrent neural network transducer (RNN-T).

11. The method of claim 9, wherein the NN is trained using at least one path through a probability lattice.

12. The method of claim 11, wherein the probability lattice is formed based, at least, on the 3D tensor.

13. The method of claim 12, further comprising:

reshaping the 4D tensor into the 3D tensor so that the combined audio dimension and text dimension are represented by a single value.

14. The method of claim 9, further comprising:

generating a combined lattice representation, for an utterance associated with the sequence of audio frames, including a unit schema and a time schema.

15. The method of claim 14, wherein one or more arcs of the unit schema correspond to an epsilon emission with a weight of zero.

16. A system comprising:

at least one processor to:

receive a sequence of audio frames;

convert a four-dimensional (4D) tensor into a three-dimensional (3D) tensor by combining an audio dimension and a text dimension;

perform, using a neural network (NN), one or more automatic speech recognition (ASR) operations using the sequence of audio frames and the 3D tensor; and generate, using the NN, an output including at least one audio frame of the sequence of audio frames corresponding to an emulated blank, wherein the emulated blank causes an audio frame in the sequence of audio frames to be omitted from processing, by the NN, without affecting a loss score.

17. The system of claim 16, wherein the system comprises at least one of:

a system for performing simulation operations;

a system for performing simulation operations to test or validate autonomous machine applications;

a system for performing digital twin operations;

a system for performing light transport simulation;

a system for rendering graphical output;

a system for performing deep learning operations;

a system implemented using an edge device;

a system for generating or presenting virtual reality (VR) content;

a system for generating or presenting augmented reality (AR) content;

a system for generating or presenting mixed reality (MR) content;

a system incorporating one or more Virtual Machines (VMs);

a system for performing operations for a conversational AI application;

a system for performing operations for a generative AI application;

a system for performing operations using a language model;

a system implemented at least partially in a data center;

a system for performing hardware testing using simulation;

a system for synthetic data generation;

a collaborative content creation platform for 3D assets; or a system implemented at least partially using cloud computing resources.

18. The system of claim 16, wherein the NN includes a recurrent neural network transducer (RNN-T).

19. The system of claim 16, wherein the NN is trained using at least one path through a probability lattice.

20. The system of claim 19, wherein the probability lattice is formed based, at least, on the 3D tensor.

* * * * *